United States Patent
Li

(10) Patent No.: US 12,238,638 B2
(45) Date of Patent: Feb. 25, 2025

(54) METHOD FOR CONTROLLING USE OF NETWORK SLICE, APPARATUS, AND SYSTEM

(71) Applicant: HUAWEI TECHNOLOGIES CO., LTD., Guangdong (CN)

(72) Inventor: Zhuoming Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 429 days.

(21) Appl. No.: 17/737,205

(22) Filed: May 5, 2022

(65) Prior Publication Data

US 2022/0264428 A1 Aug. 18, 2022

Related U.S. Application Data

(63) Continuation of application No. PCT/CN2020/121644, filed on Oct. 16, 2020.

(30) Foreign Application Priority Data

Nov. 6, 2019 (CN) .......................... 201911078541.5

(51) Int. Cl.
*H04W 48/06* (2009.01)
*H04W 24/08* (2009.01)

(52) U.S. Cl.
CPC ........... *H04W 48/06* (2013.01); *H04W 24/08* (2013.01)

(58) Field of Classification Search
CPC .............................. H04W 48/06; H04W 24/08
See application file for complete search history.

(56) References Cited

U.S. PATENT DOCUMENTS

| | | | | |
|---|---|---|---|---|
| 11,627,631 | B2 * | 4/2023 | Hong | H04L 41/0806 |
| | | | | 370/254 |
| 2016/0353465 | A1 * | 12/2016 | Vrzic | H04L 41/5054 |
| 2017/0086118 | A1 * | 3/2017 | Vrzic | H04W 36/26 |
| 2018/0220276 | A1 | 8/2018 | Senarath et al. | |

(Continued)

FOREIGN PATENT DOCUMENTS

| | | |
|---|---|---|
| CN | 108141412 A | 6/2018 |
| CN | 109587742 A | 4/2019 |

(Continued)

OTHER PUBLICATIONS

LG Electronics et al., "TS 23.502 Paging handling in Non-allowed area", SA WG2 Meeting #122 S2-175295,Jun. 26-30, 2017, San Jose Del Cabo, Mexico, total 10 pages.

(Continued)

*Primary Examiner* — Brenda H Pham

(57) ABSTRACT

Embodiments of this application provide a method for controlling use of a network slice, an apparatus, and a system. The method includes: A first network element receives a first message used to request access of a terminal device to a target network slice. The target network slice covers a plurality of regions including a first region, and the first region is a region in which the terminal device is currently located. Further, the first network element determines, based on a first condition, whether to allow the (Continued)

terminal device to access the target network slice. The first condition includes: whether a service usage of the target network slice in the first region exceeds a first service limit.

18 Claims, 22 Drawing Sheets

(56) References Cited

U.S. PATENT DOCUMENTS

| | | | |
|---|---|---|---|
| 2018/0332442 A1* | 11/2018 | Shaw | H04L 41/0896 |
| 2018/0376407 A1* | 12/2018 | Myhre | H04W 74/0833 |
| 2019/0029000 A1* | 1/2019 | Vikberg | H04W 68/00 |
| 2019/0075512 A1* | 3/2019 | Jin | H04W 88/16 |
| 2019/0159029 A1* | 5/2019 | Li | H04W 12/06 |
| 2019/0182875 A1* | 6/2019 | Talebi Fard | H04W 76/11 |
| 2019/0306761 A1 | 10/2019 | Jin et al. | |
| 2020/0068074 A1* | 2/2020 | Cai | H04M 15/66 |

FOREIGN PATENT DOCUMENTS

| | | |
|---|---|---|
| CN | 109600768 A | 4/2019 |
| CN | 109743213 A | 5/2019 |
| CN | 109951877 A | 6/2019 |
| WO | 2018045511 A1 | 3/2018 |
| WO | 2019011190 A1 | 1/2019 |
| WO | 2019074347 A1 | 4/2019 |
| WO | 2019120109 A1 | 6/2019 |

OTHER PUBLICATIONS

Samsung, "Updates to UE driven analytics solution 16", SA WG2 Meeting #129 S2-1810329,Aug. 20- 24, 2018, total 5 pages.
Generic Network Slice Template;Version 2.0;Oct. 16, 2019, Official Document NG.116—Generic Network Slice Template, GSM Association, Total 61 Pages.
3GPP TS 23.501 V16.2.0 (Sep. 2019), 3rd Generation Partnership Project; Technical Specification Group Services and System Aspects; System Architecture for the 5G System (5GS); Stage 2(Release 16), 389 pages.
3GPP TS 23.502 V16.2.0: 3rd Generation Partnership Project;Technical Specification Group Services and System Aspects;Procedures for the 5G System (5GS);Stage 2(Release 16) Sep. 2019 total 525 pages.
3GPP TS 23.503 V16.2.0 (Sep. 2019), 3rd Generation Partnership Project; Technical Specification Group Services and System Aspects; Policy and Charging Control Framework for the 5G System (5GS); Stage 2(Release 16), 104 pages.
3GPP TS 28.541 V16.2.0 (Sep. 2019), 3rd Generation Partnership Project; Technical Specification Group Services and System Aspects; Management and orchestration; 5G Network Resource Model (NRM); Stage 2 and stage 3(Release 16), 313 pages.

* cited by examiner

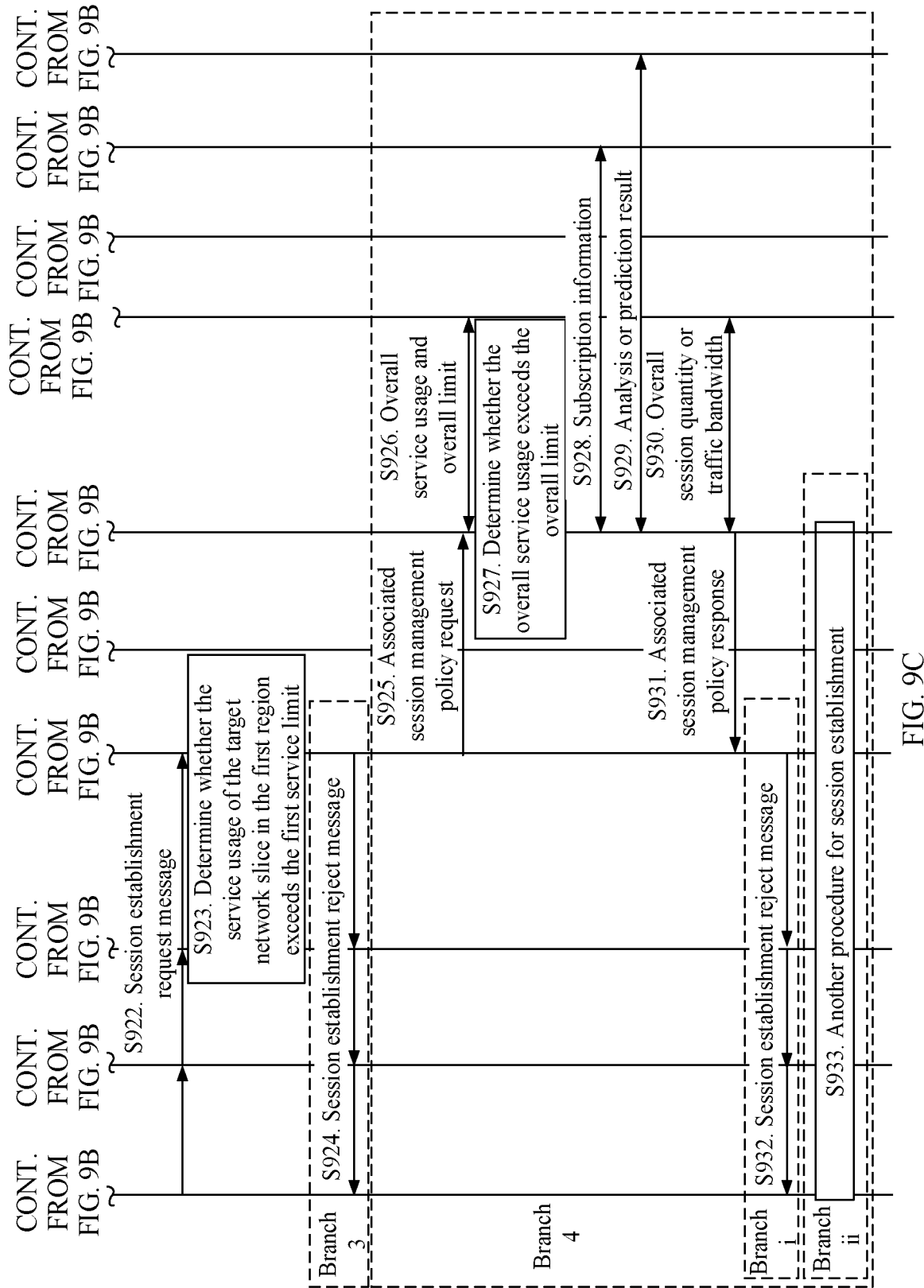

METHOD FOR CONTROLLING USE OF NETWORK SLICE, APPARATUS, AND SYSTEM

CROSS-REFERENCE TO RELATED APPLICATIONS

This application is a continuation of International Patent Application No. PCT/CN2020/121644, filed on Oct. 16, 2020, which claims priority to Chinese Patent Application No. 201911078541.5, filed on Nov. 6, 2019. The disclosures of the aforementioned applications are hereby incorporated by reference in their entireties.

TECHNICAL FIELD

This application relates to the field of communications technologies, and in particular, to a method for controlling use of a network slice, an apparatus, and a system.

BACKGROUND

A network slice is a logically isolated network used to support a specific network capability and network feature, and may include an entire network from end to end (E2E), or some network functions may be shared by a plurality of network slices. The network slice is a key technology that meets a network differentiation requirement of a 5th generation (5G) mobile communications technology proposed by the 3rd generation partnership project (3GPP). Generally, different network slices have different network features, and network slices need to be isolated from each other to avoid mutual interference. For example, a network slice of an augmented reality (AR) service or a virtual reality (VR) service requires a high-bandwidth and low-latency service. A network slice of an internet of things (IoT) service requires supporting access of a large quantity of terminals, but requires a low bandwidth, and has no requirement on a latency.

Currently, after a customer subscribes to a network slice, a network operator completes creation and deployment of the network slice, and then adds, to a user data repository (UDR) network element, control data of the network slice, such as a maximum quantity of registered terminals and a maximum quantity of session connections of the network slice. Further, a policy control function (PCF) network element controls, in a registration management procedure, a current quantity of registered terminals not to exceed the maximum quantity of registered terminals of the network slice, and controls, in a session management procedure, a current quantity of established session connections not to exceed the maximum quantity of session connections of the network slice.

However, terminal devices are mobile. Due to mobility of terminal devices, terminal devices in a region in the network slice may be very dense, or terminal devices in a region in the network slice may be very sparse. If terminal devices in a region in the network slice are very dense, a radio-side network node is easily congested, which cannot ensure service quality of the network slice, and may further affect service quality of another network slice.

Therefore, how to limit excessive use of network slice resources by a customer and ensure service quality of a network slice is a problem that needs to be urgently resolved currently.

SUMMARY

Embodiments of this application provide a method for controlling use of a network slice, an apparatus, and a system, to limit excessive use of network slice resources by a customer, ensure service quality of a network slice, and improve network resource utilization efficiency. To achieve the foregoing objective, the following technical solutions are used in the embodiments of this application.

According to a first aspect, a method for controlling use of a network slice is provided. The method includes: A first network element receives a first message. The first message is used to request access of a terminal device to a target network slice, the target network slice covers a plurality of regions, the plurality of regions include a first region, and the first region is a region in which the terminal device is currently located. The first network element determines, based on a first condition, whether to allow the terminal device to access the target network slice. The first condition includes: whether a service usage of the target network slice in the first region exceeds a first service limit. Because the target network slice in this embodiment of this application covers a plurality of regions, the first network element may determine, based on the first condition, whether to allow the terminal device to access the target network slice. The first condition includes: whether the service usage of the target network slice in the first region exceeds the first service limit. In other words, in this embodiment of this application, region-based control of access to the network slice is implemented. Therefore, a problem that a radio-side network node in a region is congested or overloaded, which cannot ensure service quality of the network slice, and may further affect service quality of another network slice can be avoided. In this way, excessive use of network slice resources by a customer can be limited, and the service quality of the network slice can be ensured.

In a possible design, that the first network element determines, based on a first condition, whether to allow the terminal device to access the target network slice includes: the first network element rejects the first message when the service usage of the target network slice in the first region reaches or exceeds the first service limit.

In a possible design, the first condition further includes: whether an overall service usage of the target network slice exceeds an overall limit.

In a possible design, that the first network element determines, based on a first condition, whether to allow the terminal device to access the target network slice includes: the first network element rejects the first message when the service usage of the target network slice in the first region does not exceed the first service limit, but the overall service usage of the target network slice reaches or exceeds the overall limit.

In a possible design, the method further includes: The first network element receives a second message from a second network element. The second message carries first information, and the first information indicates that the overall service usage of the target network slice reaches or exceeds the overall limit. Based on the solution, the first network element may learn that the overall service usage of the target network slice reaches or exceeds the overall limit.

In a possible design, the first information is a quota of a service usage in the first region that is 0, or the first information is an indication that the overall service usage of the target network slice reaches or exceeds the overall limit of the target network slice.

In a possible design, the first network element is a mobility management network element, the second network element is a slice selection function network element or a policy control network element, and the first message is a registration request.

In a possible design, the first network element is a mobility management network element, the second network element is a slice selection function network element, and the first message is a session establishment request.

In a possible design, the first network element is a session management network element, the second network element is a policy control network element, and the first message is a session establishment request.

In a possible design, the method further includes: The first network element receives a third message from a third network element. The third message carries the overall service usage of the target network slice. The first network element determines that the overall service usage of the target network slice reaches or exceeds the overall limit of the target network slice. Based on the solution, the first network element may learn that the overall service usage of the target network slice reaches or exceeds the overall limit.

In a possible implementation, the first network element is a policy control network element, the third network element is a unified data management network element, and the first message is an associated registration management policy request or an associated session management policy request.

In a possible design, that the first network element determines, based on a first condition, whether to allow the terminal device to access the target network slice includes: when the overall service usage of the target network slice reaches or exceeds the overall limit, but the service usage of the target network slice in the first region does not exceed the first service limit, if a second condition is met, the first network element allows the terminal device to use the target network slice. If terminal devices in a region in a network slice are very sparse, the region may have a large quantity of idle resources. However, because an overall service usage of the network slice exceeds a specified limit, access of the terminal devices in the region is also limited, causing a waste of resources in the region. Therefore, in this embodiment of this application, when the overall service usage of the target network slice reaches or exceeds the overall limit, but the service usage of the target network slice in the first region does not exceed the first service limit, if the second condition is met, the first network element allows the terminal device to use the target network slice. In other words, when the overall service usage of the target network slice reaches or exceeds the overall limit, but the service usage of the target network slice in the first region does not exceed the first service limit, in a specific scenario, a user may be allowed to use a resource of the target network slice in the first region, to improve network resource utilization. This can bring more economic benefits to an operator, and improve service experience of a high-value user.

In a possible design, the first network element is a policy control network element, the first message is an associated registration management policy request or an associated slice management policy request, and the second condition includes: the overall limit is allowed to be exceeded in slice subscription information of the target network slice, or a charging mode of the target network slice is charging by session or by traffic, or a subscribed service type of the target network slice is a specific service type, or the terminal device requesting access is a high-value customer, or a slice running analysis result or prediction result of the target network slice is lower than a specific threshold, or a movement behavior analysis or prediction result of the terminal device requesting access indicates that a service load of the terminal device requesting access is lower than a specific threshold.

In a possible design, the method further includes: When the first network element receives the associated slice management policy request from a slice selection function network element, the first network element determines that the service usage of the target network slice in the first region does not exceed the first service limit. Based on the solution, the first network element may learn that the service usage of the target network slice in the first region does not exceed the first service limit.

In another possible design, the first network element is a policy control network element, the first message is an associated session management policy request, and the second condition includes: the overall limit is allowed to be exceeded in slice subscription information of the target network slice, or a charging mode of the target network slice is charging by session or by traffic, or a subscribed service type of the target network slice is a specific service type, or the terminal device requesting access is a high-value customer, or an overall session quantity and a traffic bandwidth of the target network slice are lower than an overload risk threshold, or a subscribed quality of service QoS parameter of the terminal device indicates that a service of the terminal device is allowed to be preempted, or a slice running analysis or prediction result of the target network slice is lower than a specific threshold, or a movement or communication behavior analysis or prediction result of the terminal device requesting access indicates that a service load of the terminal device requesting access is lower than a specific threshold.

In a possible design, the method further includes: When the first network element receives the associated session management policy request from a session management network element, the first network element determines that the service usage of the target network slice in the first region does not exceed the first service limit. Based on the solution, the first network element may learn that the service usage of the target network slice in the first region does not exceed the first service limit.

In a possible design, the first network element is a mobility management network element, the first message is a registration request, and the second condition includes: when a slice selection function network element indicates that the overall service usage of the target network slice reaches or exceeds the overall limit, a session quantity quota indicated by the slice selection function network element exceeds a specified quantity.

In a possible design, the method further includes: When the first network element receives, from the slice selection function network element, the session quantity quota and the indication that the overall service usage of the target network slice reaches or exceeds the overall limit of the target network slice, the first network element determines that the overall service usage of the target network slice reaches or exceeds the overall limit. Based on the solution, the first network element may learn that the service usage of the target network slice in the first region does not exceed the first service limit.

In a possible design, the first network element is a session management network element, the first message is a session establishment request, and the second condition includes: when a policy control network element indicates that the overall service usage of the target network slice reaches or exceeds the overall limit, a service QoS parameter, indicated by the policy control network element, of the terminal device indicates that a session can be preempted.

In a possible design, the method further includes: When the first network element receives, from the policy control network element, the service QoS parameter of the terminal device and the indication that the overall service usage of the target network slice reaches or exceeds the overall limit of the target network slice, the first network element determines that the overall service usage of the target network slice reaches or exceeds the overall limit. Based on the solution, the first network element may learn that the service usage of the target network slice in the first region does not exceed the first service limit.

In a possible design, the first network element is a mobility management network element, and the first message is a registration request; or the first network element is a session management network element, and the first message is a session establishment request; and the second condition includes: a running load of the target network slice in the first region is less than a specified threshold; or an overall running load of the target network slice is lower than a specified threshold, or network performance of the target network slice in the first region is higher than a specified threshold.

In a possible design, when the first message is a registration related message, the overall service usage of the target network slice is an actual overall quantity of registered terminals of the target network slice, and the overall limit of the target network slice is an overall maximum quantity of registered terminals allowed by the target network slice.

In a possible design, when the first message is a session establishment related message, the overall service usage of the target network slice is an actual overall quantity of concurrent sessions of the target network slice, and the overall limit of the target network slice is an overall maximum quantity of concurrent sessions allowed by the target network slice.

In a possible design, when the first message is a session establishment related message, the overall service usage of the target network slice is an actual overall traffic bandwidth of the target network slice, and the overall limit of the target network slice is an overall maximum traffic bandwidth allowed by the target network slice.

In a possible design, when the first message is the registration related message, the service usage of the target network slice in the first region includes an actual quantity of registered terminals of the target network slice in the first region, and the first service limit includes a maximum quantity of registered terminals allowed by the target network slice in the first region.

In a possible design, when the first message is the session establishment related message, the service usage of the target network slice in the first region includes an actual quantity of concurrent sessions of the target network slice in the first region, and the first service limit includes a maximum quantity of concurrent sessions allowed by the target network slice in the first region.

In a possible design, when the first message is the session establishment related message, the service usage of the target network slice in the first region includes an actual traffic bandwidth of the target network slice in the first region, and the first service limit includes a maximum traffic bandwidth allowed by the target network slice in the first region.

According to a second aspect, a communications apparatus is provided, to implement the foregoing method. The communications apparatus may be the first network element in the first aspect, or an apparatus including the first network element. The communications apparatus includes a corresponding module, unit, or means for implementing the foregoing method. The module, unit, or means may be implemented by hardware, software, or hardware executing corresponding software. The hardware or the software includes one or more modules or units corresponding to the foregoing function.

According to a third aspect, a communications apparatus is provided. The communications apparatus includes a processor and a memory. The memory is configured to store computer instructions. When the processor executes the instructions, the communications apparatus is enabled to perform the method in any one of the foregoing aspects. The communications apparatus may be the first network element in the first aspect, or an apparatus including the first network element.

According to a fourth aspect, a communications apparatus is provided. The communications apparatus includes a processor. The processor is configured to: be coupled to a memory, and perform, after reading instructions in the memory, the method in any one of the foregoing aspects according to the instructions. The communications apparatus may be the first network element in the first aspect, or an apparatus including the first network element.

According to a fifth aspect, a computer-readable storage medium is provided. The computer-readable storage medium stores instructions. When the instructions are run on a computer, the computer is enabled to perform the method in any one of the foregoing aspects.

According to a sixth aspect, a computer program product including instructions is provided. When the computer program product runs on a computer, the computer is enabled to perform the method in any one of the foregoing aspects.

According to a seventh aspect, a communications apparatus (for example, the communications apparatus may be a chip or a chip system) is provided. The communications apparatus includes a processor, configured to implement a function in any one of the foregoing aspects. In a possible design, the communications apparatus further includes a memory. The memory is configured to store necessary program instructions and data. When the communications apparatus is a chip system, the communications apparatus may include a chip, or may include a chip and another discrete component.

For technical effects brought by any design manner of the second aspect to the seventh aspect, refer to the technical effects brought by different design manners of the first aspect. Details are not described herein again.

According to an eighth aspect, a communications system is provided. The communications system includes a first network element and a network element interacting with the first network element. The first network element is configured to perform the method for controlling use of a network slice according to the first aspect.

For a technical effect brought by the eighth aspect, refer to the technical effect brought by the first aspect. Details are not described herein again.

BRIEF DESCRIPTION OF DRAWINGS

FIG. 9A to FIG. 9C are a schematic interaction flowchart 5 of a method for controlling use of a network slice according to an embodiment of this application;

DESCRIPTION OF EMBODIMENTS

The following describes the technical solutions in embodiments of this application with reference to the accompanying drawings in the embodiments of this application. In descriptions of this application, unless otherwise specified, "l" represents an "or" relationship between associated objects. For example, A/B may represent A or B. In this application, "and/or" describes only an association relationship for describing associated objects and represents that three relationships may exist. For example, A and/or B may represent the following three cases: Only A exists, both A and B exist, and only B exists, where A or B may be singular or plural. In addition, in the descriptions of this application, "a plurality of" means two or more than two unless otherwise specified. "At least one of the following items (pieces)" or a similar expression thereof refers to any combination of these items, including any combination of a single item (piece) or plural items (pieces). For example, at least one (piece) of a, b, or c may indicate: a, b, c, a and b, a and c, b and c, or a, b, and c, where a, b, and c may be singular or plural. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference. In addition, in the embodiments of this application, the word such as "example" or "for example" is used to represent giving an example, an illustration, or a description. Any embodiment or design scheme described as "in an example" or "for example" in the embodiments of this application should not be explained as being more preferred or having more advantages than another embodiment or design scheme. Exactly, use of the word such as "example" or "for example" is intended to present a relative concept in a specific manner for ease of understanding.

In addition, a network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of new service scenarios, the technical solutions provided in the embodiments of this application are also applicable to similar technical problems.

Figure 1:
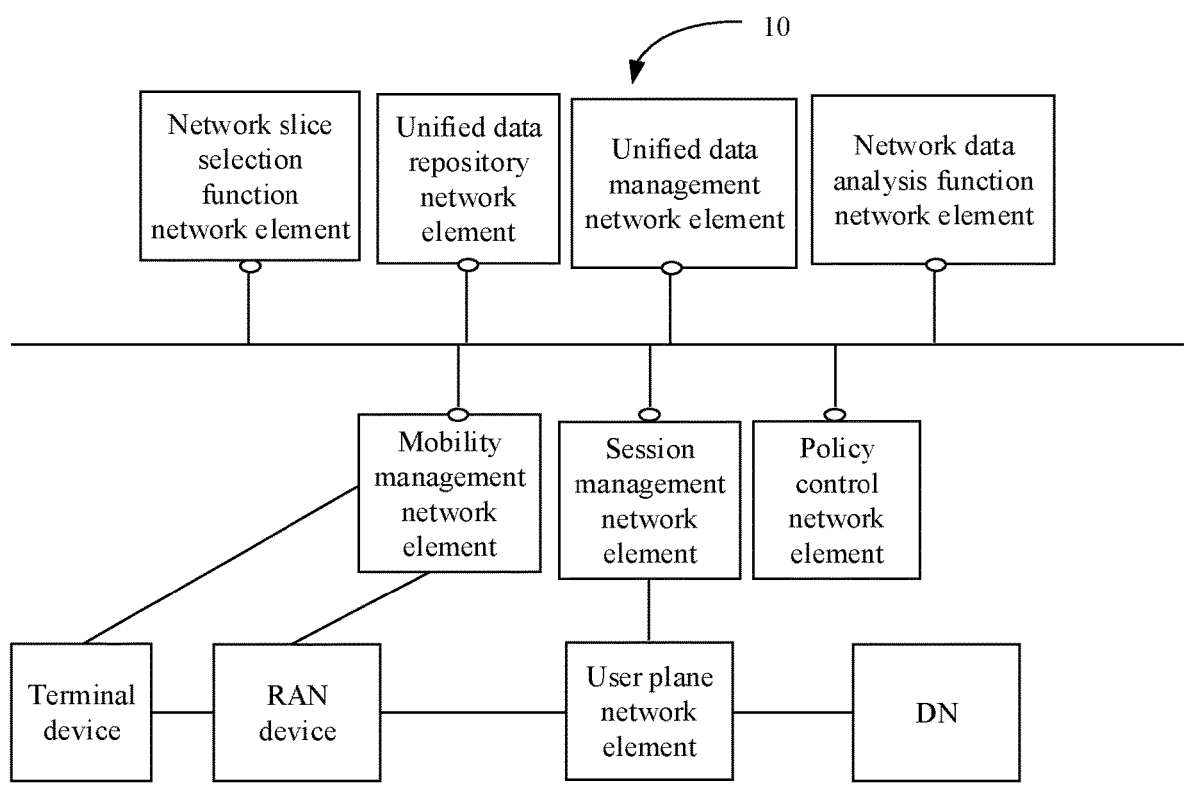
FIG. 1 is a schematic diagram of a structure of a communications system according to an embodiment of this application.

FIG. 1 shows a communications system 10 according to an embodiment of this application. The communications system 10 includes a first network element. The first network element may be, for example, a mobility management network element, a policy control network element, or a session management network element.

Optionally, as shown in FIG. 1, the communications system 10 may further include one or more of an access network (RAN) device, a slice selection function network element, a unified data repository network element, a unified data management network element, a network data analysis function network element, a user plane network element, or a data network (DN) connected to an operator network. Network elements such as the policy control network element, the network slice selection network element, or the unified data management network element are connected to a service bus. A terminal device may send service data to the DN or receive service data from the DN by using the RAN device and the user plane network element. The following describes the foregoing devices or network elements separately.

Optionally, the terminal device in this embodiment of this application may be a device configured to implement a wireless communication function, for example, a terminal or a chip that may be used in the terminal, which may be deployed on a land, including indoor, outdoor, handheld, or in-vehicle forms, or may be deployed on a water surface (such as a ship), or may be deployed in air (for example, on an airplane, a balloon, or a satellite). The terminal may be user equipment (UE), an access terminal, a terminal unit, a terminal station, a mobile station, a remote station, a remote terminal, a mobile device, a wireless communications device, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a VR terminal device, an AR terminal device, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, or the like. The terminal may be mobile or fixed.

Optionally, the access network device in this embodiment of this application is configured to be responsible for radio-side access of the terminal device. A possible deployment form includes a scenario in which a centralized unit (CU) and a distributed unit (DU) are separate and a single-site scenario. In the separate scenario, the CU supports protocols such as a radio resource control (RRC), a packet data convergence protocol (PDCP), and a service data adaptation protocol (SDAP). The DU mainly supports a radio link control (RLC) layer protocol, a media access control (MAC) layer protocol, and a physical layer protocol. In the single-site scenario, a single site may include a new radio NodeB (gNB), an evolved NodeB (eNB), a radio network controller (RNC), a NodeB (NB), a base station controller (BSC), a base transceiver station (BTS), a home base station, a baseband unit (BBU), a transmission and reception point (TRP), a transmission point (TP), a mobile switching center, and the like.

Optionally, the mobility management network element in this embodiment of this application is mainly configured for attachment, mobility management, and tracking area update procedures of the terminal device in a mobile network. The mobility management network element terminates non-access stratum (NAS) messages, completes registration management, connection management, reachability management, allocation of tracking area lists (TA lists), mobility management, and the like, and transparently routes session management (SM) messages to the session management network element. In a 5G communications system, the mobility management network element may be an access and mobility management function (AMF) network element. In future communication, for example, sixth generation (6G) communication, the mobility management network element may still be an AMF network element or have another name. This is not limited in this embodiment of this application.

Optionally, the session management network element in this embodiment of this application is mainly configured for session management in the mobile network, for example, session establishment, modification, and release. A specific function is, for example, allocating an internet protocol (IP) address to a user, or selecting a user plane network element that provides a packet forwarding function. In the 5G communications system, the session management network element may be a session management function (SMF) network element. In future communication, for example, 6G communication, the session management network element may still be an SMF network element, or may have another name. This is not limited in this embodiment of this application.

Optionally, the user plane network element in this embodiment of this application is mainly responsible for processing user packets, for example, forwarding, charging, and lawful interception. The user plane network element may also be referred to as a protocol data unit (PDU) session anchor (PSA). In a 5G communications system, the user plane network element may be a user plane function (UPF) network element. In future communication, for example, 6G communication, the user plane network element may still be a UPF network element, or may have another name. This is not limited in this embodiment of this application.

Optionally, the slice selection function network element in this embodiment of this application is configured to select a network slice for the terminal device, and the like. In a 5G communications system, the slice selection function network element may be a network slice selection function (NSSF) network element. In future communication, for example, 6G communication, the network slice selection function network element may still be the NSSF network element, or may have another name. This is not limited in this embodiment of this application.

Optionally, the policy control network element in this embodiment of this application includes a user subscription data management function, a policy control function, a charging policy control function, quality of service (QoS) control, and the like, which is a unified policy framework configured to guide network behavior, and provides policy rule information and the like for a control plane function network element (such as the AMF network element). In the 5G communications system, the policy control network element may be a policy control function (PCF) network element. In future communication, for example, 6G communication, the policy control function network element may still be the PCF network element, or may have another name. This is not limited in this embodiment of this application.

Optionally, the unified data management network element in this embodiment of this application is configured to be responsible for subscription information management of the terminal device, and the like. In a 5G communications system, the unified data management network element may be a unified data management (UDM) network element. In future communication, for example, 6G communication, the unified data management network element may still be the UDM network element, or may have another name. This is not limited in this embodiment of this application.

Optionally, the unified data repository network element in this embodiment of this application is configured to store and query structured data. The structured data is data of a structure and semantics defined in a standard. Each party may understand, according to the standard, a meaning represented by the data. The unified data repository network element may store and query subscription data by using the unified data management network element, may store or query policy data by using the policy control network element, or may store and query application related data by using an application function network element directly or the network exposure function network element. In a 5G communications system, the unified data repository network element may be a UDR network element. In future communication, for example, 6G communication, the unified data repository network element may still be the UDR network element, or may have another name. This is not limited in this embodiment of this application.

Optionally, the network data analysis function network element in this embodiment of this application may collect data from network functions (NF), for example, the policy control network element, the session management network element, the user plane network element, an access management network element, and the application function network element (by using a network capability exposure function network element), and perform analysis and prediction. In a 5G communications system, the network data analysis network element may be a network data analytics function (NWDAF) network element. In future communication, for example, 6G communication, the network data analysis network element may still be an NWDAF network element, or may have another name. This is not limited in this embodiment of this application.

Optionally, the data network in this embodiment of this application provides a data transmission service for a terminal, and may be a public data network (PDN) network, for example, the internet.

Figure 2:
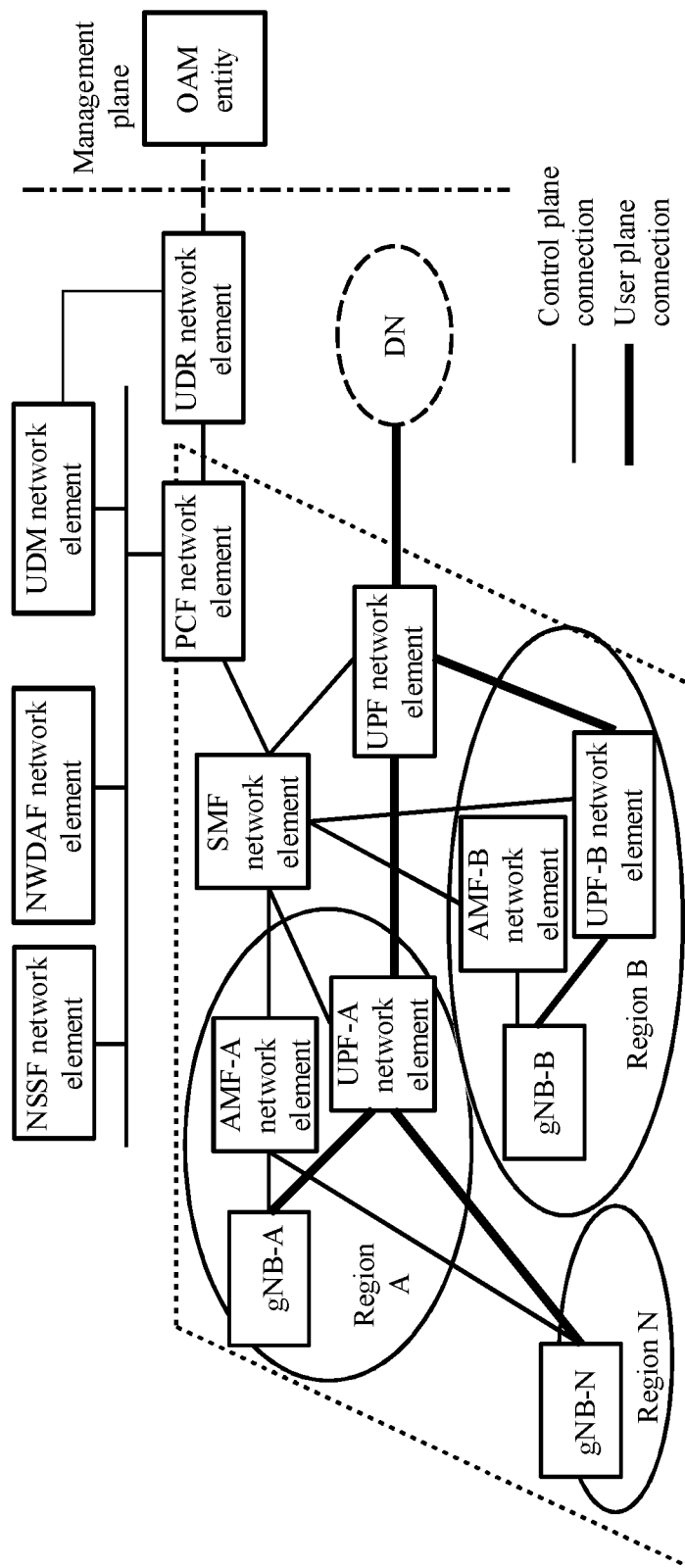
FIG. 2 is a schematic diagram of application of the communications system shown in FIG. 1 in a 5G network.
Figure 5A:
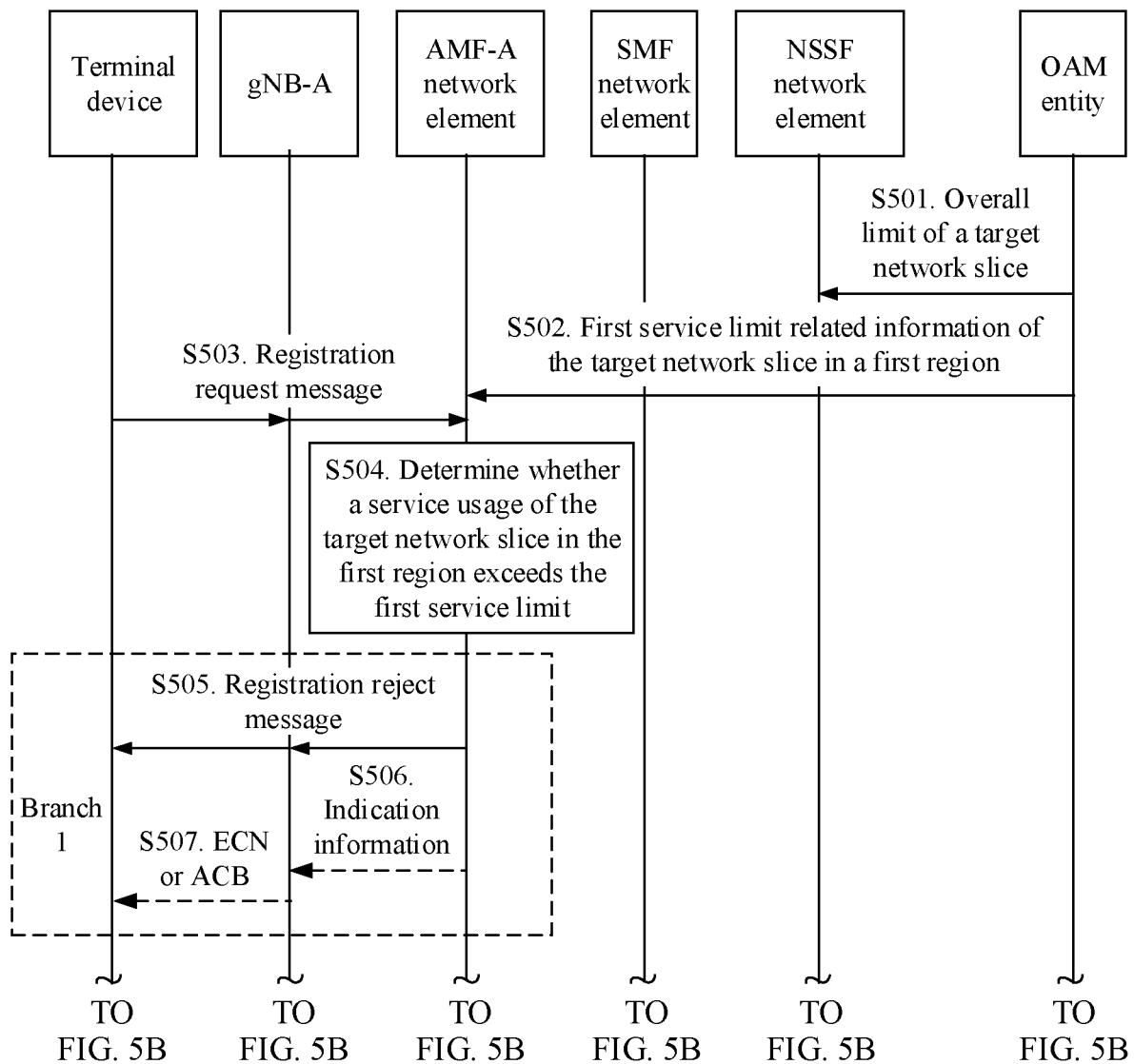
FIG. 5A and FIG. 5B are a schematic interaction flowchart 1 of a method for controlling use of a network slice according to an embodiment of this application.
Figure 5B:
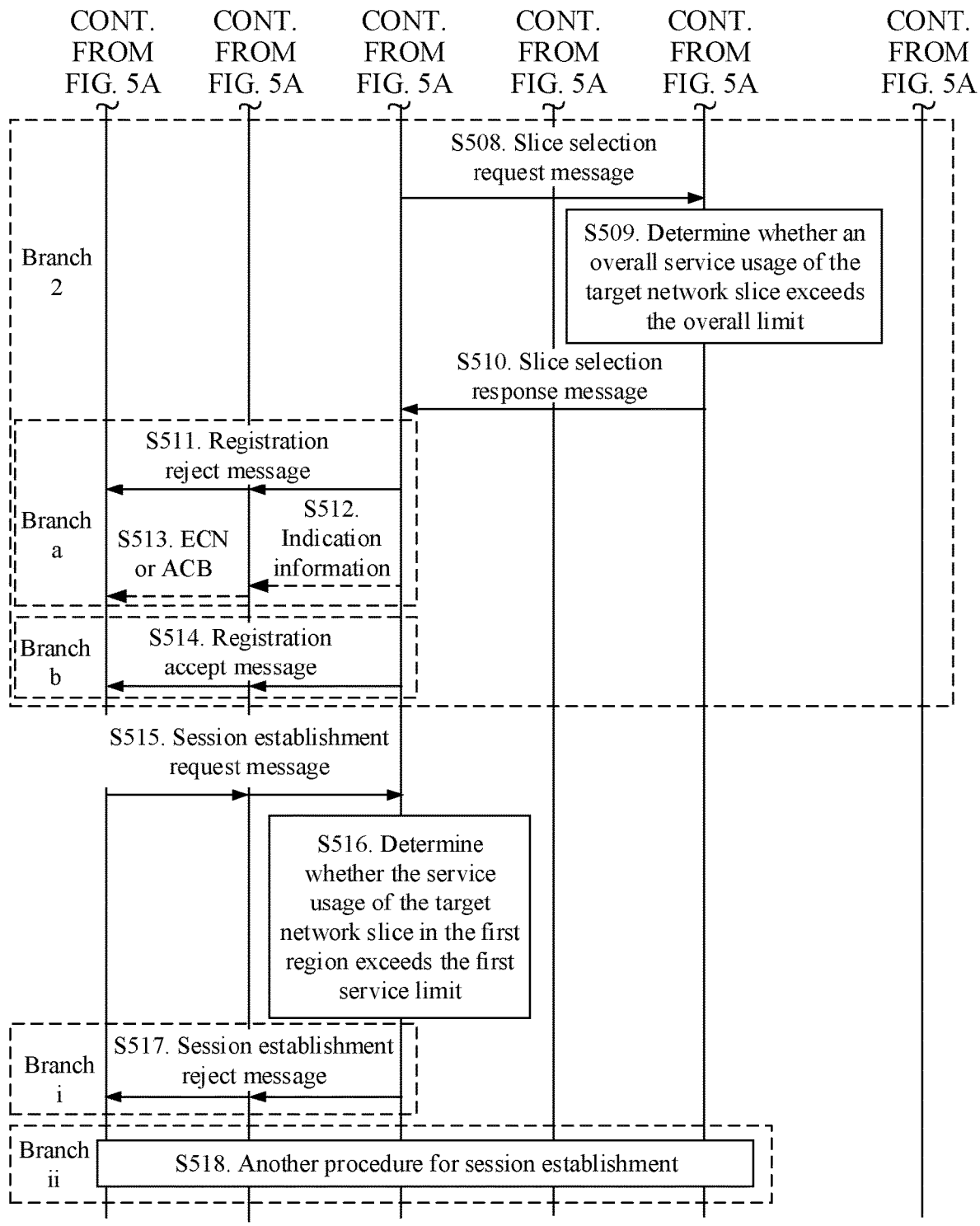

A 5G communications system is used as an example. FIG. 2 is a schematic diagram of a possible network architecture to which an embodiment of this application is applicable and that corresponds to the communications system shown in FIG. 1. A network element or entity corresponding to the access network device may be a RAN device in the 5G communications system (FIG. 5A and FIG. 5B show an example in which the RAN device is a gNB). A network element or entity corresponding to the mobility management network element may be an AMF network element in the 5G communications system. A network element or entity corresponding to the session management network element may be an SMF network element in the 5G communications system. A network element or entity corresponding to the user plane network element may be a UPF network element in the 5G communications system. A network element or entity corresponding to the policy control network element may be a PCF network element in the 5G communications system. A network element or entity corresponding to the slice selection function network element may be an NSSF network element in the 5G communications system. A network element or entity corresponding to the unified data repository network element may be a UDR network element in the 5G communications system. A network element or entity corresponding to the unified data management network element may be a UDM network element in the 5G communications system. A network element or entity corresponding to the network data analysis function network element may be an NWDAF network element in the 5G communications system. In addition to communicating with a network element in the 5G communications system, the UDR network element, the AMF network element, the SMF network element, and the NSSF network element may further communicate with an operation, administration and maintenance entity on a management plane (FIG. 2 merely shows a connection relationship between the UDR network element and the OAM entity as an example).

Network elements such as the NSSF network element, the NWDAF network element, the UDM network element, the UDR network element, and the AMF network element are usually shared by a plurality of network slices. The SMF network element and the UPF network element generally belong to a specific network slice. The gNB on the radio access side is usually also shared by a plurality of network slices. According to the third generation partnership project (3GPP) technology standard (TS) 23.541, a minimum occupation percentage of resources that need to be reserved and a maximum occupation percentage of resources that are allowed to be used may be configured on the gNB for a network slice.

One network slice may cover a plurality of regions. In the communications system shown in FIG. 2, a service region of an entire network slice is divided into a region A, a region B, . . . , and a region N. Each region may be one or more cells, or may be one or more TAs, or may be a service region of an AMF network element, an SMF network element, or a UPF network element. Correspondingly, there may be a plurality of gNBs (such as a gNB-A in the region A, a gNB-B in the region B, and a gNB-N in the region N in FIG. 2), a plurality of AMF network elements (such as an AMF-A network element in the region A and an AMF-B network element in the region B in FIG. 2), or a plurality of UPF network elements (such as a UPF network element, a UPF-A network element in the region A, and a UPF-B network element in the region B in FIG. 2) in the entire service region of the network slice. Each gNB has a specific coverage region, which may be one or more cells. Each cell has a unique cell identity (ID). Each AMF network element also has a region that can be served, which may be one or more TAs. Each TA includes one or more cells, each TA corresponds to one tracking area identity (TAI), and each cell corresponds to one cell identity (cell ID). In addition, each UPF network element also has a region that can be served. In particular, some UPF network elements (such as the UPF network element in FIG. 2) deployed at a mobile edge computing (MEC) location have a service region whose size is a region covered by one or more gNBs.

Each region of the network slice has some region-restricted network resources. These restricted network resources can only provide a service for a terminal device in the region, and cannot provide a service for a terminal device in another region. In addition, these network resources are limited, which becomes a resource bottleneck of a maximum network service capability in the region. The region-restricted network resource may be a gNB in FIG. 2, for example, the gNB-A in FIG. 2, or may be a UPF network element, for example, the UPF-B network element in FIG. 2. When creating and deploying a network slice, an operator first determines, based on a customer requirement, a terminal density that needs to be supported by the entire network slice (that is, all terminal densities that need to be supported by regions are the same), or a terminal density that needs to be supported by each region (that is, terminal densities that need to be supported by regions may be different). Then, the operator determines, based on a terminal density that needs to be supported by a region, a quantity of region-restricted network resources of the network slice. For example, when a gNB shared by a plurality of network slices is a region-restricted network resource, based on a registered terminal density and a session density that need to be supported by a newly deployed network slice, maximum quantity of radio resources allowed to be used by the network slice or a maximum occupation percentage of radio resources of the entire gNB is determined. If a dedicated UPF network element in a newly created network slice is a region-restricted network resource, a quantity of UPF network element resources that need to be deployed is determined based on a session density that needs to be supported by the newly deployed slice, an area of a region, and a guaranteed bandwidth of each terminal, or a quantity of UPF network element resources that need to be deployed is determined based on a total bandwidth of data service traffic of the network slice in the region.

Optionally, the first network element in this embodiment of this application may also be referred to as a communications apparatus, which may be a general device or a dedicated device. This is not specifically limited in this embodiment of this application.

Optionally, a related function of the first network element in this embodiment of this application may be implemented by one device, or may be jointly implemented by a plurality of devices, or may be implemented by one or more functional modules in one device. This is not specifically limited in this embodiment of this application. It may be understood that the foregoing function may be a network element in a hardware device, a software function running on dedicated hardware, a combination of hardware and software, or a virtualization function instantiated on a platform (for example, a cloud platform).

Figures 3, 4:
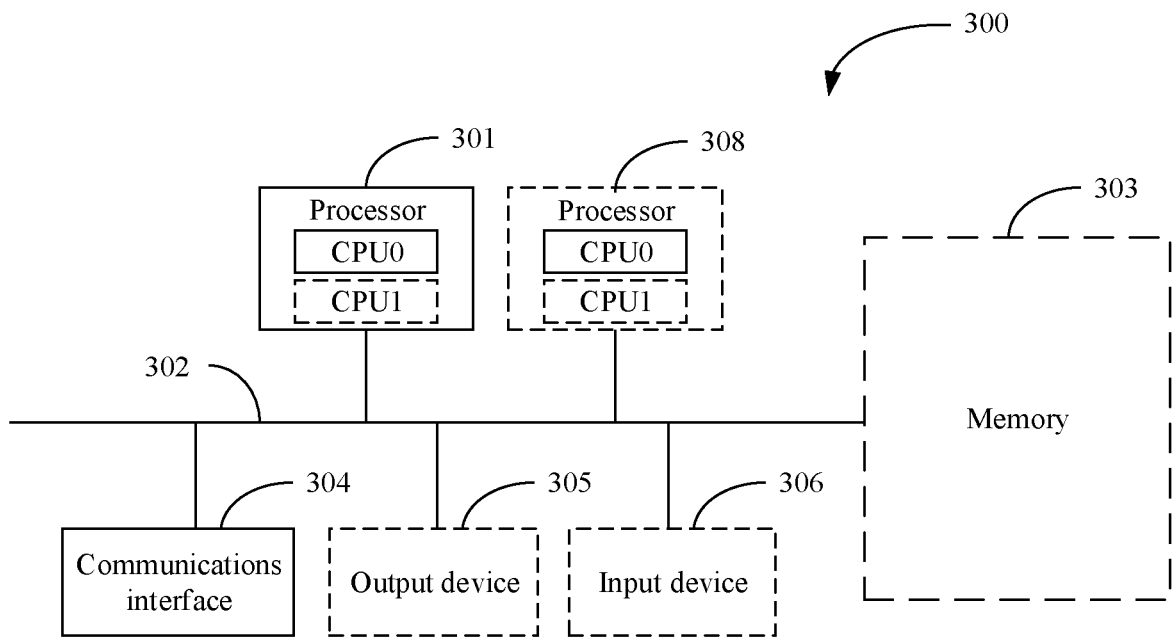
FIG. 3 is a schematic diagram of a structure of a communications device according to an embodiment of this application.
FIG. 4 is a schematic flowchart of a method for controlling use of a network slice according to an embodiment of this application.

For example, related functions of the first network element in this embodiment of this application may be implemented by using a communications device 300 in FIG. 3. FIG. 3 is a schematic diagram of a structure of the communications device 300 according to an embodiment of this application. The communications device 300 includes one or more processors 301, a communications line 302, and at least one communications interface (in FIG. 3, only an example in which a communications interface 304 and one processor 301 are included is used for description). Optionally, the communications device 300 may further include a memory 303.

The processor 301 may be a general-purpose central processing unit (CPU), a microprocessor, an application-specific integrated circuit (ASIC), or one or more integrated circuits configured to control program execution of the solutions in this application.

The communications line 302 may include a path used to connect different components.

The communications interface 304 may be a transceiver module configured to communicate with another device or a communications network such as the Ethernet, a RAN, or a wireless local area network (WLAN). For example, the transceiver module may be an apparatus such as a transceiver. Optionally, the communications interface 304 may alternatively be a transceiver circuit located inside the processor 301, and is configured to implement signal input and signal output of the processor.

The memory 303 may be an apparatus having a storage function. For example, the memory 303 may be a read-only memory (ROM) or another type of static storage device that can store static information and instructions, or a random access memory (RAM) or another type of dynamic storage device that can store information and instructions. The memory 303 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), magnetic disk storage medium or another magnetic storage device, or any other medium that can be used to carry or store expected program code in a form of instructions or a data structure and that is accessible by a computer, but is not limited thereto. The memory may exist independently, and is connected to the processor through the communications line 302. The memory may alternatively be integrated with the processor.

The memory 303 is configured to store computer-executable instructions for executing the solutions of this application, and the processor 301 controls the execution. The processor 301 is configured to execute the computer-executable instructions stored in the memory 303, to implement the method for controlling use of a network slice that is provided in the embodiments of this application.

Alternatively, optionally, in this embodiment of this application, the processor 301 may perform a processing related function in the method for controlling use of a network slice that is provided in the following embodiment of this application, and the communications interface 304 is responsible for communicating with another device or a communications network. This is not specifically limited in this embodiment of this application.

Optionally, the computer-executable instructions in this embodiment of this application may also be referred to as application program code. This is not specifically limited in this embodiment of this application.

During specific implementation, in an embodiment, the processor 301 may include one or more CPUs, for example, a CPU 0 and a CPU 1 in FIG. 3.

During specific implementation, in an embodiment, the communications device 300 may include a plurality of processors, for example, the processor 301 and a processor 308 in FIG. 3. Each of these processors may be a single-core processor or a multi-core processor. The processor herein may include but is not limited to at least one of the following various computing devices that run software: a central processing unit (CPU), a microprocessor, a digital signal processor (DSP), a microcontroller unit (MCU), an artificial intelligence processor, or the like. Each computing device may include one or more cores configured to perform an operation or processing by executing software instructions.

During specific implementation, in an embodiment, the communications device 300 may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, a projector, or the like. The input device 306 communicates with the processor 301, and may receive an input of a user in a plurality of manners. For example, the input device 306 may be a mouse, a keyboard, a touchscreen device, or a sensor device.

The communications device 300 may also be referred to as a communications apparatus sometimes, and may be a general-purpose device or a special-purpose device. For example, the communications device 300 may be a desktop computer, a portable computer, a network server, a personal digital assistant PDA), a mobile phone, a tablet computer, a wireless terminal device, an embedded device, the foregoing terminal device, the foregoing network device, or a device having a structure similar to that in FIG. 3. A type of the communications device 300 is not limited in this embodiment of this application.

FIG. 4 shows a method for controlling use of a network slice according to an embodiment of this application. The method includes the following steps.

S401. A first network element receives a first message, where the first message is used to request access of a terminal device to a target network slice, the target network slice covers a plurality of regions, the plurality of regions include a first region, and the first region is a region in which the terminal device is currently located.

S402. The first network element determines, based on a first condition, whether to allow the terminal device to access the target network slice, where the first condition includes: whether a service usage of the target network slice in the first region exceeds a first service limit.

Optionally, in this embodiment of this application, that the first network element determines, based on a first condition, whether to allow the terminal device to access the target network slice may include: the first network element rejects the first message when the service usage of the target network slice in the first region reaches (which may be understood as being equal to, which is explained herein in a unified way, and not repeated below) or exceeds (which may be understood as being greater than, which is explained herein in a unified way, and not repeated below) the first service limit. Certainly, for a demarcation point at which the service usage of the target network slice in the first region reaches the first service limit, the first network element may also allow the terminal device to use the target network slice. This is explained herein in a unified way, and not repeated below.

Optionally, in this embodiment of this application, in a registration procedure of the terminal device, the service usage of the target network slice in the first region includes an actual quantity of registered terminals of the target network slice in the first region, and the first service limit includes a maximum quantity of registered terminals allowed by the target network slice in the first region. In a session establishment procedure of the terminal device, the service usage of the target network slice in the first region includes an actual quantity of concurrent sessions of the target network slice in the first region, and the first service limit includes a maximum quantity of concurrent sessions allowed by the target network slice in the first region. Alternatively, the service usage of the target network slice in the first region includes an actual traffic bandwidth of the target network slice in the first region, and the first service limit includes a maximum traffic bandwidth allowed by the target network slice in the first region. This is explained herein in a unified way, and not repeated below.

Optionally, the first condition in this embodiment of this application further includes: whether an overall service usage of the target network slice exceeds an overall limit.

In a possible implementation, that the first network element determines, based on a first condition, whether to allow the terminal device to access the target network slice may include: the first network element rejects the first message when the service usage of the target network slice in the first region does not exceed the first service limit, but the overall service usage of the target network slice reaches or exceeds the overall limit. The "not exceed" herein may be understood as being less than or understood as being less than or equal to. The explanation is also applicable to the following other embodiments, which is provided herein in a unified way, and not repeated below.

In another possible implementation, that the first network element determines, based on a first condition, whether to allow the terminal device to access the target network slice may include: when the overall service usage of the target network slice reaches or exceeds the overall limit, but the service usage of the target network slice in the first region does not exceed the first service limit, if a second condition is met, the first network element allows the terminal device to use the target network slice. The second condition herein may be understood as a determining condition for network running information or user information obtained by the first network element from an OAM entity or another network element.

Optionally, in this embodiment of this application, in the registration procedure of the terminal device, the overall service usage of the target network slice includes an actual overall quantity of registered terminals of the target network slice, and the overall limit of the target network slice includes an overall maximum quantity of registered terminals allowed by the target network slice. In the session establishment procedure of the terminal device, the overall service usage of the target network slice includes an actual overall quantity of concurrent sessions of the target network slice, and the overall limit of the target network slice includes an overall maximum quantity of concurrent sessions allowed by the target network slice. Alternatively, the overall service usage of the target network slice includes an actual overall traffic bandwidth of the target network slice, and the overall limit of the target network slice includes an overall maximum traffic bandwidth allowed by the target network slice. This is explained herein in a unified way, and not repeated below.

Specific implementation of the foregoing solution is described below in detail with reference to a specific scenario in an interaction embodiment shown in any one of FIG. 5A and FIG. 5B to FIG. 11A and FIG. 11B, and details are not described herein.

Because the target network slice in this embodiment of this application covers a plurality of regions, the first network element may determine, based on the first condition, whether to allow the terminal device to access the target network slice. In one aspect, the first condition includes: whether the service usage of the target network slice in the first region exceeds the first service limit. In other words, in this embodiment of this application, region-based control of access to the network slice is implemented. Therefore, a problem that a radio-side network node in a region is congested or overloaded, which cannot ensure service quality of the network slice, and may further affect service quality of another network slice can be avoided. In this way, excessive use of network slice resources by a customer can be limited, and the service quality of the network slice can be ensured. In another aspect, the first condition may further include: whether the overall service usage of the target network slice exceeds the overall limit. Further, when the overall service usage of the target network slice reaches or exceeds the overall limit, but the service usage of the target network slice in the first region does not exceed the first service limit, if the second condition is met, the first network element allows the terminal device to use the target network slice. In other words, when the overall service usage of the target network slice reaches or exceeds the overall limit, but the service usage of the target network slice in the first region does not exceed the first service limit, in a specific scenario, a user may be allowed to use a resource of the target network slice in the first region, to improve network resource utilization. This can bring more economic benefits to an operator, and improve service experience of a high-value user.

The following specifically describes, with reference to FIG. 1 to FIG. 4, the method for controlling use of a network slice that is provided in this embodiment of this application.

It should be noted that this embodiment of this application is not limited to the 5G network architecture shown in FIG. 2, and may alternatively be applied to another communications system in the future, such as a 6G network architecture. In addition, a name of each network element used in this embodiment of this application may remain a same function in a future communications system, but the name may change.

It should be noted that names of messages between network elements, names of parameters in the messages, or the like in the following embodiments of this application are merely examples, and there may be other names during specific implementation. This is not specifically limited in the embodiments of this application.

First, for example, the first network element in the communications system shown in FIG. 1 is a mobility management network element, the communications system shown in FIG. 1 is applied to the 5G network architecture shown in FIG. 2, and the first region is the region A in FIG. 2. FIG. 5A and FIG. 5B show a method for controlling use of a network slice according to an embodiment of this application, including the following steps.

S501. An OAM entity sends an overall limit of a target network slice to an NSSF network element. Correspondingly, the NSSF network element receives the overall limit of the target network slice from the OAM entity.

For related descriptions of the overall limit of the target network slice, refer to the embodiment shown in FIG. 4. Details are not described herein again.

S502. The OAM entity sends, to an AMF network element in each region covered by the target network slice, service limit related information of the target network slice in each region. Correspondingly, the AMF network element in each region covered by the target network slice receives, from the OAM entity, the service limit related information of the target network slice in each region. FIG. 5A and FIG. 5B merely show an example for description, in which the OAM entity sends first service limit related information of the target network slice in a first region (that is, the region A) covered by the target network slice to an AMF-A network element in the first region. Correspondingly, the AMF-A network element receives, from the OAM entity, the first service limit related information of the target network slice in the first region.

Optionally, in this embodiment of this application, the first service limit related information includes a first service limit or information used to determine the first service limit. For related descriptions of the first service limit, refer to the embodiment shown in FIG. 4. Details are not described herein again.

For example, in this embodiment of this application, information used to determine the maximum quantity of registered terminals allowed by the target network slice in the first region may include, for example, a terminal density supported by the target network slice. Based on the terminal density supported by the target network slice and an area (which may be configured on the corresponding AMF network element in advance) of the first region, the maximum quantity of registered terminals allowed by the target network slice in the first region may be determined. It should be noted that, in this embodiment of this application, terminal densities supported by the target network slice that are configured by the OAM entity on AMF network elements in regions covered by the target network slice may be the same, or may be different. This is not specifically limited in this embodiment of this application.

For example, in this embodiment of this application, information used to determine the maximum quantity of concurrent sessions allowed in the first region may include, for example, a concurrent session density supported by the target network slice. Based on the concurrent session density supported by the target network slice and the area (which may be configured on the corresponding AMF network element in advance) of the first region, the maximum quantity of concurrent sessions allowed by the target network slice in the first region may be determined. It should be noted that, in this embodiment of this application, concurrent session densities supported by the target network slice that are configured by the OAM entity on AMF network elements in regions covered by the target network slice may be the same, or may be different. This is not specifically limited in this embodiment of this application.

For example, in this embodiment of this application, information used to determine the maximum traffic bandwidth allowed in the first region may include, for example, a traffic density supported by the target network slice. Based on the traffic density supported by the target network slice and the area (which may be configured on a corresponding SMF network element in advance) of the first region, the maximum traffic bandwidth allowed by the target network slice in the first region may be determined. It should be noted that, in this embodiment of this application, traffic densities supported by the target network slice that are configured by the OAM entity on SMF network elements in regions covered by the target network slice may be the same, or may be different. This is not specifically limited in this embodiment of this application.

It should be noted that, in this embodiment of this application, step S501 and step S502 are not necessarily performed in a specific order. Step S501 may be performed first and then step S502 is performed. Alternatively, step S502 may be performed first and then step S501 is performed. Alternatively, step S501 and step S502 may be performed simultaneously. This is not specifically limited in this embodiment of this application.

S503. A terminal device sends a message a1 to the AMF-A network element in a service region of the AMF-A network element by using a gNB-A. Correspondingly, the AMF-A network element receives the message a1 from the terminal device.

The message a1 carries network slice selection assistance information (NSSAI) requested by the terminal device (namely, request NSSAI). The request NSSAI includes single NSSAI (S-NSSAI) of one or more network slices that the terminal device expects to register with and access.

In addition, the message a1 may further carry an identity of a TA and/or an identity of a cell cell in which the terminal device is currently located. This is not specifically limited in this embodiment of this application.

For example, the message a1 in this embodiment of this application may be, for example, a registration request message shown in FIG. 5A and FIG. 5B. This is not specifically limited in this embodiment of this application.

S504. The AMF-A network element determines whether a service usage of the target network slice in the first region exceeds the first service limit.

The AMF-A network element may determine, based on the identity of the TA and/or the identity of the cell cell in which the terminal device is currently located, the region in which the terminal device is currently located (that is, the first region in this embodiment of this application).

The AMF-A network element may determine, based on each piece of S-NSSAI carried in the request NSSAI, a target network slice that the terminal device expects to register with and access. For example, if the terminal device does not have network slice subscription information corresponding to a piece of S-NSSAI, the AMF-A network element rejects registration of the terminal device with a network slice corresponding to the S-NSSAI. If the terminal device has network slice subscription information corresponding to a piece of S-NSSAI, a network slice corresponding to the S-NSSAI may be used as a target network slice.

In this embodiment of this application, in a registration procedure of the terminal device, the service usage of the target network slice in the first region includes an actual quantity of registered terminals of the target network slice in the first region. In a registration management process, the AMF-A network element maintains an actual quantity of registered terminals of each currently served network slice in each region managed by the AMF-A network element, including the actual quantity of registered terminals of the target network slice in the first region. Further, the AMF-A network element may compare the actual quantity of registered terminals of the target network slice in the first region with the maximum quantity, determined in step S502, of registered terminals allowed by the target network slice in the first region. When the actual quantity of registered terminals of the target network slice in the first region reaches or exceeds the maximum quantity of registered terminals allowed by the target network slice in the first region, a branch 1 corresponding to the following step S505 is performed. When the actual quantity of registered terminals of the target network slice in the first region does not exceed the maximum quantity of registered terminals allowed by the target network slice in the first region, a branch 2 corresponding to the following step S508 and subsequent steps is performed. For a demarcation point at which the actual quantity of registered terminals of the target network slice in the first region is equal to (that is, "reaches" mentioned above) the maximum quantity of registered terminals allowed by the target network slice in the first region, the branch 1 corresponding to the following step S505 may be performed, or the branch 2 corresponding to the following step S508 and subsequent steps may be performed. This is not specifically limited in this embodiment of this application.

Branch 1:

S505. The AMF-A network element sends a message b1 to the terminal device by using the gNB-A. Correspondingly, the terminal device receives the message b1 from the AMF-A network element.

The message b1 carries S-NSSAI of the target network slice, and is used to temporarily reject registration of the terminal device with the target network slice at a current location, and allow the terminal device to continue to attempt to request registration with the target network slice after changing a location region or waiting for a period of time.

For example, the message b1 in this embodiment of this application may be, for example, a registration reject message shown in FIG. 5A and FIG. 5B. This is not specifically limited in this embodiment of this application.

Optionally, in this embodiment of this application, when the actual quantity of registered terminals of the target network slice in the first region reaches or exceeds the maximum quantity of registered terminals allowed by the target network slice in the first region, the following steps S506 and S507 may be further performed.

S506. The AMF-A network element sends indication information to the gNB-A.

Correspondingly, the gNB-A receives the indication information from the AMF-A network element.

The indication information is used to indicate the gNB-A to set access class barring (ACB) for an access class (AC) corresponding to the target network slice. Alternatively, the indication information is used to indicate the gNB-A to broadcast an explicit congestion notification (ECN) to terminal devices located in the region, to notify the terminal devices in the region of congestion of the target network slice.

S507. The gNB-A sends the ECN or the ACB to the terminal devices in the region based on the indication information, to prevent the terminal devices in the region from continuing to attempt access to the target network slice (FIG. 5A and FIG. 5B show interaction between the gNB-A and the terminal device that currently attempts access as an example).

Branch 2:

S508. The AMF-A network element sends a message c1 to an NSSF network element periodically, or when a quota of a service usage in the first region is exhausted (or is about to be exhausted), or when no slice selection result for the S-NSSAI of the target network slice is effectively cached. The NSSF network element receives the message c1 from the AMF-A network element.

The message c1 carries the actual quantity of registered terminals of the target network slice in the first region. Optionally, the message c1 may further carry the actual quantity of concurrent sessions of the target network slice in the first region.

For example, the message c1 in this embodiment of this application may be, for example, a slice selection request message shown in FIG. 5A and FIG. 5B. This is not specifically limited in this embodiment of this application.

Similarly, an AMF network element in another region covered by the target network slice (such as the AMF-B in the region B in FIG. 2) may also report an actual quantity of registered terminals of the target network slice in the another region to the NSSF network element. Optionally, the AMF network element in the another region covered by the target network slice (such as the AMF-B in the region B in FIG. 2) may also report an actual quantity of concurrent sessions of the target network slice in the another region to the NSSF network element.

S509. The NSSF network element determines whether an overall service usage of the target network slice exceeds the overall limit.

In this embodiment of this application, in the registration procedure of the terminal device, the overall service usage of the target network slice includes an actual overall quantity of registered terminals of the target network slice. After obtaining an actual quantity, reported by the AMF network element in each region covered by the target network slice, of registered terminals of the target network slice in each region, the NSSF network element may sum up actual quantities of registered terminals of the target network slice in all the regions, and then compare a summation result with the overall maximum quantity, obtained in step S501, of registered terminals allowed by the target network slice. When the actual overall quantity of registered terminals of the target network slice reaches or exceeds the overall maximum quantity of registered terminals allowed by the target network slice, a quota of a quantity of registered terminals in each region covered by the target network slice may be set to 0. When the actual overall quantity of registered terminals of the target network slice does not exceed the overall maximum quantity of registered terminals allowed by the target network slice, an overall remaining quantity of registered terminals (or a part of the overall remaining quantity of registered terminals) may be allocated based on a percentage of the actual quantity of registered terminals in each region to obtain a quota of a quantity of registered terminals in each region.

In this embodiment of this application, in a session establishment procedure of the terminal device, the overall service usage of the target network slice includes an actual overall quantity of concurrent sessions of the target network slice. After obtaining an actual quantity, reported by the AMF network element in each region covered by the target network slice, of concurrent sessions of the target network slice in each region, the NSSF network element may sum up actual quantities of concurrent sessions of the target network slice in all the regions, and then compare a summation result with the overall maximum quantity, obtained in step S501, of concurrent sessions allowed by the target network slice. When the actual overall quantity of concurrent sessions of the target network slice reaches or exceeds the overall maximum quantity of concurrent sessions allowed by the target network slice, a quota of a quantity of concurrent sessions in each region covered by the target network slice may be set to 0. When the actual overall quantity of concurrent sessions of the target network slice does not exceed the overall maximum quantity of concurrent sessions allowed by the target network slice, an overall remaining quantity of concurrent sessions (or a part of the overall remaining quantity of concurrent sessions) may be allocated based on a percentage of the actual quantity of concurrent sessions in each region to obtain a quota of a quantity of concurrent sessions in each region.

S510. The NSSF network element sends a message d1 to the AMF-A network element. Correspondingly, the AMF-A network element receives the message d1 from the NSSF network element.

The message d1 carries a quota of a service usage in the first region. The quota of the service usage in the first region may include, for example, a quota of a quantity of registered terminals in the first region. Optionally, the quota of the service usage in the first region may further include, for example, a quota of a quantity of concurrent sessions in the first region.

Optionally, in this embodiment of this application, after obtaining the quota of the quantity of registered terminals in the first region, the AMF-A network element may locally cache the quota of the quantity of registered terminals in the first region. Subsequently, each time a new terminal device registers with the target network slice in the first region, 1 is deducted from the cached quota of the quantity of registered terminals in the first region. When the terminal device deregisters from the target network slice or moves out of the first region, the cached quota of the quantity of registered terminals in the first region may be restored (that is, the quota is increased by 1). When the cached quota of the quantity of registered terminals in the first region is exhausted or is about to be exhausted, the AMF-A network element may further request, from the NSSF network element by using the message c1, a new quota of the quantity of registered terminals in the first region.

For example, the message d1 in this embodiment of this application may be, for example, a slice selection response message shown in FIG. 5A and FIG. 5B. This is not specifically limited in this embodiment of this application.

When the quota of the quantity of registered terminals in the first region is 0, the AMF-A network element may determine that the actual overall quantity of registered terminals of the target network slice reaches or exceeds the overall maximum quantity of registered terminals allowed by the target network slice, and then perform a branch a corresponding to the following steps S511 to S513. When the quota of the quantity of registered terminals in the first region is not 0, the AMF-A network element may determine that the actual overall quantity of registered terminals of the target network slice does not exceed the overall maximum quantity of registered terminals allowed by the target network slice, and then perform a branch b corresponding to the following step S514.

Optionally, in this embodiment of this application, when the quota of the quantity of registered terminals in the first region is 0, the message d1 may not carry the quota of the quantity of registered terminals in the first region, but carry an indication that the actual overall quantity of registered terminals of the target network slice reaches or exceeds the overall maximum quantity of registered terminals allowed by the target network slice. This is not specifically limited in this embodiment of this application.

Branch a:

S511 to S513 are the same as steps S505 to S507, and details are not described herein again.

Branch b:

S514. The AMF-A network element sends a message e1 to the terminal device by using the gNB-A. Correspondingly, the terminal device receives the message e1 from the AMF-A network element.

The message e1 carries allowed NSSAI, and the allowed NSSAI includes the S-NSSAI of the target network slice.

For example, the message e1 in this embodiment of this application may be, for example, a registration accept message shown in FIG. 5A and FIG. 5B. This is not specifically limited in this embodiment of this application.

In this embodiment of this application, after the terminal device is successfully registered, the AMF-A network element refreshes the maintained quantity of registered terminals of the target network slice in the first region, and performs deduction on the cached quota of the quantity of registered terminals in the first region. When the terminal device deregisters from the target network slice or moves out of the first region, the cached quota of the quantity of registered terminals in the first region may be restored (that is, the quota is increased by 1).

It should be noted that in this embodiment of this application, if a plurality of target network slices are determined in step S504, or the terminal device does not send the request NSSAI, but there are a plurality of subscribed default network slices (in this case, each default network slice may be used as a target network slice), each target network slice may be separately processed based on steps S504 to S514, and details are not described herein again.

Further, after the terminal device is successfully registered, the method for controlling use of a network slice that is provided in this embodiment of this application further includes a session establishment procedure shown in the following steps S515 to S517 or the following steps S515 to S518.

S515. The terminal device sends a message f1 to the AMF-A network element by using the gNB-A. Correspondingly, the AMF-A network element receives the message f1 from the terminal device.

The message f1 carries the S-NSSAI of the target network slice.

For example, the message f1 in this embodiment of this application may be, for example, a session establishment request message shown in FIG. 5A and FIG. 5B. This is not specifically limited in this embodiment of this application.

S516. The AMF-A network element determines whether the service usage of the target network slice in the first region exceeds the first service limit.

The AMF-A network element may determine, based on the identity of the TA and/or the identity of the cell cell in which the terminal device is currently located, the region in which the terminal device is currently located (that is, the first region in this embodiment of this application).

The AMF-A network element may determine, based on the S-NSSAI of the target network slice, the target network slice that the terminal device expects to access for a session.

In this embodiment of this application, in the session establishment procedure of the terminal device, the service usage of the target network slice in the first region includes an actual quantity of concurrent sessions of the target network slice in the first region. In a session management process, the AMF-A network element maintains an actual quantity of concurrent sessions of each currently served network slice in each region managed by the AMF-A network element, including the actual quantity of concurrent sessions of the target network slice in the first region. Further, the AMF-A network element may compare the actual quantity of concurrent sessions of the target network slice in the first region with the maximum quantity, determined in step S502, of concurrent sessions allowed by the target network slice in the first region. When the actual quantity of concurrent sessions of the target network slice in the first region reaches or exceeds the maximum quantity of concurrent sessions allowed by the target network slice in the first region, a branch i corresponding to the following step S517 is performed. When the actual quantity of concurrent sessions of the target network slice in the first region does not exceed the maximum quantity of concurrent sessions allowed by the target network slice in the first region, the AMF-A network element further determines whether the actual overall quantity of concurrent sessions of the target network slice exceeds the overall maximum quantity of concurrent sessions allowed by the target network slice. When the AMF-A network element determines that the actual overall quantity of concurrent sessions of the target network slice reaches or exceeds the overall maximum quantity of concurrent sessions allowed by the target network slice, the branch i corresponding to the following step S517 is performed. When the AMF-A network element determines that the actual overall quantity of concurrent sessions of the target network slice does not exceed the overall maximum quantity of concurrent sessions allowed by the target network slice, a branch ii corresponding to the following step S518 is performed. For a demarcation point at which the actual quantity of concurrent sessions of the target network slice in the first region is equal to (that is, "reaches" mentioned above) the maximum quantity of concurrent sessions allowed by the target network slice in the first region, the branch i corresponding to the following step S517 may be performed, or it may be further determined whether the actual overall quantity of concurrent sessions of the target network slice exceeds the overall maximum quantity of concurrent sessions allowed by the target network slice. For a demarcation point at which the actual overall quantity of concurrent sessions of the target network slice is equal to (that is, "reaches" mentioned above) the overall maximum quantity of concurrent sessions allowed by the target network slice, the branch i corresponding to the following step S517 may be performed, or the branch ii corresponding to the following step S518 may be performed. This is not specifically limited in this embodiment of this application.

Optionally, in this embodiment of this application, in step S510, after obtaining the quota of the quantity of concurrent sessions in the first region, the AMF-A network element may locally cache the quota of the quantity of concurrent sessions in the first region. Subsequently, each time a new session is successfully established in the first region, 1 is deducted from the cached quota of the quantity of concurrent sessions in the first region. When the session is released or the session is switched out of the first region due to movement of the terminal device, the cached quota of the quantity of concurrent sessions in the first region may be restored (that is, the quota is increased by 1). When the cached quota of the quantity of concurrent sessions in the first region is exhausted or is about to be exhausted, the AMF-A network element may further request, from the NSSF network element by using the message c1, a new quota of the quantity of concurrent sessions in the first region.

When the quota of the quantity of concurrent sessions in the first region is 0, the AMF-A network element may determine that the actual overall quantity of concurrent sessions of the target network slice reaches or exceeds the overall maximum quantity of concurrent sessions allowed by the target network slice. When the quota of the quantity of concurrent sessions in the first region is not 0, the AMF-A network element may determine that the actual overall quantity of concurrent sessions of the target network slice does not exceed the overall maximum quantity of concurrent sessions allowed by the target network slice.

It should be noted that, in this embodiment of this application, if the AMF-A network element does not obtain the quota of the quantity of concurrent sessions in the first region in step S509 and step S510, in a session establishment process of the terminal device, the AMF-A network element may obtain the quota of the quantity of concurrent sessions in the first region in the manner of step S509 and step S510. This is not specifically limited in this embodiment of this application.

Optionally, in this embodiment of this application, when the quota of the quantity of concurrent sessions in the first region is 0, the message d1 may not carry the quota of the quantity of concurrent sessions in the first region, but carry an indication that the actual overall quantity of concurrent sessions of the target network slice reaches or exceeds the overall maximum quantity of concurrent sessions allowed by the target network slice. This is not specifically limited in this embodiment of this application.

Branch i:

S517. The AMF-A network element sends a message g1 to the terminal device by using the gNB-A. Correspondingly, the terminal device receives the message g1 from the AMF-A network element.

The message g1 carries an indication that the target network slice is overloaded, and is used to temporarily reject session establishment of the terminal device in the target network slice at the current location, and allow the terminal device to continue to attempt to request session establishment in the target network slice after changing a location region or waiting for a period of time.

For example, the message g1 in this embodiment of this application may be, for example, a session establishment reject message shown in FIG. 5A and FIG. 5B. This is not specifically limited in this embodiment of this application.

Branch ii:

S518. The AMF-A network element allows the terminal device to establish a session in the target network slice in the first region, and performs a subsequent session establishment processing procedure.

In this embodiment of this application, after the terminal device successfully establishes the session, the AMF-A network element refreshes the maintained quantity of concurrent sessions of the target network slice in the first region, and performs deduction on the cached quota of the quantity of concurrent sessions in the first region. When the session is released or the session is switched out of the first region due to movement of the terminal device, the cached quota of the quantity of concurrent sessions in the first region may be restored (that is, the quota is increased by 1).

Because the target network slice in this embodiment of this application covers a plurality of regions, the first network element may determine, based on the first condition, whether to allow the terminal device to access the target network slice. The first condition includes: whether the service usage of the target network slice in the first region exceeds the first service limit. In other words, in this embodiment of this application, region-based control of access to the network slice is implemented. Therefore, a problem that a radio-side network node in a region is congested or overloaded, which cannot ensure service quality of the network slice, and may further affect service quality of another network slice can be avoided. In this way, excessive use of network slice resources by a customer can be limited, and the service quality of the network slice can be ensured.

Actions of the AMF-A network element in step S501 to step S517 or step S518 may be performed by the processor 301 in the communications device 300 shown in FIG. 3 by invoking the application program code stored in the memory 303. This is not limited in the embodiments of this application.

Figure 6A:
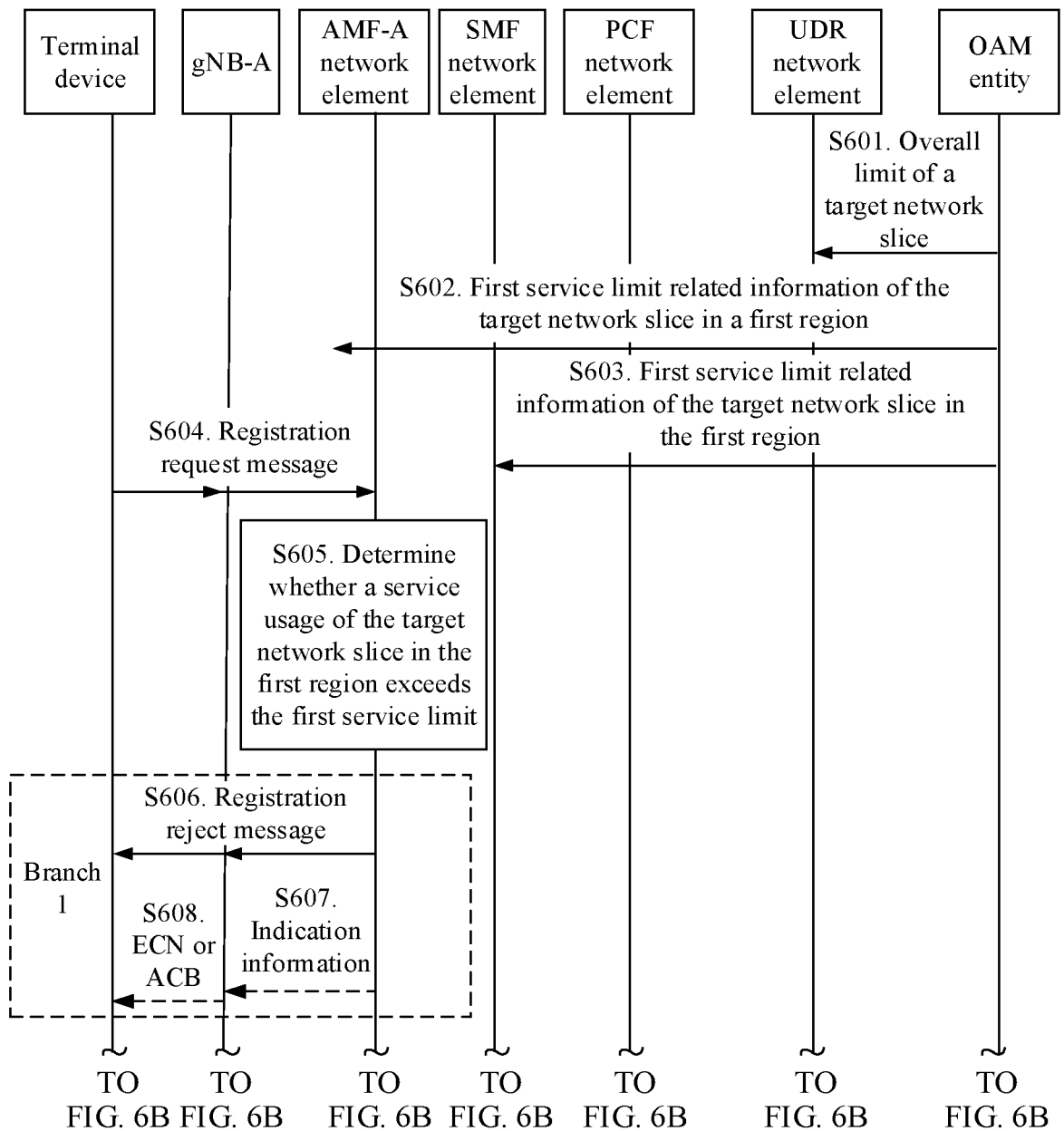
FIG. 6A to FIG. 6C are a schematic interaction flowchart 2 of a method for controlling use of a network slice according to an embodiment of this application.

Optionally, for example, the first network element in the communications system shown in FIG. 1 is a mobility management network element or a session management network element, the communications system shown in FIG. 1 is applied to the 5G network architecture shown in FIG. 2, and the first region is the region A in FIG. 2. FIG. 6A to FIG.

6C show another method for controlling use of a network slice according to an embodiment of this application, including the following steps.

S601. An OAM entity sends an overall limit of a target network slice to a UDR network element. Correspondingly, the UDR network element receives the overall limit of the target network slice from the OAM entity.

For related descriptions of the overall limit of the target network slice, refer to the embodiment shown in FIG. 4. Details are not described herein again.

Figure 6B:
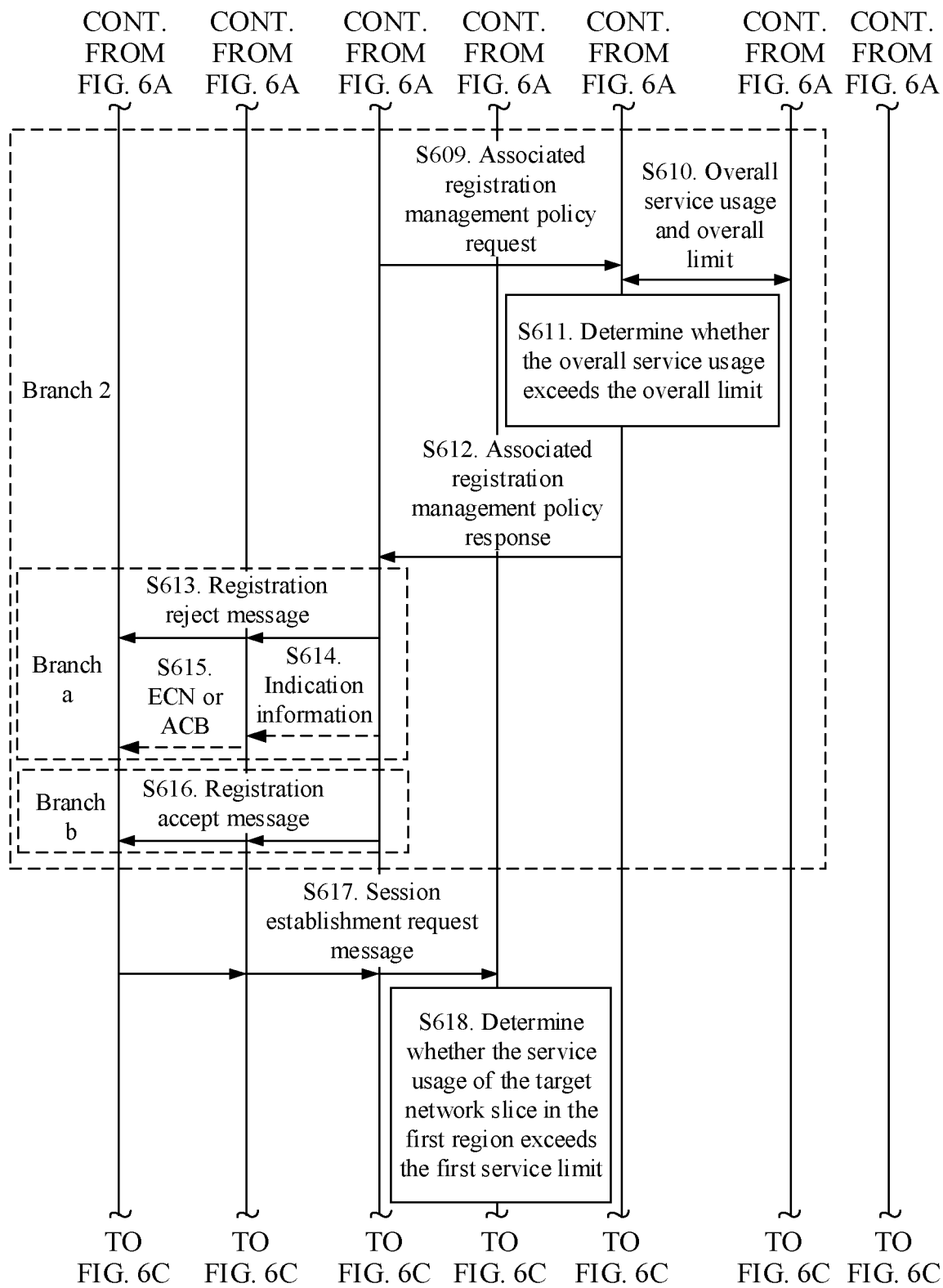
Figure 6C:
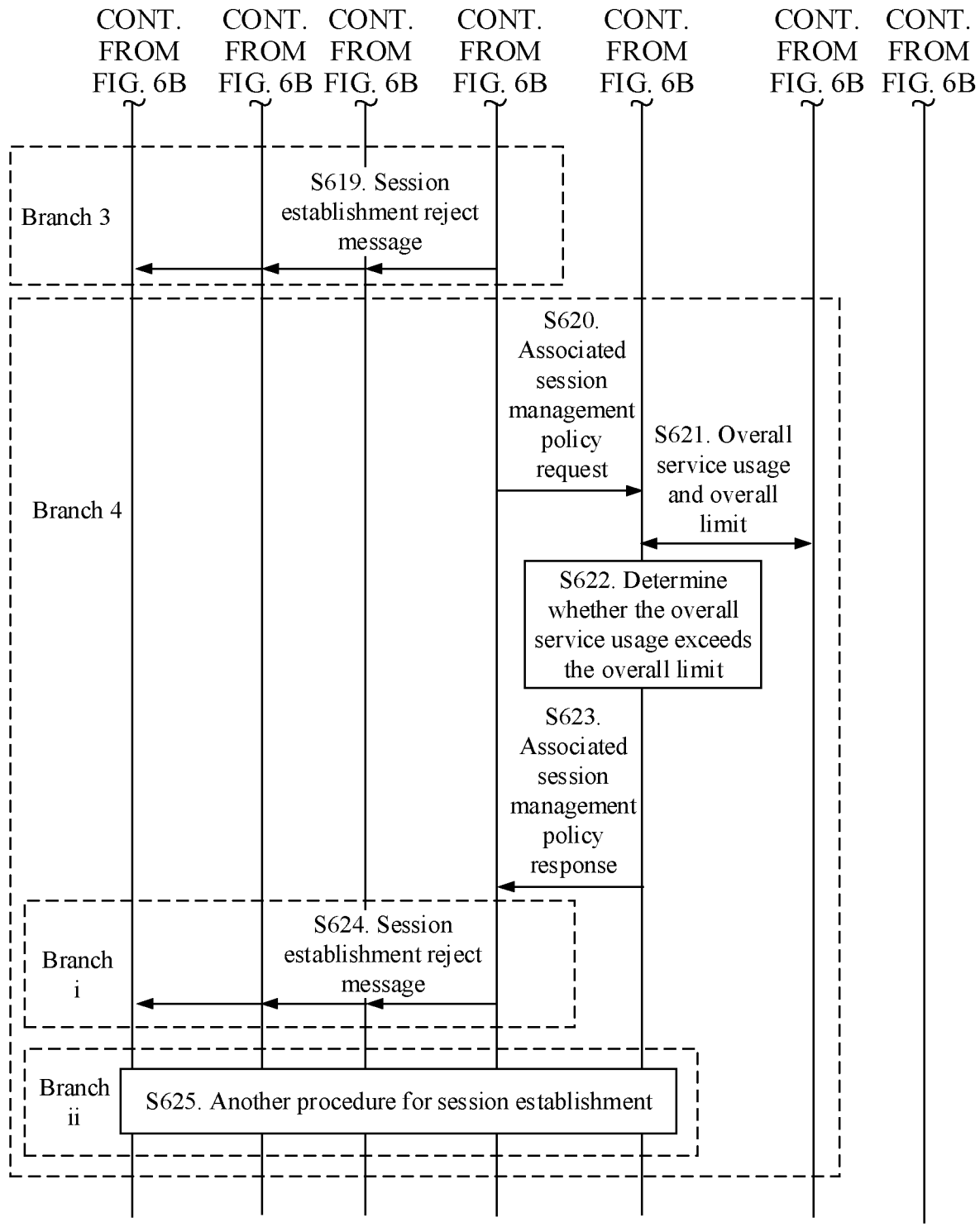

S602. The OAM entity sends, to an AMF network element in each region covered by the target network slice, service limit related information of the target network slice in each region. Correspondingly, the AMF network element in each region covered by the target network slice receives, from the OAM entity, the service limit related information of the target network slice in each region. FIG. 6A to FIG. 6C merely show an example for description, in which the OAM entity sends first service limit related information of the target network slice in a first region (that is, the region A) covered by the target network slice to an AMF-A network element in the first region. Correspondingly, the AMF-A network element receives, from the OAM entity, the first service limit related information of the target network slice in the first region.

Optionally, the first service limit related information in step S602 includes a first service limit or information used to determine the first service limit that is required in a registration procedure of a terminal device. For related descriptions of the first service limit or the information used to determine the first service limit that is required in the registration procedure of the terminal device, refer to step S502 in the embodiment shown in FIG. 5A and FIG. 5B. Details are not described herein again.

S603. The OAM entity sends, to an SMF network element in each region covered by the target network slice, service limit related information of the target network slice in each region. Correspondingly, the SMF network element in each region covered by the target network slice receives, from the OAM entity, the service limit related information of the target network slice in each region. FIG. 6A to FIG. 6C merely show an example for description, in which the OAM entity sends the first service limit related information of the target network slice in the first region (that is, the region A) covered by the target network slice to an SMF network element in the first region. Correspondingly, the SMF network element receives, from the OAM entity, the first service limit related information of the target network slice in the first region.

Optionally, the first service limit related information in step S603 includes a first service limit or information used to determine the first service limit that is required in a session establishment procedure of the terminal device. For related descriptions of the first service limit or the information used to determine the first service limit that is required in the session establishment procedure of the terminal device, refer to step S502 in the embodiment shown in FIG. 5A and FIG. 5B. Details are not described herein again.

It should be noted that, in this embodiment of this application, step S601, step S602, and step S603 are not necessarily performed in a specific order. Any one of the steps may be performed first, and then the remaining two steps are separately performed. Alternatively, two of the steps are performed simultaneously, and then the remaining step is performed. Alternatively, one of the steps may be performed first, and then the remaining two steps are performed simultaneously. Alternatively, the three steps may be performed simultaneously. This is not specifically limited in this embodiment of this application.

S604 is the same as step S503 in the embodiment shown in FIG. 5A and FIG. 5B. For related descriptions, refer to the embodiment shown in FIG. 5A and FIG. 5B. Details are not described herein again.

S605. The AMF-A network element determines whether a service usage of the target network slice in the first region exceeds the first service limit.

For a manner in which the AMF-A network element determines the region in which the terminal device is currently located (that is, the first region in this embodiment of this application) and the target network slice, refer to step S504 in the embodiment shown in FIG. 5A and FIG. 5B.

Details are not described herein again.

In this embodiment of this application, in the registration procedure of the terminal device, the service usage of the target network slice in the first region includes an actual quantity of registered terminals of the target network slice in the first region. In a registration management process, the AMF-A network element maintains an actual quantity of registered terminals of each currently served network slice in each region managed by the AMF-A network element, including the actual quantity of registered terminals of the target network slice in the first region. Further, the AMF-A network element may compare the actual quantity of registered terminals of the target network slice in the first region with the maximum quantity, determined in step S602, of registered terminals allowed by the target network slice in the first region. When the actual quantity of registered terminals of the target network slice in the first region reaches or exceeds the maximum quantity of registered terminals allowed by the target network slice in the first region, a branch 1 corresponding to the following step S606 is performed. When the actual quantity of registered terminals of the target network slice in the first region does not exceed the maximum quantity of registered terminals allowed by the target network slice in the first region, a branch 2 corresponding to the following step S609 and subsequent steps is performed. For a demarcation point at which the actual quantity of registered terminals of the target network slice in the first region is equal to (that is, "reaches" mentioned above) the maximum quantity of registered terminals allowed by the target network slice in the first region, the branch 1 corresponding to the following step S606 may be performed, or the branch 2 corresponding to the following step S609 and subsequent steps may be performed. This is not specifically limited in this embodiment of this application.

Branch 1:

S606 is the same as step S505 in the embodiment shown in FIG. 5A and FIG. 5B. For related descriptions, refer to the embodiment shown in FIG. 5A and FIG. 5B. Details are not described herein again.

Optionally, in this embodiment of this application, when the actual quantity of registered terminals of the target network slice in the first region reaches or exceeds the maximum quantity of registered terminals allowed by the target network slice in the first region, the following steps S607 and S608 may be further performed.

S607 and S608 are the same as steps S506 and S507 in the embodiment shown in FIG. 5A and FIG. 5B. For related descriptions, refer to the embodiment shown in FIG. 5A and FIG. 5B.

Details are not described herein again.

Branch 2:

S609. The AMF-A network element sends a message h1 to a PCF network element. Correspondingly, the PCF network element receives the message h1 from the AMF-A network element.

The message h1 carries S-NSSAI of the target network slice.

For example, the message h1 in this embodiment of this application may be, for example, an associated registration management policy request shown in FIG. 6A to FIG. 6C. This is not specifically limited in this embodiment of this application.

S610. The PCF network element obtains an overall service usage of the target network slice and the overall limit of the target network slice from the UDR network element.

In the registration procedure of the terminal device, the overall service usage of the target network slice is an actual overall quantity of registered terminals of the target network slice, and correspondingly, the overall limit of the target network slice is an overall maximum quantity of registered terminals allowed by the target network slice.

It should be noted that, in this embodiment of this application, if there are a plurality of PCF network elements in the target network slice, all the PCF network elements use the UDR network element to maintain the overall service usage of the target network slice.

S611. The PCF network element determines whether the overall service usage of the target network slice exceeds the overall limit of the target network slice.

S612. The PCF network element sends a message j1 to the AMF-A network element. Correspondingly, the AMF-A receives the message j1 from the PCF network element.

For example, the message j1 in this embodiment of this application may be, for example, an associated registration management policy response shown in FIG. 6A to FIG. 6C. This is not specifically limited in this embodiment of this application.

When the overall service usage of the target network slice reaches or exceeds the overall limit of the target network slice, the message j1 may carry an indication that the overall service usage of the target network slice reaches or exceeds the overall limit of the target network slice, or an indication that the terminal device is not allowed to use the target network slice. Then, a branch a corresponding to the following step S613 may be performed. When the overall service usage of the target network slice does not exceed the overall limit of the target network slice, the message j1 may carry an indication that the terminal device is allowed to use the target network slice. Then, a branch b corresponding to the following step S616 may be performed. For a demarcation point at which the overall service usage of the target network slice is equal to (that is, "reaches" mentioned above) the overall limit of the target network slice, the branch a corresponding to the following step S613 may be performed, or the branch b corresponding to the following step S616 may be performed. This is not specifically limited in this embodiment of this application.

Branch a:

Step S613 is the same as step S505 in the embodiment shown in FIG. 5A and FIG. 5B. For related descriptions, refer to the embodiment shown in FIG. 5A and FIG. 5B. Details are not described herein again.

Optionally, in this embodiment of this application, when the actual overall quantity of registered terminals of the target network slice reaches or exceeds the overall maximum quantity of registered terminals allowed by the target network slice, the following steps S613 and S614 may be further performed.

S614 and S615 are the same as steps S506 and S507 in the embodiment shown in FIG. 5A and FIG. 5B. For related descriptions, refer to the embodiment shown in FIG. 5A and FIG. 5B. Details are not described herein again.

Branch b:

S616 is the same as step S514 in the embodiment shown in FIG. 5A and FIG. 5B. For related descriptions, refer to the embodiment shown in FIG. 5A and FIG. 5B. Details are not described herein again.

Further, after the terminal device is successfully registered, the PCF network element may further update the actual overall quantity of registered terminals of the target network slice to the UDR network element. Subsequently, when the terminal device deregisters from the target network slice or moves out of the first region, the PCF network element may further update the actual overall quantity of registered terminals of the target network slice to the UDR network element. This is not specifically limited in this embodiment of this application.

It should be noted that in this embodiment of this application, if a plurality of target network slices are determined in step S605, or the terminal device does not send request NSSAI, but there are a plurality of subscribed default network slices (in this case, each default network slice may be used as a target network slice), each target network slice may be separately processed based on steps S605 to S616, and details are not described herein again.

Further, after the terminal device is successfully registered, the method for controlling use of a network slice that is provided in this embodiment of this application further includes a session establishment procedure shown in the following steps S617 to S624 or the following steps S617 to S625.

S617. The terminal device sends a message k1 to the SMF network element by using the AMF-A network element. Correspondingly, the SMF network element receives the message k1 from the terminal device.

The message k1 carries the S-NSSAI of the target network slice.

For example, the message k1 in this embodiment of this application may be, for example, a session establishment request message shown in FIG. 6A to FIG. 6C. This is not specifically limited in this embodiment of this application.

S618. The SMF network element determines whether the service usage of the target network slice in the first region exceeds the first service limit.

The SMF network element may determine, based on the identity of the TA and/or the identity of the cell cell in which the terminal device is currently located, the region in which the terminal device is currently located (that is, the first region in this embodiment of this application).

The SMF network element may determine, based on the S-NSSAI of the target network slice, the target network slice that the terminal device expects to access for a session.

The service usage of the target network slice in the first region and the first service limit in step S618 are the service usage and the first service limit of the corresponding target network slice in the first region in the session establishment procedure of the terminal device. In a session management process, the SMF network element maintains a service usage of each currently served network slice in each region managed by the SMF network element, including the service usage of the target network slice in the first region. Further, the SMF network element may compare the service usage of the target network slice in the first region with the first service limit determined in step S603. When the service usage of the target network slice in the first region reaches or exceeds the first service limit, a branch 3 corresponding to the following step S619 is performed. When the service usage of the target network slice in the first region does not exceed the first service limit, a branch 4 corresponding to the following step S620 and subsequent steps is performed.

Branch 3:

Step S619 is the same as step S517 in the embodiment shown in FIG. 5A and FIG. 5B. For related descriptions, refer to the embodiment shown in FIG. 5A and FIG. 5B. Details are not described herein again.

Branch 4:

S620. The SMF network element sends a message m1 to the PCF network element. Correspondingly, the PCF network element receives the message m1 from the SMF network element.

The message m1 carries the S-NSSAI of the target network slice.

For example, the message m1 in this embodiment of this application may be, for example, an associated session management policy request shown in FIG. 6A to FIG. 6C. This is not specifically limited in this embodiment of this application.

S621. The PCF network element obtains the overall service usage of the target network slice and the overall limit of the target network slice from the UDR network element.

For related descriptions of the overall service usage of the target network slice and the overall limit of the target network slice in the session establishment procedure of the terminal device, refer to the embodiment shown in FIG. 4. Details are not described herein again.

It should be noted that, in this embodiment of this application, if there are a plurality of PCF network elements in the target network slice, all the PCF network elements use the UDR network element to maintain the overall service usage of the target network slice.

S622. The PCF network element determines whether the overall service usage of the target network slice exceeds the overall limit of the target network slice.

S623. The PCF network element sends a message n1 to the SMF network element. Correspondingly, the SMF network element receives the message n1 from the PCF network element.

For example, the message n1 in this embodiment of this application may be, for example, an associated session management policy response shown in FIG. 6A to FIG. 6C. This is not specifically limited in this embodiment of this application.

When the overall service usage of the target network slice reaches or exceeds the overall limit of the target network slice, the message n1 may carry an indication that the overall service usage of the target network slice reaches or exceeds the overall limit of the target network slice, or an indication that the terminal device is not allowed to use the target network slice. Then, a branch i corresponding to the following step S624 may be performed. When the overall service usage of the target network slice does not exceed the overall limit of the target network slice, the message n1 may carry an indication that the terminal device is allowed to use the target network slice. Then, a branch ii corresponding to the following step S625 may be performed. For a demarcation point at which the overall service usage of the target network slice is equal to (that is, "reaches" mentioned above) the overall limit of the target network slice, the branch i corresponding to the following step S624 may be performed, or the branch ii corresponding to the following step S625 may be performed. This is not specifically limited in this embodiment of this application.

Branch i:

S624. The SMF network element sends a message p1 to the terminal device by using the AMF-A network element. Correspondingly, the terminal device receives the message p1 from the SMF network element.

The message p1 carries an indication that the target network slice is overloaded, and is used to temporarily reject session establishment of the terminal device in the target network slice at a current location, and allow the terminal device to continue to attempt to request session establishment in the target network slice after changing a location region or waiting for a period of time.

For example, the message p1 in this embodiment of this application may be, for example, a session establishment reject message shown in FIG. 6A to FIG. 6C. This is not specifically limited in this embodiment of this application.

Branch ii:

S625. The SMF network element allows the terminal device to establish a session in the target network slice in the first region, and performs a subsequent session establishment processing procedure.

In this embodiment of this application, after the terminal device successfully establishes the session, the PCF network element may further update the overall service usage of the target network slice in the session establishment process to the UDR network element. Subsequently, after the session is released, the PCF network element may further update the overall service usage of the target network slice in the session establishment process to the UDR network element. If the session does not use a user plane node in the region due to movement of the terminal device, the PCF network element may also update the overall service usage of the target network slice in the session establishment process to the UDR network element. This is not specifically limited in this embodiment of this application.

For a technical effect of the embodiment shown in FIG. 6A to FIG. 6C, refer to the embodiment shown in FIG. 5A and FIG. 5B. Details are not described herein again.

Actions of the AMF-A network element in step S601 to step S624 or step S625 may be performed by the processor 301 in the communications device 300 shown in FIG. 3 by invoking the application program code stored in the memory 303. This is not limited in the embodiments of this application.

Figure 7A:
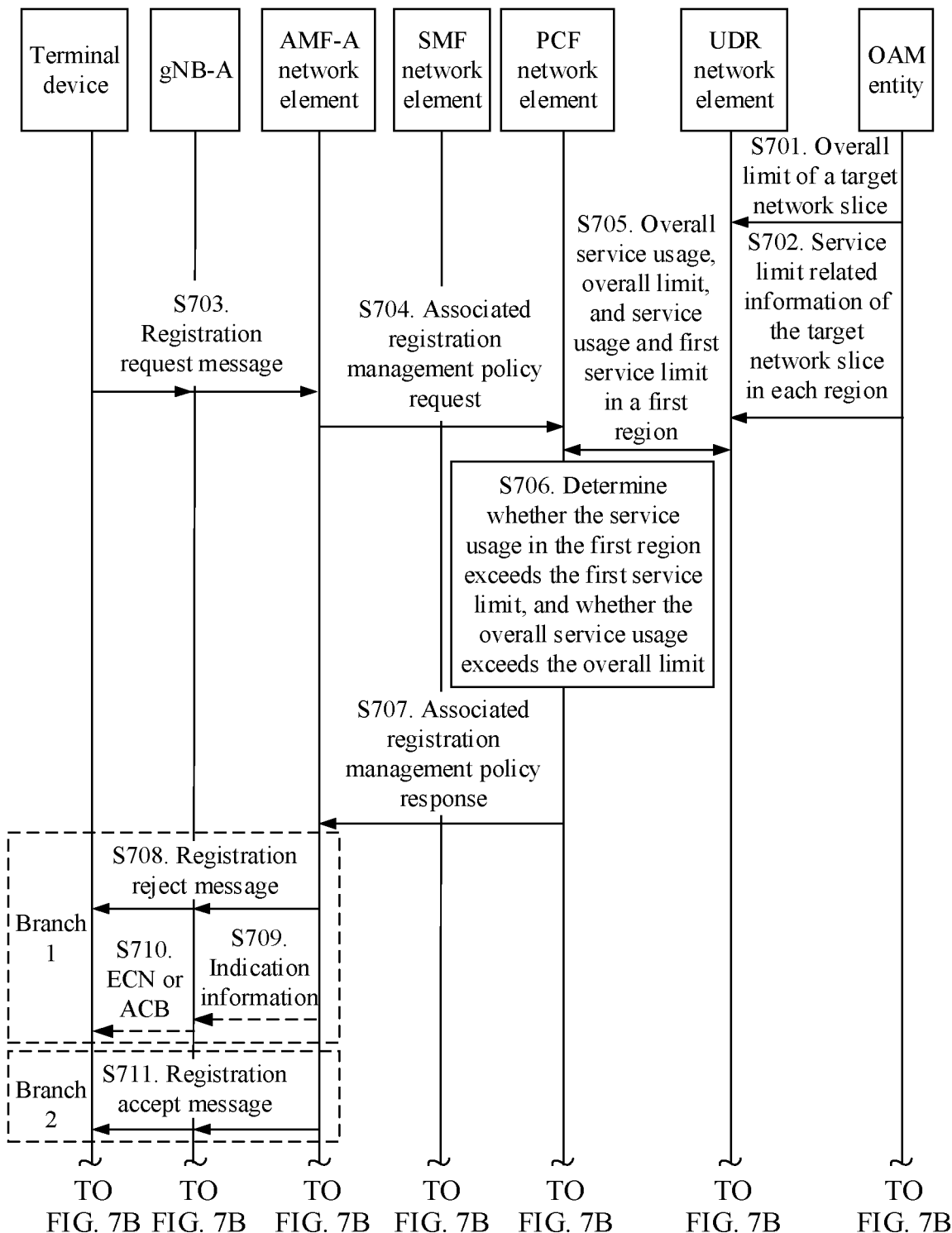
FIG. 7A and FIG. 7B are a schematic interaction flowchart 3 of a method for controlling use of a network slice according to an embodiment of this application.
Figure 7B:
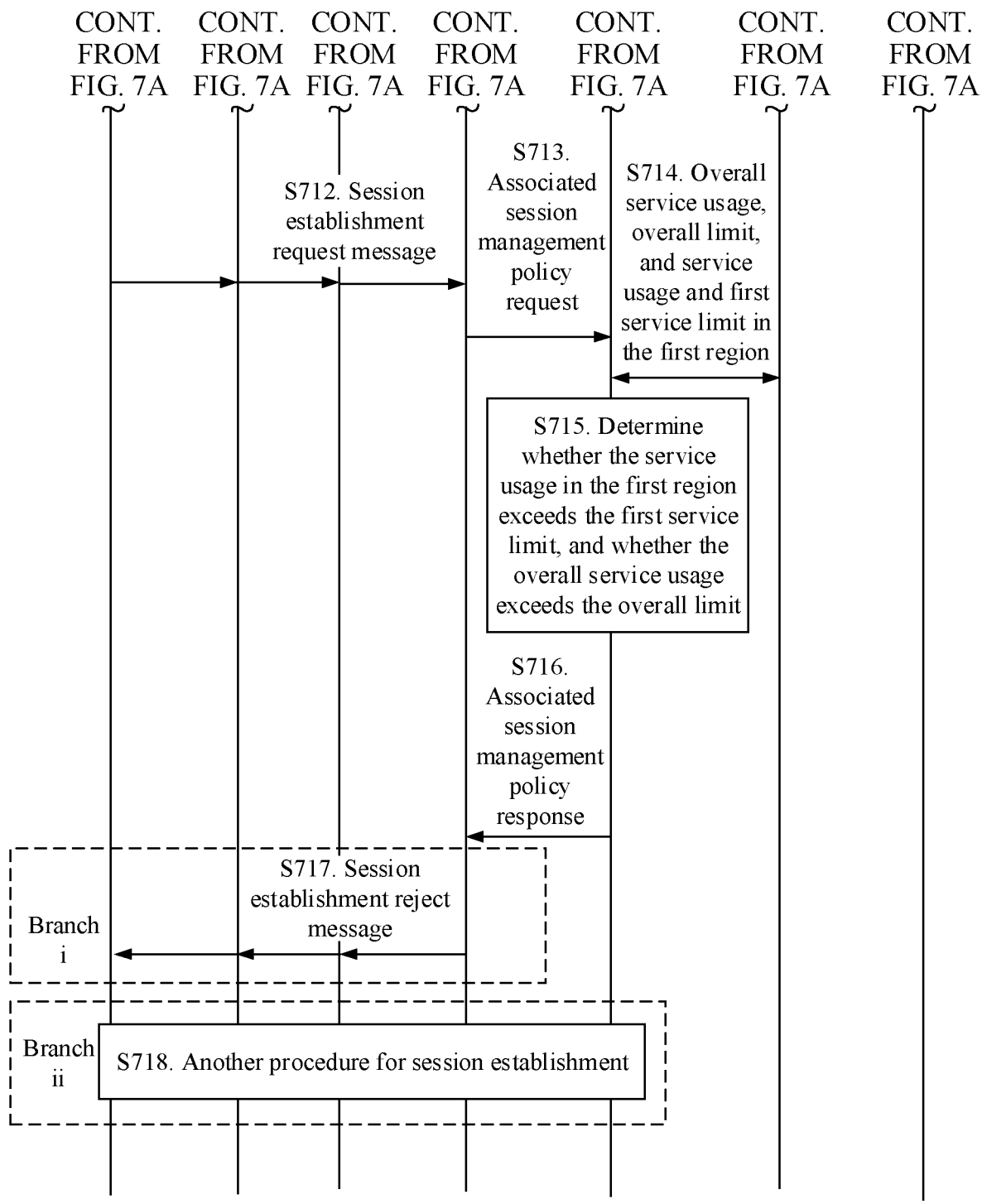

Optionally, for example, the first network element in the communications system shown in FIG. 1 is a policy control network element, the communications system shown in FIG. 1 is applied to the 5G network architecture shown in FIG. 2, and the first region is the region A in FIG. 2. FIG. 7A and FIG. 7B show another method for controlling use of a network slice according to an embodiment of this application, including the following steps.

S701 is the same as step S601 in the embodiment shown in FIG. 6A to FIG. 6C. For related descriptions, refer to the embodiment shown in FIG. 6A to FIG. 6C. Details are not described herein again.

S702. The OAM entity sends service limit related information of the target network slice in each region to the UDR network element. Correspondingly, the UDR network element receives the service limit related information of the target network slice in each region from the OAM entity.

The service limit related information of the target network slice in each region includes first service limit related information of the target network slice in a first region (that is, the region A). For descriptions of corresponding first service limit related information in a registration procedure of a terminal device, refer to step S602 in the embodiment shown in FIG. 6A to FIG. 6C. For descriptions of corresponding first service limit related information in a session establishment procedure of the terminal device, refer to step S603 in the embodiment shown in FIG. 6A to FIG. 6C. Details are not described herein again.

It should be noted that, in this embodiment of this application, step S701 and step S702 are not necessarily performed in a specific order. Step S701 may be performed first and then step S702 is performed. Alternatively, step S702 may be performed first and then step S701 is performed. Alternatively, step S701 and step S702 may be performed simultaneously. This is not specifically limited in this embodiment of this application.

S703 is the same as step S604 in the embodiment shown in FIG. 6A to FIG. 6C. For related descriptions, refer to the embodiment shown in FIG. 6A to FIG. 6C. Details are not described herein again.

S704. The AMF-A network element sends a message q1 to a PCF network element. Correspondingly, the PCF network element receives the message q1 from the AMF-A network element.

The message q1 carries S-NSSAI of the target network slice. In addition, the message q1 may further carry an identity of a TA and/or an identity of a cell cell in which the terminal device is currently located. This is not specifically limited in this embodiment of this application.

For example, the message q1 in this embodiment of this application may be, for example, an associated registration management policy request shown in FIG. 7A and FIG. 7B. This is not specifically limited in this embodiment of this application.

S705. The PCF network element obtains an overall service usage of the target network slice and the overall limit of the target network slice from the UDR network element, and the PCF network element obtains a service usage and the first service limit of the target network slice in the first region from the UDR network element.

For a manner in which the PCF network element determines the region in which the terminal device is currently located (that is, the first region in this embodiment of this application) and the target network slice, refer to step S605 in the embodiment shown in FIG. 6A to FIG. 6C. Details are not described herein again.

For related descriptions of the overall service usage of the target network slice, the overall limit of the target network slice, and the service usage and the first service limit of the target network slice in the first region in the registration procedure of the terminal device, refer to the embodiment shown in FIG. 4. Details are not described herein again.

Optionally, in this embodiment of this application, the PCF network element may alternatively obtain the first service limit related information from the UDR network element, and then determine the first service limit based on the first service limit related information. This is not specifically limited in this embodiment of this application.

It should be noted that, in this embodiment of this application, if there are a plurality of PCF network elements in the target network slice, all the PCF network elements use the UDR network element to maintain the overall service usage of the target network slice and a service usage of the target network slice in each region.

S706. The PCF network element determines whether the service usage of the target network slice in the first region exceeds the first service limit, and the PCF network element determines the overall service usage of the target network slice and the overall limit of the target network slice.

S707. The PCF network element sends a message r1 to the AMF-A network element. Correspondingly, the AMF-A network element receives the message r1 from the PCF network element.

For example, the message r1 in this embodiment of this application may be, for example, an associated registration management policy response shown in FIG. 7A and FIG. 7B. This is not specifically limited in this embodiment of this application.

When the PCF network element determines that the service usage of the target network slice in the first region reaches or exceeds the first service limit, the message r1 may carry an indication that the service usage of the target network slice in the first region reaches or exceeds the first service limit or an indication that the terminal device is not allowed to use the target network slice. Then, a branch 1 corresponding to the following step S708 may be performed. When the PCF network element determines that the service usage of the target network slice in the first region does not exceed the first service limit, but the overall service usage of the target network slice reaches or exceeds the overall limit of the target network slice, the message r1 may carry an indication that the service usage of the target network slice in the first region does not exceed the first service limit but the overall service usage of the target network slice reaches or exceeds the overall limit of the target network slice, or an indication that the terminal device is not allowed to use the target network slice. Then, the branch 1 corresponding to the following step S708 may be performed. When the PCF network element determines that the service usage of the target network slice in the first region does not exceed the first service limit, and the overall service usage of the target network slice does not exceed the overall limit of the target network slice, the message r1 may carry an indication that the terminal device is allowed to use the target network slice. Then, a branch 2 corresponding to the following step S711 may be performed. For a demarcation point at which the PCF network element determines that the service usage of the target network slice in the first region is equal to (that is, "reaches" mentioned above) the first service limit, the branch 1 corresponding to the following step S708 may be performed, or it may be further determined whether the overall service usage of the target network slice exceeds the overall limit of the target network slice. For a demarcation point at which the PCF network element determines that the overall service usage of the target network slice is equal to (that is, "reaches" mentioned above) the overall limit of the target network slice, the branch 1 corresponding to the following step S708 may be performed, or the branch 2 corresponding to the following step S711 may be performed. This is not specifically limited in this embodiment of this application.

Branch 1:

S708 is the same as step S613 in the embodiment shown in FIG. 6A to FIG. 6C. For related descriptions, refer to the embodiment shown in FIG. 6A to FIG. 6C. Details are not described herein again.

Optionally, in this embodiment of this application, for the branch 1, the following steps S709 and S710 may be further performed.

S709 and S710 are the same as steps S614 and S615 in the embodiment shown in FIG. 6A to FIG. 6C. For related descriptions, refer to the embodiment shown in FIG. 6A to FIG. 6C. Details are not described herein again.

Branch 2:

S711 is the same as step S616 in the embodiment shown in FIG. 6A to FIG. 6C. For related descriptions, refer to the embodiment shown in FIG. 6A to FIG. 6C. Details are not described herein again.

Further, after the terminal device is successfully registered, the PCF network element may further update the actual overall quantity of registered terminals of the target network slice and the actual quantity of registered terminals of the target network slice in the first region to the UDR network element. Subsequently, when the terminal device deregisters from the target network slice or moves out of the first region, the PCF network element may further update the actual overall quantity of registered terminals of the target network slice and the actual quantity of registered terminals of the target network slice in the first region to the UDR network element. This is not specifically limited in this embodiment of this application.

It should be noted that in this embodiment of this application, if a plurality of target network slices are determined in step S705, or the terminal device does not send request NSSAI, but there are a plurality of subscribed default network slices (in this case, each default network slice may be used as a target network slice), each target network slice may be separately processed based on steps S705 to S711, and details are not described herein again.

Further, after the terminal device is successfully registered, the method for controlling use of a network slice that is provided in this embodiment of this application further includes a session establishment procedure shown in the following steps S712 to S717 or the following steps S712 to S718.

S712 is the same as step S617 in the embodiment shown in FIG. 6A to FIG. 6C. For related descriptions, refer to the embodiment shown in FIG. 6A to FIG. 6C. Details are not described herein again.

S713. The SMF network element sends a message s1 to the PCF network element. Correspondingly, the PCF network element receives the message s1 from the SMF network element.

The message s1 carries the S-NSSAI of the target network slice. In addition, the message s1 may further carry an identity of a TA and/or an identity of a cell cell in which the terminal device is currently located. This is not specifically limited in this embodiment of this application.

For example, the message s1 in this embodiment of this application may be, for example, an associated session management policy request shown in FIG. 7A and FIG. 7B. This is not specifically limited in this embodiment of this application.

S714. The PCF network element obtains the overall service usage of the target network slice and the overall limit of the target network slice from the UDR network element, and the PCF network element obtains the service usage and the first service limit of the target network slice in the first region from the UDR network element.

For a manner in which the PCF network element determines the region in which the terminal device is currently located (that is, the first region in this embodiment of this application) and the target network slice, refer to step S605 in the embodiment shown in FIG. 6A to FIG. 6C. Details are not described herein again.

For related descriptions of the overall service usage of the target network slice, the overall limit of the target network slice, and the service usage and the first service limit of the target network slice in the first region in the session establishment procedure of the terminal device, refer to the embodiment shown in FIG. 4. Details are not described herein again.

Optionally, in this embodiment of this application, the PCF network element may alternatively obtain the first service limit related information from the UDR network element, and then determine the first service limit based on the first service limit related information. This is not specifically limited in this embodiment of this application.

It should be noted that, in this embodiment of this application, if there are a plurality of PCF network elements in the target network slice, all the PCF network elements use the UDR network element to maintain the overall service usage of the target network slice and a service usage of the target network slice in each region.

S715. The PCF network element determines whether the service usage of the target network slice in the first region exceeds the first service limit, and the PCF network element determines whether the overall service usage of the target network slice exceeds the overall limit of the target network slice.

S716. The PCF network element sends a message t1 to the SMF network element. Correspondingly, the SMF network element receives the message t1 from the PCF network element.

For example, the message t1 in this embodiment of this application may be, for example, an associated session management policy response shown in FIG. 7A and FIG. 7B. This is not specifically limited in this embodiment of this application.

When the PCF network element determines that the service usage of the target network slice in the first region reaches or exceeds the first service limit, the message t1 may carry an indication that the service usage of the target network slice in the first region reaches or exceeds the first service limit. Then, a branch i corresponding to the following step S717 may be performed. When the PCF network element determines that the service usage of the target network slice in the first region does not exceed the first service limit, but the overall service usage of the target network slice reaches or exceeds the overall limit of the target network slice, the message t1 may carry an indication that the service usage of the target network slice in the first region does not exceed the first service limit but the overall service usage of the target network slice reaches or exceeds the overall limit of the target network slice. Then, the branch i corresponding to the following step S717 may be performed. When the PCF network element determines that the service usage of the target network slice in the first region does not exceed the first service limit, and the overall service usage of the target network slice does not exceed the overall limit of the target network slice, the message t1 may carry an indication that the terminal device is allowed to use the target network slice. Then, a branch ii corresponding to the following step S718 may be performed. For a demarcation point at which the PCF network element determines that the service usage of the target network slice in the first region is equal to (that is, "reaches" mentioned above) the first service limit, the branch i corresponding to the following step S717 may be performed, or it may be further determined whether the overall service usage of the target network slice exceeds the overall limit of the target network slice. For a demarcation point at which the PCF network element determines that the overall service usage of the target network slice is equal to (that is, "reaches" mentioned above) the overall limit of the target network slice, the branch i corresponding to the following step S717 may be performed, or the branch ii corresponding to the following step S718 may be performed. This is not specifically limited in this embodiment of this application.

Branch i:

S717 is the same as step S624 in the embodiment shown in FIG. 6A to FIG. 6C. For related descriptions, refer to the embodiment shown in FIG. 6A to FIG. 6C. Details are not described herein again.

Branch ii:

S718 is the same as step S625 in the embodiment shown in FIG. 6A to FIG. 6C. For related descriptions, refer to the embodiment shown in FIG. 6A to FIG. 6C. Details are not described herein again.

In this embodiment of this application, after the terminal device successfully establishes the session, the PCF network element may further update the overall service usage of the target network slice and the service usage of the target network slice in the first region in the session establishment process to the UDR network element. Subsequently, after the session is released, the PCF network element may further update the overall service usage of the target network slice and the service usage of the target network slice in the first region in the session establishment process to the UDR network element. If the session does not use a user plane node in the region due to movement of the terminal device, the PCF network element may also update the overall service usage of the target network slice and the service usage of the target network slice in the first region in the session establishment process to the UDR network element. This is not specifically limited in this embodiment of this application.

For a technical effect of the embodiment shown in FIG. 7A and FIG. 7B, refer to the embodiment shown in FIG. 5A and FIG. 5B. Details are not described herein again.

Actions of the SMF network element in step S701 to step S717 or step S718 may be performed by the processor 301 in the communications device 300 shown in FIG. 3 by invoking the application program code stored in the memory 303. This is not limited in the embodiments of this application.

Figure 8A:
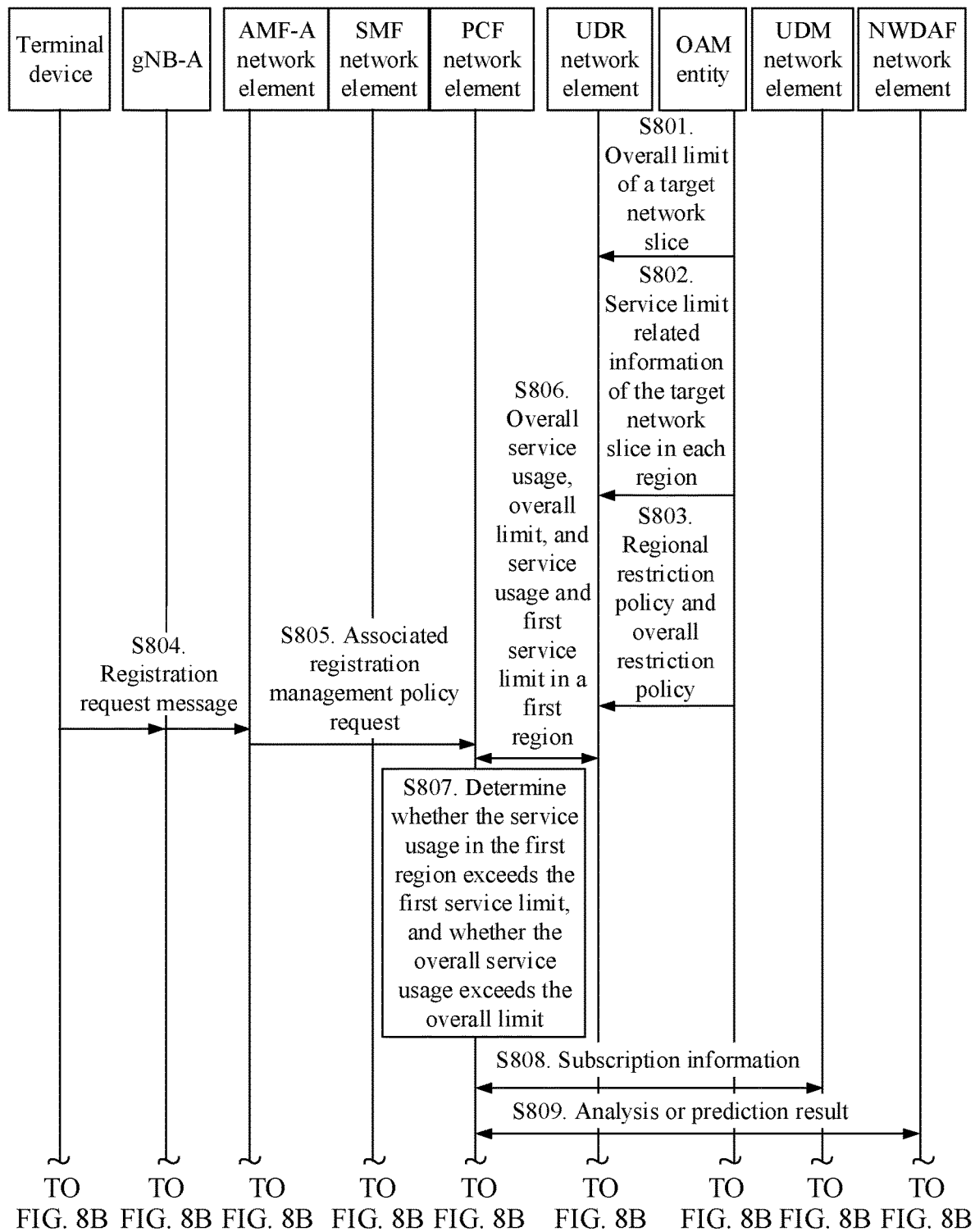
FIG. 8A to FIG. 8C are a schematic interaction flowchart 4 of a method for controlling use of a network slice according to an embodiment of this application.
Figure 8B:
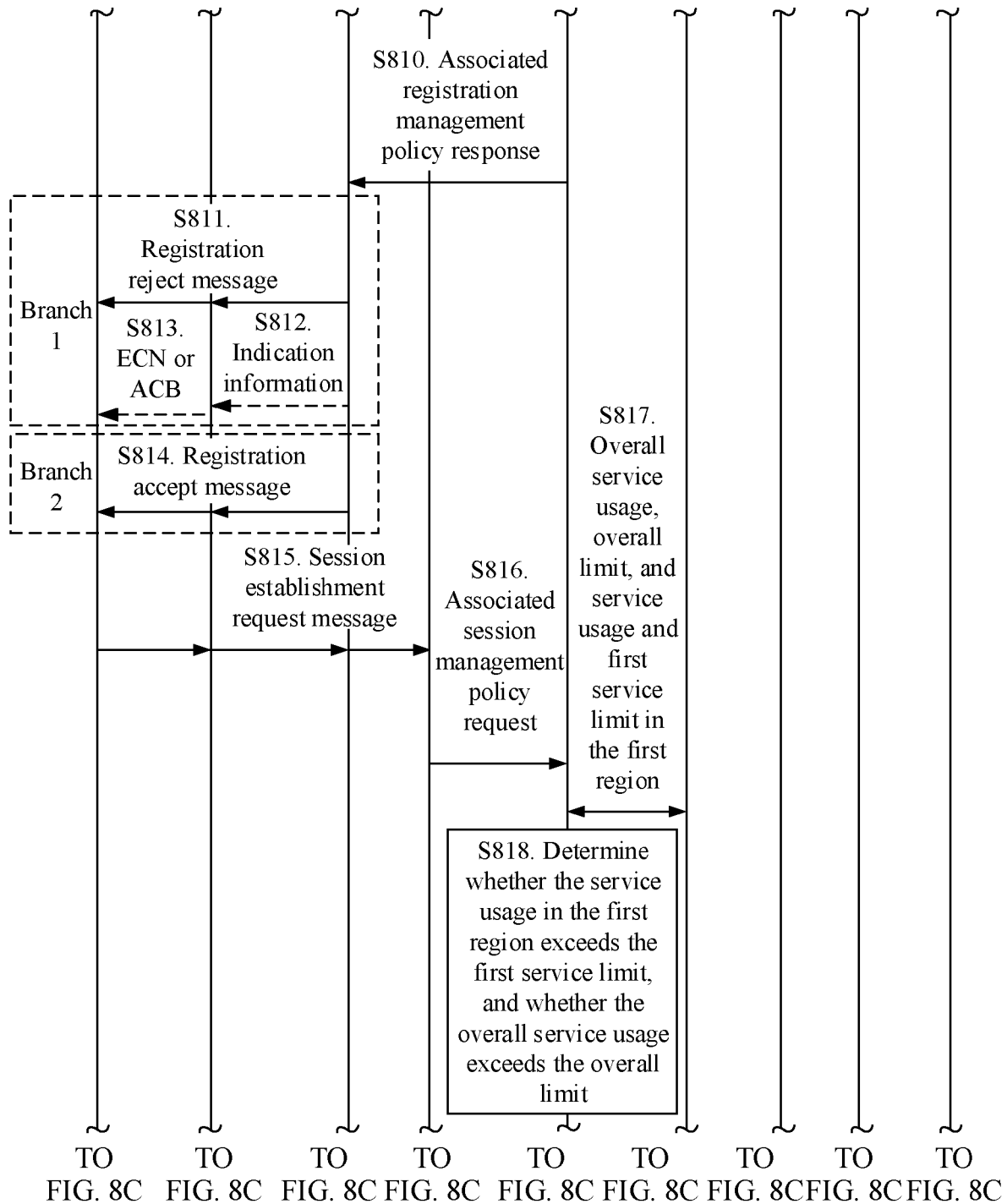
Figure 8C:
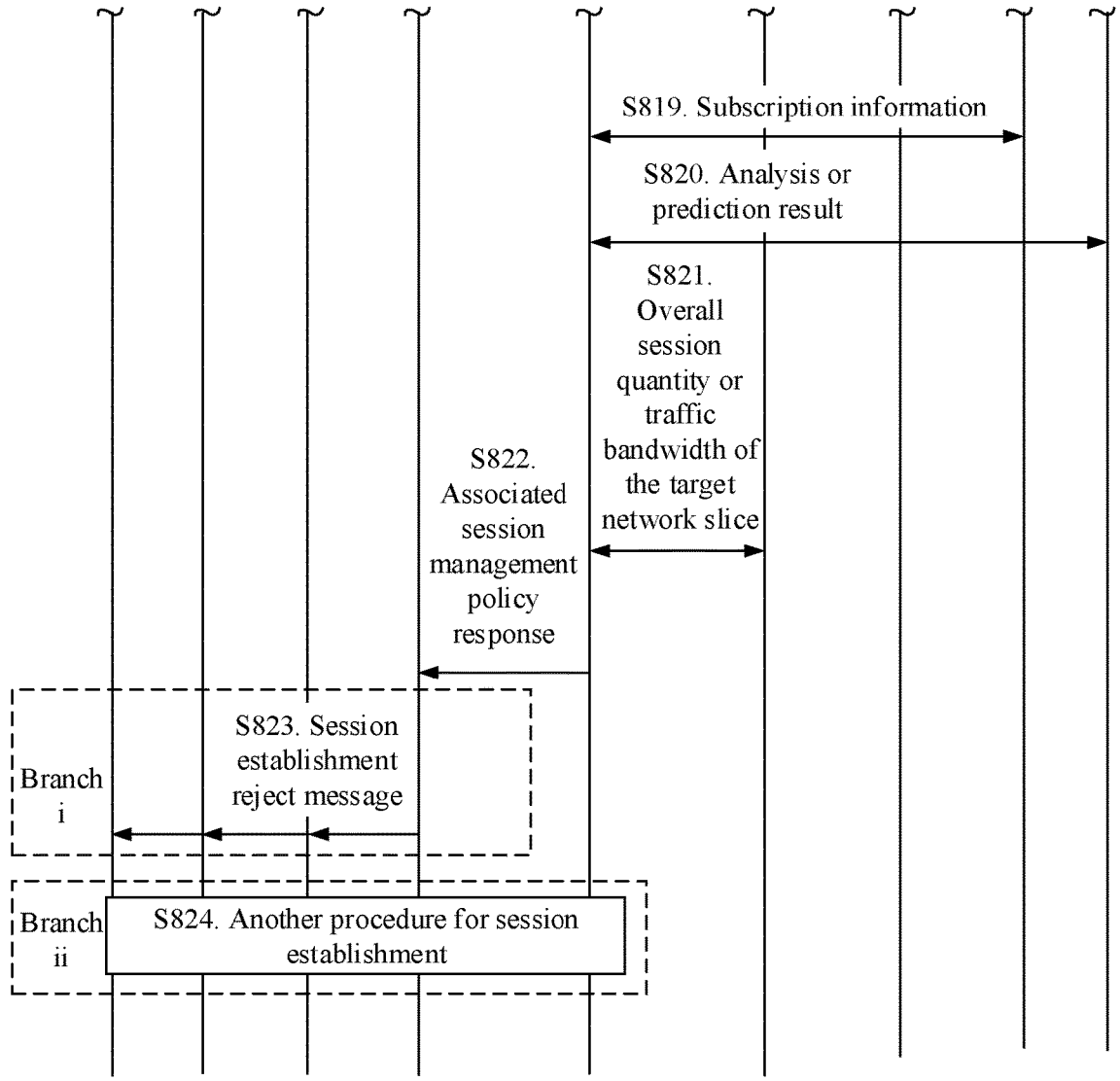

Optionally, for example, the first network element in the communications system shown in FIG. 1 is a policy control network element, the communications system shown in FIG. 1 is applied to the 5G network architecture shown in FIG. 2, and the first region is the region A in FIG. 2. FIG. 8A to FIG. 8C show another method for controlling use of a network slice according to an embodiment of this application, including the following steps.

S801 and S802 are the same as steps S701 and S702 in the embodiment shown in FIG. 7A and FIG. 7B. For related descriptions, refer to the embodiment shown in FIG. 7A and FIG. 7B. Details are not described herein again.

S803. The OAM entity sends a restriction policy of the target network slice in each region (which may be referred to as a regional restriction policy of the target network slice for short) and an overall restriction policy of the target network slice to the UDR network element. Correspondingly, the UDR network element receives the regional restriction policy and the overall restriction policy of the target network slice from the OAM entity.

The regional restriction policy of the target network slice includes a regional restriction policy of the target network slice in a first region (that is, the region A) (which may be referred to as a first regional restriction policy for short).

Optionally, in this embodiment of this application, the regional restriction policy of the target network slice may include, for example, when a service usage of the target network slice in a region reaches or exceeds a service limit in the region, rejecting use of the target network slice by a terminal device.

Optionally, in this embodiment of this application, the overall restriction policy of the target network slice may be, for example, when an overall service usage of the target network slice reaches or exceeds the overall limit, but a service usage of the target network slice in a region does not exceed a service limit in the region, if a second condition is met, allowing a terminal device to use the target network slice.

For example, in this embodiment of this application, a corresponding second condition in a registration procedure of the terminal device may include, for example, the overall limit is allowed to be exceeded in slice subscription information of the target network slice, or a charging mode of the target network slice is charging by session or by traffic, or a subscribed service type of the target network slice is a specific service type, or the terminal device requesting access is a high-value customer, or a slice running analysis result or prediction result of the target network slice is lower than a specific threshold, or a movement behavior analysis or prediction result of the terminal device requesting access indicates that a service load of the terminal device requesting access is lower than a specific threshold.

For example, in this embodiment of this application, a corresponding second condition in a session establishment procedure of the terminal device may include, for example, the overall limit is allowed to be exceeded in slice subscription information of the target network slice, or a charging mode of the target network slice is charging by session or by traffic, or a subscribed service type of the target network slice is a specific service type, or the terminal device requesting access is a high-value customer, or an overall session quantity and a traffic bandwidth of the target network slice are lower than an overload risk threshold, or a subscribed quality of service QoS parameter of the terminal device indicates that a service of the terminal device is allowed to be preempted, or a slice running analysis or prediction result of the target network slice is lower than a specific threshold, or a movement or communication behavior analysis or prediction result of the terminal device requesting access indicates that a service load of the terminal device requesting access is lower than a specific threshold.

It should be noted that, in this embodiment of this application, step S801, step S802, and step S803 are not necessarily performed in a specific order. Any one of the steps may be performed first, and then the remaining two steps are separately performed. Alternatively, two of the steps are performed simultaneously, and then the remaining step is performed. Alternatively, one of the steps may be performed first, and then the remaining two steps are performed simultaneously. Alternatively, the three steps may be performed simultaneously. This is not specifically limited in this embodiment of this application.

S804 to S807 are the same as steps S703 to S706 in the embodiment shown in FIG. 7A and FIG. 7B. For related descriptions, refer to the embodiment shown in FIG. 7A and FIG. 7B.

Details are not described herein again.

In addition, in this embodiment of this application, the PCF network element further needs to obtain, from the UDR network element, the overall restriction policy of the target network slice and the regional restriction policy of the target network slice in the first region (that is, the region A) (which may be referred to as the first regional restriction policy for short) that are required in the registration procedure. This is explained herein in a unified way, and not repeated below.

When the PCF network element determines that the service usage of the target network slice in the first region reaches or exceeds the first service limit, or when the PCF network element determines that the service usage of the target network slice in the first region does not exceed the first service limit, and the overall service usage of the target network slice does not exceed the overall limit of the target network slice, the following step S810 is directly performed. When the PCF network element determines that the service usage of the target network slice in the first region does not exceed the first service limit, but the overall service usage of the target network slice reaches or exceeds the overall limit of the target network slice, step S808 and/or step S809 are first performed to determine whether the second condition is met, and then step S810 is performed.

S808. The PCF network element obtains subscription information of the terminal device or the target network slice from a UDM network element, and determines, based on the subscription information of the terminal device or the target network slice, whether the following condition is met: the overall limit is allowed to be exceeded in the slice subscription information of the target network slice, or the charging mode of the target network slice is charging by session or by traffic, or the subscribed service type of the target network slice is the specific service type, or the terminal device requesting access is a high-value customer.

S809. The PCF network element obtains, from an NWDAF network element, one or more of a movement behavior analysis or prediction result of the terminal device requesting access or a slice running analysis or prediction result of the target network slice, and determines whether the following condition is met: the slice running analysis or prediction result of the target network slice is lower than the specific threshold, or the movement behavior analysis or prediction result of the terminal device requesting access indicates that the service load of the terminal device requesting access is lower than the specific threshold.

S810. The PCF network element sends a message u1 to the AMF-A network element. Correspondingly, the AMF-A network element receives the message u1 from the PCF network element.

For example, the message u1 in this embodiment of this application may be, for example, an associated registration management policy response shown in FIG. 8A to FIG. 8C. This is not specifically limited in this embodiment of this application.

When the PCF network element determines in step S807 that the service usage of the target network slice in the first region reaches or exceeds the first service limit, the message u1 may carry an indication that the service usage of the target network slice in the first region reaches or exceeds the first service limit or an indication that the terminal device is not allowed to use the target network slice. Then, a branch 1 corresponding to the following step S811 may be performed. When the PCF network element determines in step S807 that the service usage of the target network slice in the first region does not exceed the first service limit, and the overall service usage of the target network slice does not exceed the overall limit of the target network slice, the message u1 may carry an indication that the terminal device is allowed to use the target network slice. Then, a branch 2 corresponding to the following step S814 may be performed. When the PCF network element determines in step S807 that the service usage of the target network slice in the first region does not exceed the first service limit, but the overall service usage of the target network slice reaches or exceeds the overall limit of the target network slice, when it is determined, based on step S808 and/or step S809, that the second condition is met, the message u1 may carry an indication that the terminal device is allowed to use the target network slice. Then, the branch 2 corresponding to the following step S814 may be performed. When the PCF network element determines in step S807 that the service usage of the target network slice in the first region does not exceed the first service limit, but the overall service usage of the target network slice reaches or exceeds the overall limit of the target network slice, when it is determined, based on step S808 and/or step S809, that the second condition is not met, the message u1 may carry an indication that the terminal device is not allowed to use the target network slice. Then, the branch 1 corresponding to the following step S811 may be performed. For a demarcation point at which the PCF network element determines that the service usage of the target network slice in the first region is equal to (that is, "reaches" mentioned above) the first service limit, the branch 1 corresponding to the following step S811 may be performed, or it may be further determined whether the overall service usage of the target network slice exceeds the overall limit of the target network slice. For a demarcation point at which the PCF network element determines that the overall service usage of the target network slice is equal to (that is, "reaches" mentioned above) the overall limit of the target network slice, the branch 2 corresponding to the following step S814 may be performed, or it may be determined whether the second condition is met. This is not specifically limited in this embodiment of this application.

Branch 1:

S811 is the same as step S708 in the embodiment shown in FIG. 7A and FIG. 7B. For related descriptions, refer to the embodiment shown in FIG. 7A and FIG. 7B. Details are not described herein again.

Optionally, in this embodiment of this application, for the branch 1, the following steps S812 and S813 may be further performed.

S812 and S813 are the same as steps S709 and S710 in the embodiment shown in FIG. 7A and FIG. 7B. For related descriptions, refer to the embodiment shown in FIG. 7A and FIG. 7B. Details are not described herein again.

Branch 2:

S814 is the same as step S711 in the embodiment shown in FIG. 7A and FIG. 7B. For related descriptions, refer to the embodiment shown in FIG. 7A and FIG. 7B. Details are not described herein again.

Further, after the terminal device is successfully registered, the PCF network element may further update the actual overall quantity of registered terminals of the target network slice and the actual quantity of registered terminals of the target network slice in the first region to the UDR network element. Subsequently, when the terminal device deregisters from the target network slice or moves out of the first region, the PCF network element may further update the actual overall quantity of registered terminals of the target network slice and the actual quantity of registered terminals of the target network slice in the first region to the UDR network element. This is not specifically limited in this embodiment of this application.

It should be noted that in this embodiment of this application, if a plurality of target network slices are determined in step S806, or the terminal device does not send request NSSAI, but there are a plurality of subscribed default network slices (in this case, each default network slice may be used as a target network slice), each target network slice may be separately processed based on steps S806 to S814, and details are not described herein again.

Further, after the terminal device is successfully registered, the method for controlling use of a network slice that is provided in this embodiment of this application further includes a session establishment procedure shown in the following steps S815 to S823 or the following steps S815 to S824.

S815 to S818 are the same as steps S712 to S715 in the embodiment shown in FIG. 7A and FIG. 7B. For related descriptions, refer to the embodiment shown in FIG. 7A and FIG. 7B. Details are not described herein again.

In addition, in this embodiment of this application, the PCF network element further needs to obtain, from the UDR network element, the overall restriction policy of the target network slice and the regional restriction policy of the target network slice in the first region (that is, the region A) (which may be referred to as the first regional restriction policy for short) that are required in the session establishment procedure. This is explained herein in a unified way, and not repeated below.

When the PCF network element determines that the service usage of the target network slice in the first region reaches or exceeds the first service limit, or when the PCF network element determines that the service usage of the target network slice in the first region does not exceed the first service limit, and the overall service usage of the target network slice does not exceed the overall limit of the target network slice, the following step S810 is directly performed. When the PCF network element determines that the service usage of the target network slice in the first region does not exceed the first service limit, but the overall service usage of the target network slice reaches or exceeds the overall limit of the target network slice, step S819 and/or step S820 and/or step S821 are first performed to determine whether the second condition is met, and then step S822 is performed.

S819. The PCF network element obtains the subscription information of the terminal device or the target network slice from the UDM network element, and determines, based on the subscription information of the terminal device or the target network slice, whether the following condition is met: the overall limit is allowed to be exceeded in the slice subscription information of the target network slice, or the charging mode of the target network slice is charging by session or by traffic, or the subscribed service type of the target network slice is the specific service type, or the terminal device requesting access is a high-value customer, or the subscribed quality of service QoS parameter of the terminal device indicates that the service of the terminal device is allowed to be preempted.

S820. The PCF network element obtains, from the NWDAF network element, one or more of the movement or communication behavior analysis or prediction result of the terminal device requesting access or the slice running analysis or prediction result of the target network slice, and determines whether the following condition is met: the slice running analysis or prediction result of the target network slice is lower than the specific threshold, or the movement or communication behavior analysis or prediction result of the terminal device requesting access indicates that the service load of the terminal device requesting access is lower than the specific threshold.

S821. When the overall service usage of the network slice obtained in step S817 is an overall session quantity, the PCF network element obtains a traffic bandwidth of the target network slice from the UDR network element. When the overall service usage of the network slice obtained in step S817 is a traffic bandwidth, the PCF network element obtains an overall session quantity of the target network slice from the UDR network element. Then, the PCF network element determines whether the overall session quantity and the traffic bandwidth of the target network slice are lower than the overload risk threshold.

S822. The PCF network element sends a message v1 to the SMF network element. Correspondingly, the SMF network element receives the message v1 from the PCF network element.

For example, the message v1 in this embodiment of this application may be, for example, an associated session management policy response shown in FIG. 8A to FIG. 8C. This is not specifically limited in this embodiment of this application.

When the PCF network element determines in step S818 that the service usage of the target network slice in the first region reaches or exceeds the first service limit, the message v1 may carry an indication that the service usage of the target network slice in the first region reaches or exceeds the first service limit or an indication that the terminal device is not allowed to use the target network slice. Then, a branch i corresponding to the following step S823 may be performed. When the PCF network element determines in step S818 that the service usage of the target network slice in the first region does not exceed the first service limit, and the overall service usage of the target network slice does not exceed the overall limit of the target network slice, the message v1 may carry an indication that the terminal device is allowed to use the target network slice. Then, a branch ii corresponding to the following step S824 may be performed. When the PCF network element determines in step S818 that the service usage of the target network slice in the first region does not exceed the first service limit, but the overall service usage of the target network slice reaches or exceeds the overall limit of the target network slice, when it is determined, based on step S819 and/or step S820 and/or step S821, that the second condition is met, the message v1 may carry an indication that the terminal device is allowed to use the target network slice. Then, the branch ii corresponding to the following step S824 may be performed. When the PCF network element determines in step S818 that the service usage of the target network slice in the first region does not exceed the first service limit, but the overall service usage of the target network slice reaches or exceeds the overall limit of the target network slice, when it is determined, based on step S819 and/or step S820 and/or step S821, that the second condition is not met, the message v1 may carry an indication that the terminal device is not allowed to use the target network slice. Then, the branch i corresponding to the following step S823 may be performed. For a demarcation point at which the PCF network element determines that the service usage of the target network slice in the first region is equal to (that is, "reaches" mentioned above) the first service limit, the branch i corresponding to the following step S823 may be performed, or it may be further determined whether the overall service usage of the target network slice exceeds the overall limit of the target network slice. For a demarcation point at which the PCF network element determines that the overall service usage of the target network slice is equal to (that is, "reaches" mentioned above) the overall limit of the target network slice, the branch ii corresponding to the following step S824 may be performed, or it may be determined whether the second condition is met. This is not specifically limited in this embodiment of this application.

Branch i:

S823 is the same as step S624 in the embodiment shown in FIG. 6A to FIG. 6C. For related descriptions, refer to the embodiment shown in FIG. 6A to FIG. 6C. Details are not described herein again.

Branch ii:

S824 is the same as step S625 in the embodiment shown in FIG. 6A to FIG. 6C. For related descriptions, refer to the embodiment shown in FIG. 6A to FIG. 6C. Details are not described herein again.

In this embodiment of this application, after the terminal device successfully establishes the session, the PCF network element may further update the overall service usage of the target network slice and the service usage of the target network slice in the first region in the session establishment process to the UDR network element. Subsequently, after the session is released, the PCF network element may further update the overall service usage of the target network slice and the service usage of the target network slice in the first region in the session establishment process to the UDR network element. If the session does not use a user plane node in the region due to movement of the terminal device, the PCF network element may also update the overall service usage of the target network slice and the service usage of the target network slice in the first region in the session establishment process to the UDR network element. This is not specifically limited in this embodiment of this application.

Because the target network slice in this embodiment of this application covers a plurality of regions, the first network element may determine, based on the first condition, whether to allow the terminal device to access the target network slice. In one aspect, the first condition includes: whether the service usage of the target network slice in the first region exceeds the first service limit. In other words, in this embodiment of this application, region-based control of access to the network slice is implemented. Therefore, a problem that a radio-side network node in a region is congested or overloaded, which cannot ensure service quality of the network slice, and may further affect service quality of another network slice can be avoided. In this way, excessive use of network slice resources by a customer can be limited, and the service quality of the network slice can be ensured. In another aspect, the first condition may further include: whether the overall service usage of the target network slice exceeds the overall limit. If terminal devices in a region in a network slice are very sparse, the region may have a large quantity of idle resources. However, because an overall service usage of the network slice exceeds a specified limit, access of the terminal devices in the region is also limited, causing a waste of resources in the region. Therefore, in this embodiment of this application, when the overall service usage of the target network slice reaches or exceeds the overall limit, but the service usage of the target network slice in the first region does not exceed the first service limit, if the second condition is met, the first network element allows the terminal device to use the target network slice. In other words, when the overall service usage of the target network slice reaches or exceeds the overall limit, but the service usage of the target network slice in the first region does not exceed the first service limit, in a specific scenario, a user may be allowed to use a resource of the target network slice in the first region, to improve network resource utilization. This can bring more economic benefits to an operator, and improve service experience of a high-value user.

Actions of the PCF network element in step S801 to step S823 or step S824 may be performed by the processor 301 in the communications device 300 shown in FIG. 3 by invoking the application program code stored in the memory 303. This is not limited in the embodiments of this application.

Figure 9A:
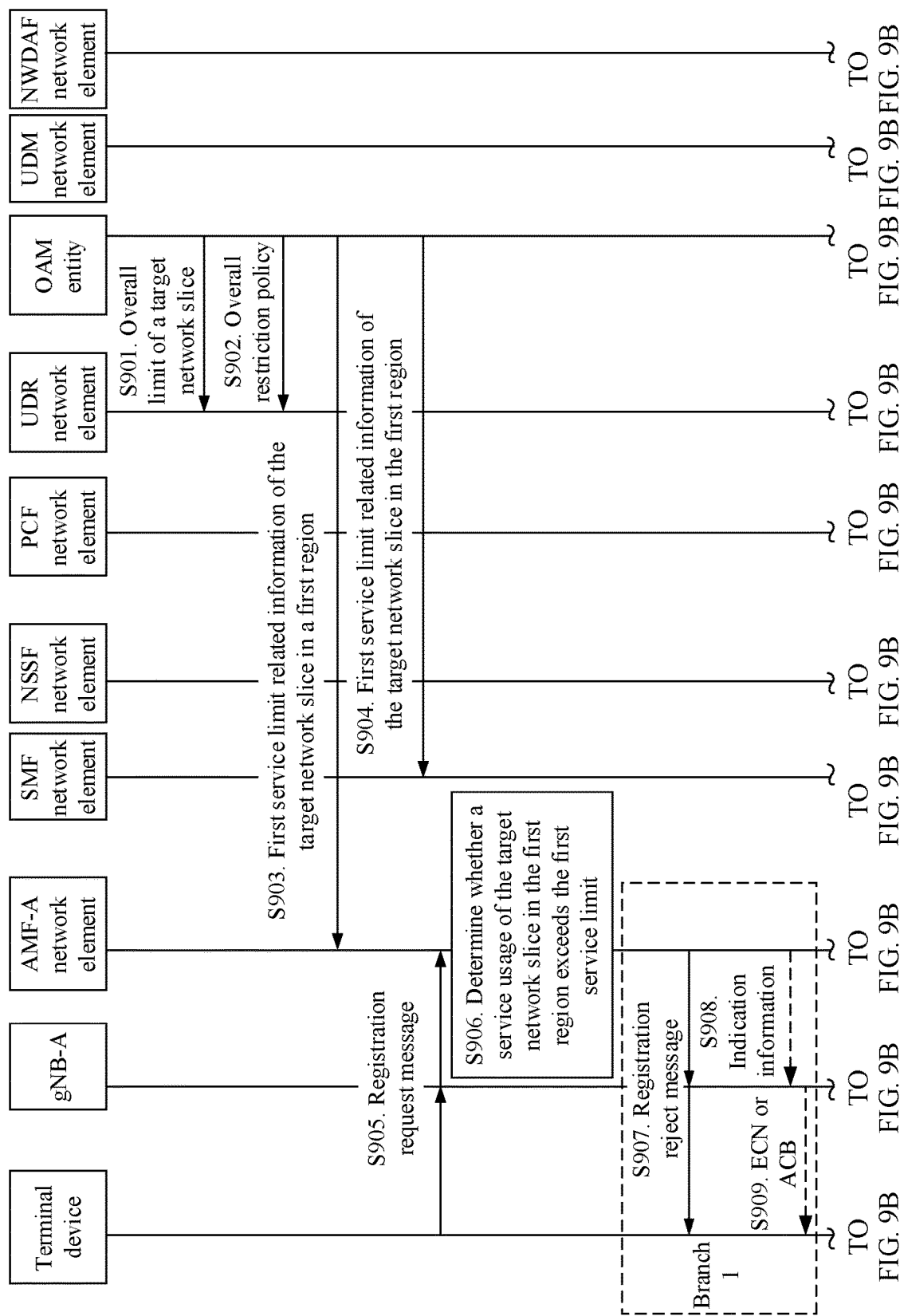
Figure 9B:
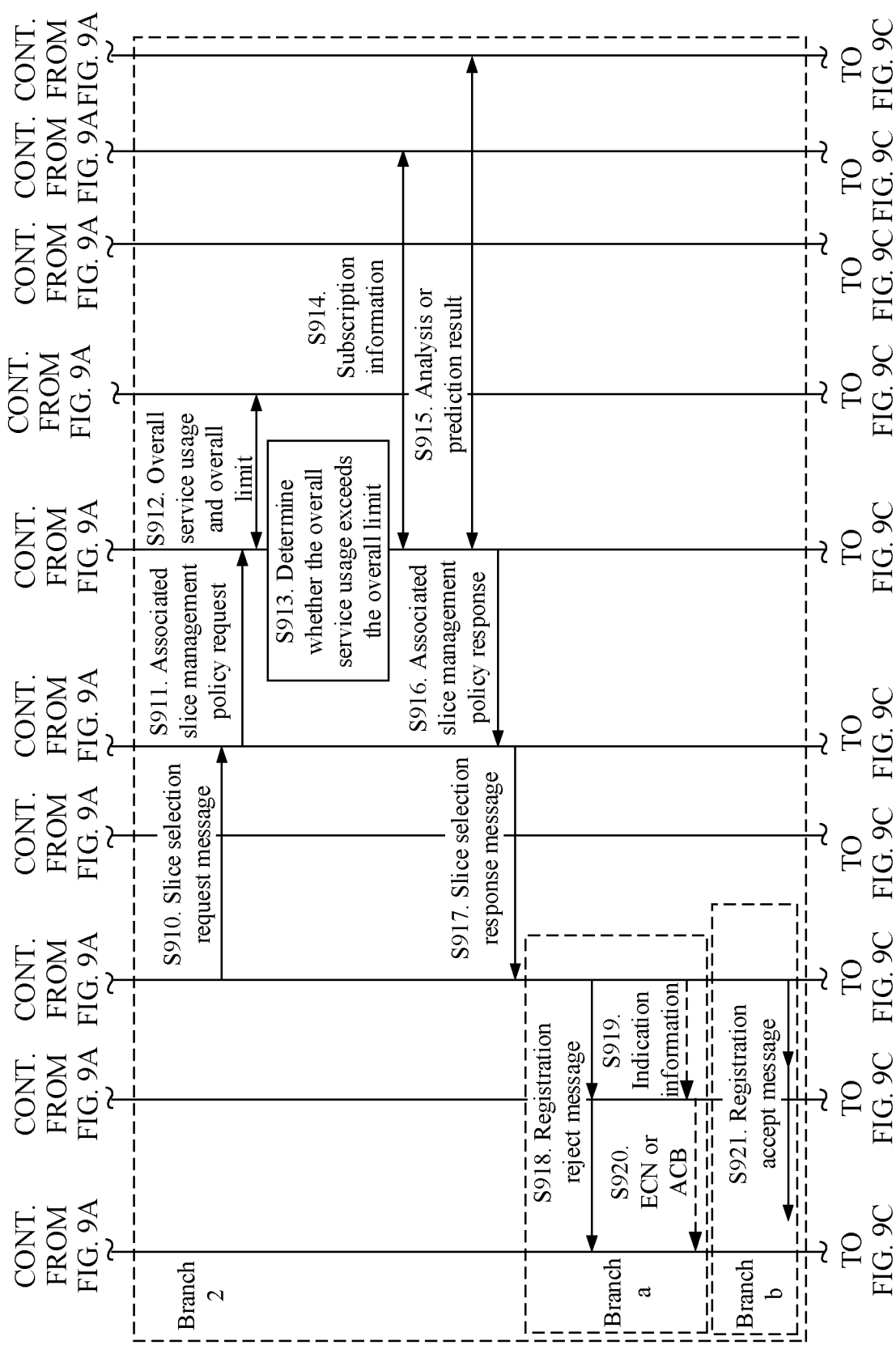

Optionally, for example, the first network element in the communications system shown in FIG. 1 is a policy control network element, the communications system shown in FIG. 1 is applied to the 5G network architecture shown in FIG. 2, and the first region is the region A in FIG. 2. FIG. 9A to FIG. 9C show another method for controlling use of a network slice according to an embodiment of this application, including the following steps.

S901 is the same as step S801 in the embodiment shown in FIG. 8A to FIG. 8C. For related descriptions, refer to the embodiment shown in FIG. 8A to FIG. 8C. Details are not described herein again.

S902. The OAM entity sends an overall restriction policy of the target network slice to the UDR network element. Correspondingly, the UDR network element receives the overall restriction policy of the target network slice from the OAM entity.

For related descriptions of the overall restriction policy of the target network slice, refer to step S803 in the embodiment shown in FIG. 8A to FIG. 8C. Details are not described herein again.

S903 and S904 are the same as steps S602 and S603 in the embodiment shown in FIG. 6A to FIG. 6C. For related descriptions, refer to the embodiment shown in FIG. 6A to FIG. 6C. Details are not described herein again.

It should be noted that, in this embodiment of this application, steps S901 to S904 are not necessarily performed in a specific order. One or more steps may be performed first, and then other steps are performed. Alternatively, the four steps may be performed simultaneously. This is not specifically limited in this embodiment of this application.

S905 and S906 are the same as steps S503 and S504 in the embodiment shown in FIG. 5A and FIG. 5B. For related descriptions, refer to the embodiment shown in FIG. 5A and FIG. 5B.

Details are not described herein again.

In this embodiment of this application, in the registration procedure of the terminal device, the service usage of the target network slice in the first region includes an actual quantity of registered terminals of the target network slice in the first region. In a registration management process, the AMF-A network element maintains an actual quantity of registered terminals of each currently served network slice in each region managed by the AMF-A network element, including the actual quantity of registered terminals of the target network slice in the first region. Further, the AMF-A network element may compare the actual quantity of registered terminals of the target network slice in the first region with the maximum quantity, determined in step S903, of registered terminals allowed by the target network slice in the first region. When the actual quantity of registered terminals of the target network slice in the first region reaches or exceeds the maximum quantity of registered terminals allowed by the target network slice in the first region, a branch 1 corresponding to the following step S907 is performed. When the actual quantity of registered terminals of the target network slice in the first region does not exceed the maximum quantity of registered terminals allowed by the target network slice in the first region, a branch 2 corresponding to the following step S910 and subsequent steps is performed. For a demarcation point at which the actual quantity of registered terminals of the target network slice in the first region is equal to (that is, "reaches" mentioned above) the maximum quantity of registered terminals allowed by the target network slice in the first region, the branch 1 corresponding to the following step S907 may be performed, or the branch 2 corresponding to the following step S910 and subsequent steps may be performed. This is not specifically limited in this embodiment of this application.

Branch 1:

Step S907 is the same as step S505 in the embodiment shown in FIG. 5A and FIG. 5B. For related descriptions, refer to the embodiment shown in FIG. 5A and FIG. 5B. Details are not described herein again.

Optionally, in this embodiment of this application, for the branch 1, the following steps S908 and S909 may be further performed.

S908 and S909 are the same as steps S506 and S507 in the embodiment shown in FIG. 5A and FIG. 5B. For related descriptions, refer to the embodiment shown in FIG. 5A and FIG. 5B. Details are not described herein again.

Branch 2:

Step S910 is the same as step S508 in the embodiment shown in FIG. 5A and FIG. 5B. For related descriptions, refer to the embodiment shown in FIG. 5A and FIG. 5B. Details are not described herein again.

S911. The NSSF network element sends a message a2 to a PCF network element. Correspondingly, the PCF network element receives the message a2 from the NSSF network element.

The message a2 carries the actual quantity of registered terminals of the target network slice in the first region.

For example, the message a2 in this embodiment of this application may be, for example, an associated slice management policy request shown in FIG. 9A to FIG. 9C. This is not specifically limited in this embodiment of this application.

S912 and S913 are the same as steps S610 and S611 in the embodiment shown in FIG. 6A to FIG. 6C. For related descriptions, refer to the embodiment shown in FIG. 6A to FIG. 6C. Details are not described herein again.

In addition, in this embodiment of this application, the PCF network element further needs to obtain, from the UDR network element, the overall restriction policy of the target network slice that is required in the registration procedure. This is explained herein in a unified way, and not repeated below.

When the PCF network element determines that the overall service usage of the target network slice does not exceed the overall limit of the target network slice, the following step S916 is directly performed. When the PCF network element determines that the overall service usage of the target network slice reaches or exceeds the overall limit of the target network slice, step S914 and/or step S915 are first performed to determine whether a second condition is met, and then step S916 is performed.

S914 and S915 are the same as steps S808 and S809 in the embodiment shown in FIG. 8A to FIG. 8C. For related descriptions, refer to the embodiment shown in FIG. 8A to FIG. 8C. Details are not described herein again.

S916. The PCF network element sends a message b2 to the NSSF network element. Correspondingly, the NSSF network element receives the message b2 from the PCF network element.

For example, the message b2 in this embodiment of this application may be, for example, an associated slice management policy response shown in FIG. 9A to FIG. 9C. This is not specifically limited in this embodiment of this application.

S917. The NSSF network element sends a message c2 to the AMF-A network element. Correspondingly, the AMF-A network element receives the message c2 from the NSSF network element.

For example, the message c2 in this embodiment of this application may be, for example, a slice selection response message shown in FIG. 9A to FIG. 9C. This is not specifically limited in this embodiment of this application.

When the PCF network element determines in step S913 that the overall service usage of the target network slice does not exceed the overall limit of the target network slice, the message b2 may carry a quota of a service usage in the first region or an indication that the terminal device is allowed to use the target network slice, and the message c2 may carry the quota of the service usage in the first region or the indication that the terminal device is allowed to use the target network slice. Then, a branch b corresponding to the following step S921 may be performed. When the PCF network element determines in step S913 that the overall service usage of the target network slice reaches or exceeds the overall limit of the target network slice, when it is determined, based on step S914 and/or step S915, that the second condition is met, the message b2 may carry a quota of a service usage in the first region, an indication that the terminal device is allowed to use the target network slice, or an over-limit access identifier, and the message c2 may carry the quota of the service usage in the first region, the indication that the terminal device is allowed to use the target network slice, or the over-limit access identifier. Then, the branch b corresponding to the following step S921 may be performed. When the PCF network element determines in step S913 that the overall service usage of the target network slice reaches or exceeds the overall limit of the target network slice, when it is determined, based on step S914 and/or step S915, that the second condition is not met, the message b2 and the message c2 may carry an indication that the terminal device is not allowed to use the target network slice. Then, a branch a corresponding to the following step S918 may be performed. For a demarcation point at which the PCF network element determines that the overall service usage of the target network slice is equal to (that is, "reaches" mentioned above) the overall limit of the target network slice, the branch b corresponding to the following step S921 may be performed, or it may be determined whether the second condition is met. This is not specifically limited in this embodiment of this application.

Branch a:

S918 is the same as step S708 in the embodiment shown in FIG. 7A and FIG. 7B. For related descriptions, refer to the embodiment shown in FIG. 7A and FIG. 7B. Details are not described herein again.

Optionally, in this embodiment of this application, for the branch a, the following steps S812 and S813 may be further performed.

S919 and S920 are the same as steps S709 and S710 in the embodiment shown in FIG. 7A and FIG. 7B. For related descriptions, refer to the embodiment shown in FIG. 7A and FIG. 7B. Details are not described herein again.

Branch b:

S921 is the same as step S711 in the embodiment shown in FIG. 7A and FIG. 7B. For related descriptions, refer to the embodiment shown in FIG. 7A and FIG. 7B. Details are not described herein again.

Further, after the terminal device is successfully registered, the PCF network element may further update the actual overall quantity of registered terminals of the target network slice to the UDR network element. Subsequently, when the terminal device deregisters from the target network slice or moves out of the first region, the PCF network element may further update the actual overall quantity of registered terminals of the target network slice to the UDR network element. This is not specifically limited in this embodiment of this application.

It should be noted that in this embodiment of this application, if a plurality of target network slices are determined in step S906, or the terminal device does not send request NSSAI, but there are a plurality of subscribed default network slices (in this case, each default network slice may be used as a target network slice), each target network slice may be separately processed based on steps S906 to S921, and details are not described herein again.

Further, after the terminal device is successfully registered, the method for controlling use of a network slice that is provided in this embodiment of this application further includes a session establishment procedure shown in the following steps S922 to S932 or the following steps S922 to S933.

S922 and S923 are the same as steps S617 and S618 in the embodiment shown in FIG. 6A to FIG. 6C. For related descriptions, refer to the embodiment shown in FIG. 6A to FIG. 6C.

Details are not described herein again.

When the service usage of the target network slice in the first region reaches or exceeds the first service limit, a branch 3 corresponding to the following step S924 is performed. When the service usage of the target network slice in the first region does not exceed the first service limit, a branch 4 corresponding to the following step S925 and subsequent steps is performed.

Branch 3:

S924 is the same as step S619 in the embodiment shown in FIG. 6A to FIG. 6C. For related descriptions, refer to the embodiment shown in FIG. 6A to FIG. 6C. Details are not described herein again.

Branch 4:

S925 to S927 are the same as steps S620 to S622 in the embodiment shown in FIG. 6A to FIG. 6C. For related descriptions, refer to the embodiment shown in FIG. 6A to FIG. 6C. Details are not described herein again.

In addition, in this embodiment of this application, the PCF network element further needs to obtain, from the UDR network element, the overall restriction policy of the target network slice that is required in the session establishment procedure. This is explained herein in a unified way, and not repeated below.

When the PCF network element determines that the overall service usage of the target network slice does not exceed the overall limit of the target network slice, the following step S931 is directly performed. When the PCF network element determines that the overall service usage of the target network slice reaches or exceeds the overall limit of the target network slice, step S928 and/or step S929 and/or step S930 are first performed to determine whether the second condition is met, and then step S931 is performed.

S928 to S930 are the same as steps S819 to S821 in the embodiment shown in FIG. 8A to FIG. 8C. For related descriptions, refer to the embodiment shown in FIG. 8A to FIG. 8C. Details are not described herein again.

S931. The PCF network element sends a message d2 to the SMF network element. Correspondingly, the SMF network element receives the message d2 from the PCF network element.

For example, the message d2 in this embodiment of this application may be, for example, an associated session management policy response shown in FIG. 9A to FIG. 9C. This is not specifically limited in this embodiment of this application.

When the PCF network element determines in step S927 that the overall service usage of the target network slice does not exceed the overall limit of the target network slice, the message d2 may carry an indication that the terminal device is allowed to use the target network slice. Then, a branch ii corresponding to the following step S933 may be performed. When the PCF network element determines in step S927 that the overall service usage of the target network slice reaches or exceeds the overall limit of the target network slice, when it is determined, based on step S928 and/or step S929 and/or step S930, that the second condition is met, the message d2 may carry an indication that the terminal device is allowed to use the target network slice or an over-limit access identifier. Then, the branch ii corresponding to the following step S933 may be performed. When the PCF network element determines in step S927 that the overall service usage of the target network slice reaches or exceeds the overall limit of the target network slice, when it is determined, based on step S928 and/or step S929 and/or step S930, that the second condition is not met, the message d2 may carry an indication that the terminal device is not allowed to use the target network slice. Then, a branch i corresponding to the following step S932 may be performed. For a demarcation point at which the PCF network element determines that the overall service usage of the target network slice is equal to (that is, "reaches" mentioned above) the overall limit of the target network slice, the branch ii corresponding to the following step S933 may be performed, or it may be determined whether the second condition is met. This is not specifically limited in this embodiment of this application.

Branch i:

S932 is the same as step S823 in the embodiment shown in FIG. 8A to FIG. 8C. For related descriptions, refer to the embodiment shown in FIG. 8A to FIG. 8C. Details are not described herein again.

Branch ii:

S933 is the same as step S824 in the embodiment shown in FIG. 8A to FIG. 8C. For related descriptions, refer to the embodiment shown in FIG. 8A to FIG. 8C. Details are not described herein again.

In this embodiment of this application, after the terminal device successfully establishes the session, the PCF network element may further update the overall service usage of the target network slice in the session establishment process to the UDR network element. Subsequently, after the session is released, the PCF network element may further update the overall service usage of the target network slice in the session establishment process to the UDR network element. If the session does not use a user plane node in the region due to movement of the terminal device, the PCF network element may also update the overall service usage of the target network slice in the session establishment process to the UDR network element. This is not specifically limited in this embodiment of this application.

Optionally, in this embodiment of this application, step S904 may not be performed, but the first service limit related information, configured in step S903, of the target network slice in the first region may include the corresponding first service limit related information of the target network slice in the first region in the session establishment procedure of the terminal device. Further, in a session establishment process of the terminal device, the AMF-A network element determines whether the service usage of the target network slice in the first region exceeds the first service limit, and when the AMF-A network element determines that the service usage of the target network slice in the first region reaches or exceeds the first service limit, step S924 is performed. When the AMF-A network element determines that the service usage of the target network slice in the first region does not exceed the first service limit, after the AMF-A network element sends the session establishment request to the SMF network element, subsequent steps S925 to S932 or steps S925 to S933 are performed. This is not specifically limited in this embodiment of this application.

For a technical effect of the embodiment shown in FIG. 9A to FIG. 9C, refer to the embodiment shown in FIG. 8A to FIG. 8C. Details are not described herein again.

Actions of the PCF network element, the AMF-A network element, or the SMF network element in step S901 to step S932 or step S933 may be performed by the processor 301 in the communications device 300 shown in FIG. 3 by invoking the application program code stored in the memory 303. This is not limited in the embodiments of this application.

Figure 10A:
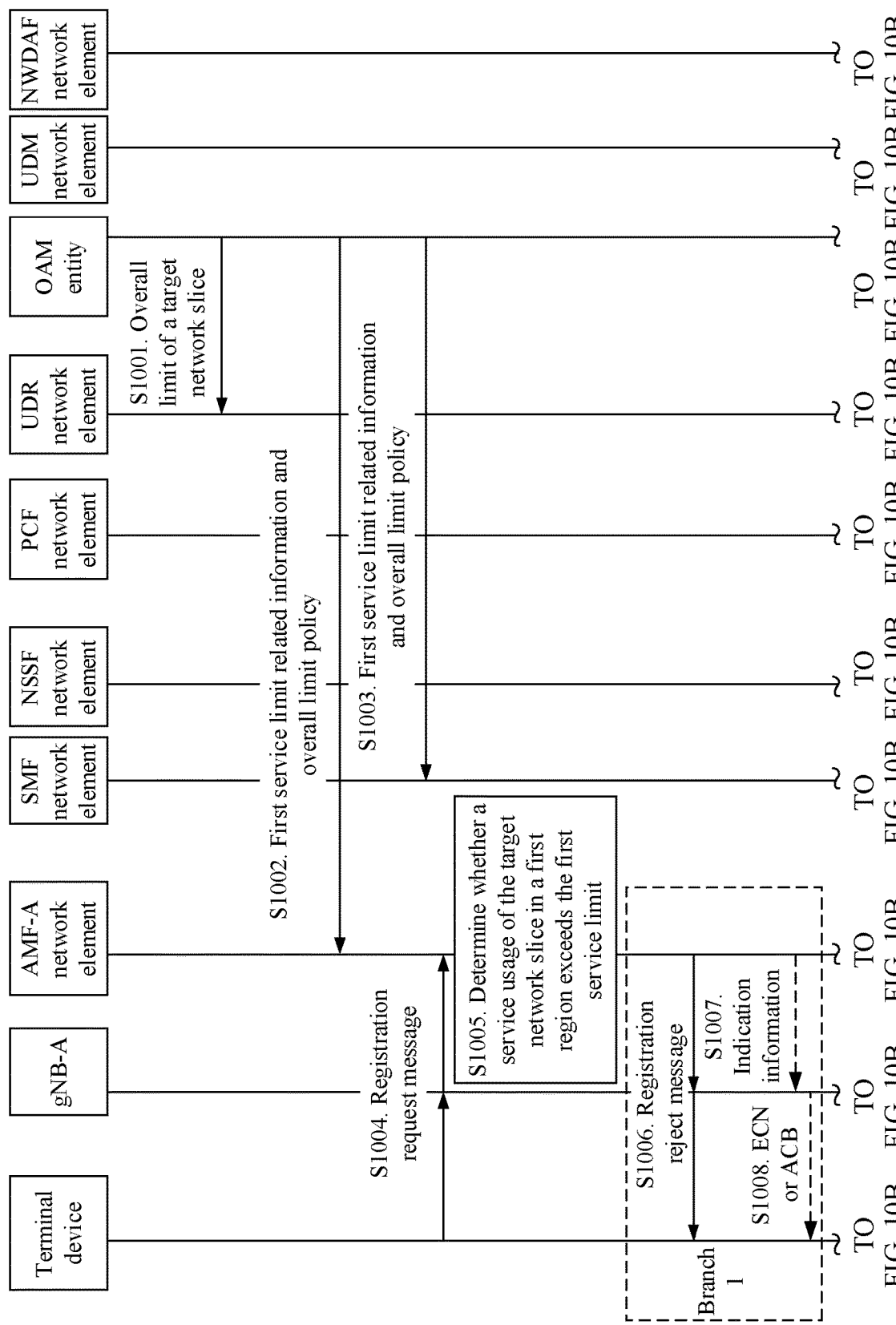
FIG. 10A to FIG. 10C are a schematic interaction flowchart 6 of a method for controlling use of a network slice according to an embodiment of this application.
Figure 10B:
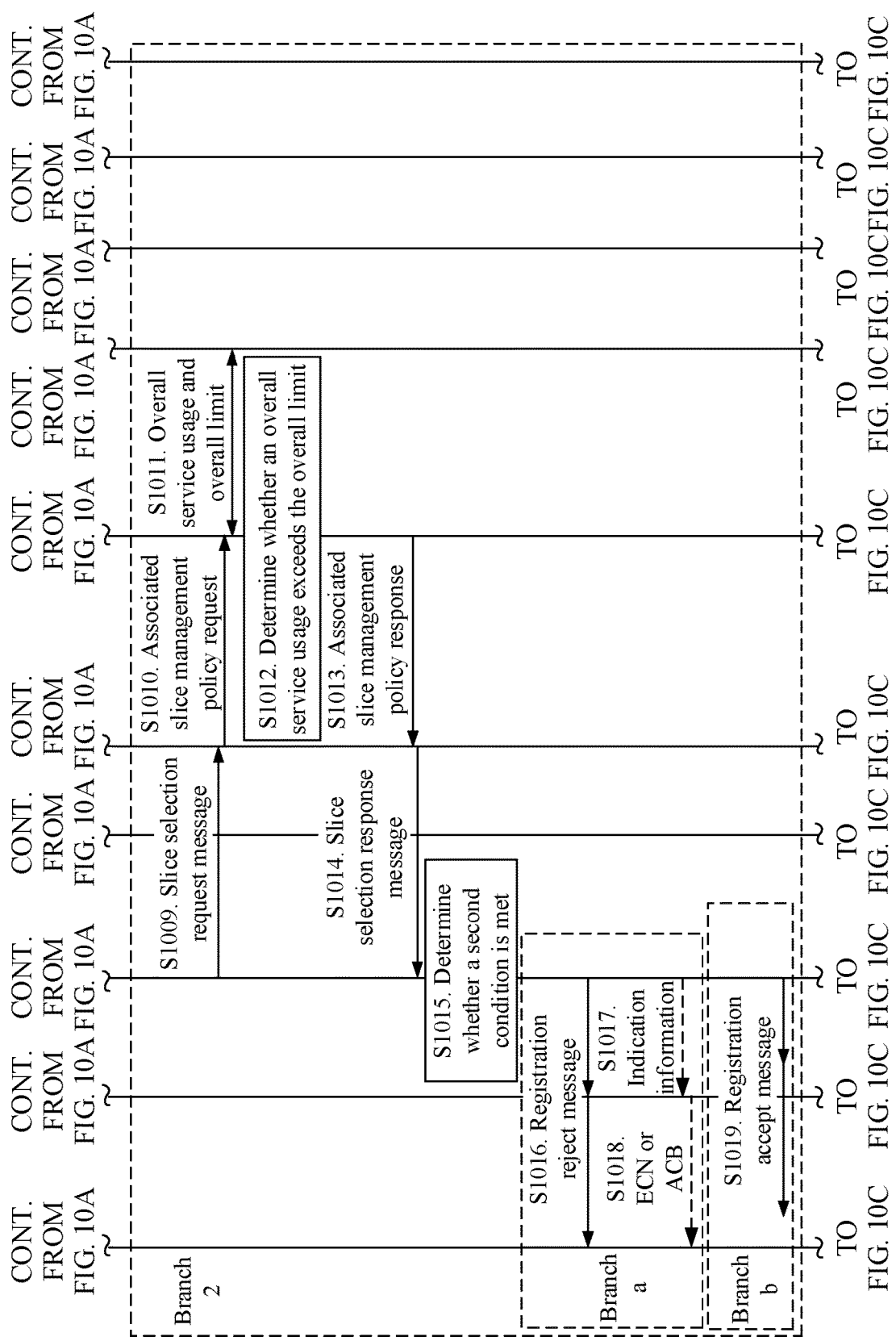
Figure 10C:
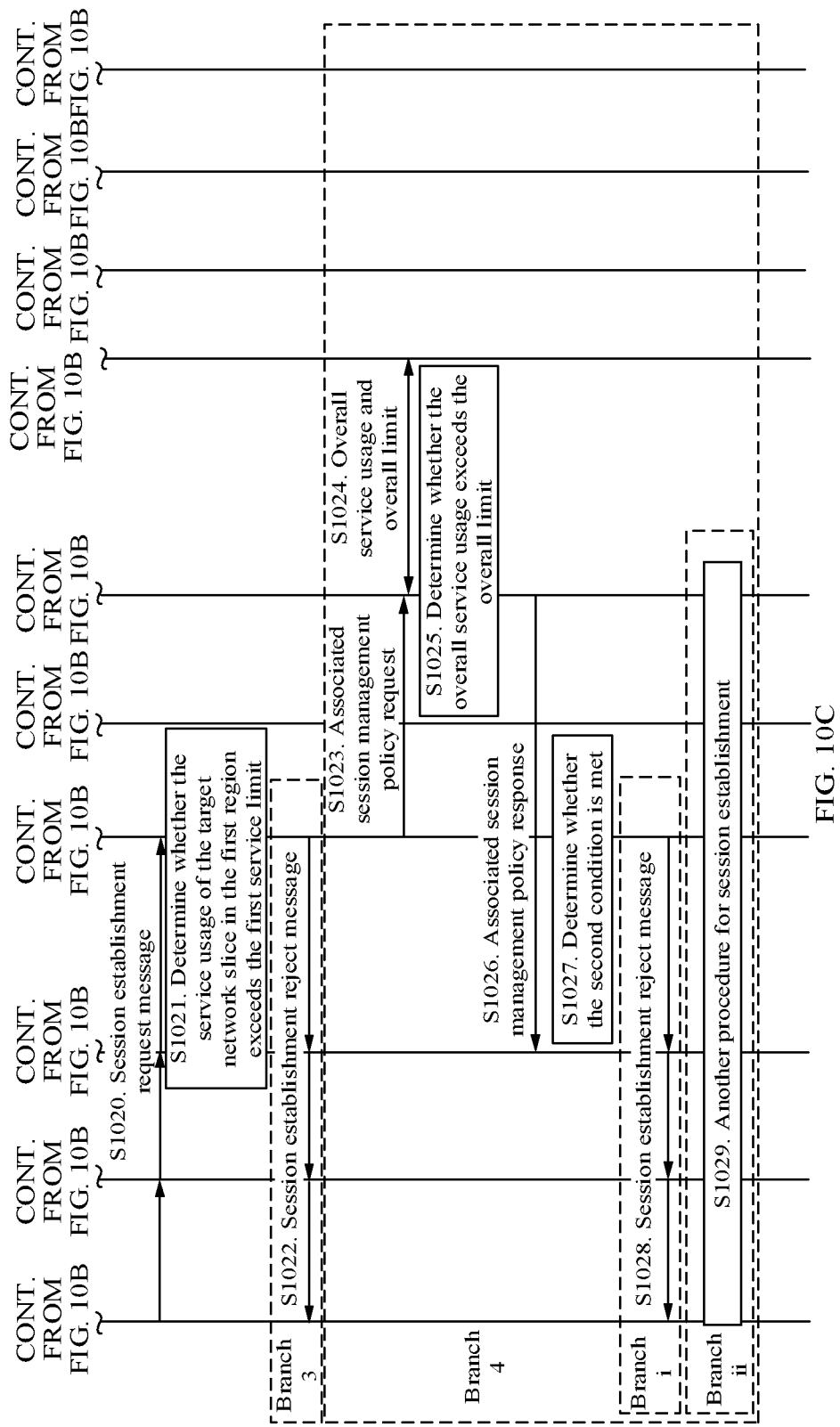

Optionally, for example, the first network element in the communications system shown in FIG. 1 is a mobility management network element or a session management network element, the communications system shown in FIG. 1 is applied to the 5G network architecture shown in FIG. 2, and the first region is the region A in FIG. 2. FIG. 10A to FIG. 10C show another method for controlling use of a network slice according to an embodiment of this application, including the following steps.

S1001 is the same as step S801 in the embodiment shown in FIG. 8A to FIG. 8C. For related descriptions, refer to the embodiment shown in FIG. 8A to FIG. 8C. Details are not described herein again.

S1002. The OAM entity sends, to an AMF network element in each region covered by the target network slice, service limit related information of the target network slice in each region and an overall limit policy of the target network slice. Correspondingly, the AMF network element in each region covered by the target network slice receives, from the OAM entity, the service limit related information of the target network slice in each region and the overall limit policy of the target network slice. FIG. 10A to FIG. 10C merely show an example for description, in which the OAM entity sends first service limit related information of the target network slice in a first region (that is, the region A) covered by the target network slice and the overall limit policy of the target network slice to an AMF-A network element in the first region. Correspondingly, the AMF-A network element receives, from the OAM entity, the first service limit related information of the target network slice in the first region and the overall limit policy of the target network slice.

Optionally, the first service limit related information in step S1002 includes a first service limit or information used to determine the first service limit that is required in a registration procedure of a terminal device. For related descriptions of the first service limit or the information used to determine the first service limit that is required in the registration procedure of the terminal device, refer to step S502 in the embodiment shown in FIG. 5A and FIG. 5B. Details are not described herein again. The overall limit policy of the target network slice in step S1002 may be, for example, when an overall service usage of the target network slice reaches or exceeds the overall limit, but a service usage of the target network slice in a region does not exceed a service limit in the region, if a second condition is met, allowing the terminal device to use the target network slice.

For example, in this embodiment of this application, a corresponding second condition in the registration procedure of the terminal device may include, for example, when an NSSF network element indicates that the overall service usage of the target network slice reaches or exceeds the overall limit, a session quantity quota indicated by the NSSF network element exceeds a specified quantity.

S1003. The OAM entity sends, to an SMF network element in each region covered by the target network slice, the service limit related information of the target network slice in each region and the overall limit policy of the target network slice. Correspondingly, the SMF network element in each region covered by the target network slice receives, from the OAM entity, the service limit related information of the target network slice in each region and the overall limit policy of the target network slice. FIG. 10A to FIG. 10C merely show an example for description, in which the OAM entity sends the first service limit related information of the target network slice in the first region (that is, the region A) covered by the target network slice and the overall limit policy of the target network slice to an SMF network element in the first region. Correspondingly, the SMF network element receives, from the OAM entity, the first service limit related information of the target network slice in the first region and the overall limit policy of the target network slice.

Optionally, the first service limit related information in step S1003 includes a first service limit or information used to determine the first service limit that is required in a session establishment procedure of the terminal device. For related descriptions of the first service limit or the information used to determine the first service limit that is required in the session establishment procedure of the terminal device, refer to step S502 in the embodiment shown in FIG. 5A and FIG. 5B. Details are not described herein again. The overall limit policy of the target network slice in step S1003 may be, for example, when an overall service usage of the target network slice reaches or exceeds the overall limit, but a service usage of the target network slice in a region does not exceed a service limit in the region, if a second condition is met, allowing the terminal device to use the target network slice.

For example, in this embodiment of this application, a corresponding second condition in the session establishment procedure of the terminal device may be, for example, when a PCF network element indicates that the overall service usage of the target network slice reaches or exceeds the overall limit, a service QoS parameter of the terminal device indicates that a session can be preempted.

It should be noted that, in this embodiment of this application, step S1001, step S1002, and step S1003 are not necessarily performed in a specific order. Any one of the steps may be performed first, and then the remaining two steps are separately performed. Alternatively, two of the steps are performed simultaneously, and then the remaining step is performed. Alternatively, one of the steps may be performed first, and then the remaining two steps are performed simultaneously. Alternatively, the three steps may be performed simultaneously. This is not specifically limited in this embodiment of this application.

S1004 and S1005 are the same as steps S905 and S906 in the embodiment shown in FIG. 9A to FIG. 9C. For related descriptions, refer to the embodiment shown in FIG. 9A to FIG. 9C. Details are not described herein again.

In this embodiment of this application, in the registration procedure of the terminal device, the service usage of the target network slice in the first region includes an actual quantity of registered terminals of the target network slice in the first region. In a registration management process, the AMF-A network element maintains an actual quantity of registered terminals of each currently served network slice in each region managed by the AMF-A network element, including the actual quantity of registered terminals of the target network slice in the first region. Further, the AMF-A network element may compare the actual quantity of registered terminals of the target network slice in the first region with the maximum quantity, determined in step S1002, of registered terminals allowed by the target network slice in the first region. When the actual quantity of registered terminals of the target network slice in the first region reaches or exceeds the maximum quantity of registered terminals allowed by the target network slice in the first region, a branch 1 corresponding to the following step S1006 is performed. When the actual quantity of registered terminals of the target network slice in the first region does not exceed the maximum quantity of registered terminals allowed by the target network slice in the first region, a branch 2 corresponding to the following step S1009 and subsequent steps is performed. For a demarcation point at which the actual quantity of registered terminals of the target network slice in the first region is equal to (that is, "reaches" mentioned above) the maximum quantity of registered terminals allowed by the target network slice in the first region, the branch 1 corresponding to the following step S1006 may be performed, or the branch 2 corresponding to the following step S1009 and subsequent steps may be performed. This is not specifically limited in this embodiment of this application.

Branch 1:

S1006 is the same as step S907 in the embodiment shown in FIG. 9A to FIG. 9C. For related descriptions, refer to the embodiment shown in FIG. 9A to FIG. 9C. Details are not described herein again.

Optionally, in this embodiment of this application, for the branch 1, the following steps S908 and S909 may be further performed.

S1007 and S1008 are the same as steps S908 and S909 in the embodiment shown in FIG. 9A to FIG. 9C. For related descriptions, refer to the embodiment shown in FIG. 9A to FIG. 9C. Details are not described herein again.

Branch 2:

S1009 to S1012 are the same as steps S910 to S913 in the embodiment shown in FIG. 9A to FIG. 9C. For related descriptions, refer to the embodiment shown in FIG. 9A to FIG. 9C. Details are not described herein again.

S1013 and S1014 are the same as steps S916 and S917 in the embodiment shown in FIG. 9A to FIG. 9C. For related descriptions, refer to the embodiment shown in FIG. 9A to FIG. 9C. Details are not described herein again.

When the PCF network element determines in step S1012 that the overall service usage of the target network slice does not exceed the overall limit of the target network slice, the message b2 may carry a quota of a service usage in the first region or an indication that the terminal device is allowed to use the target network slice, and the message c2 may carry the quota of the service usage in the first region or the indication that the terminal device is allowed to use the target network slice. Then, a branch b corresponding to the following step S1019 may be performed. When the PCF network element determines in step S1012 that the overall service usage of the target network slice reaches or exceeds the overall limit of the target network slice, the message b2 and the message c2 may carry a quota (0) of a service usage in the first region or an indication that the overall service usage of the target network slice reaches or exceeds the overall limit of the target network slice. In addition, the message b2 and the message c2 may further carry the session quantity quota of the target network slice in the first region. Then, the following step S1015 is performed.

S1015. The AMF-A network element determines whether the second condition in step S1002 is met.

When the AMF-A network element determines that the second condition in step S1002 is met, the branch b corresponding to the following step S1019 is performed. When the AMF-A network element determines that the second condition in step S1002 is not met, a branch a corresponding to the following step S1016 is performed. For a demarcation point at which the PCF network element determines that the overall service usage of the target network slice is equal to (that is, "reaches" mentioned above) the overall limit of the target network slice, the branch b corresponding to the following step S1019 may be performed, or step S1015 may be performed. This is not specifically limited in this embodiment of this application.

Branch a:

S1016 is the same as step S918 in the embodiment shown in FIG. 9A to FIG. 9C. For related descriptions, refer to the embodiment shown in FIG. 9A to FIG. 9C. Details are not described herein again.

Optionally, in this embodiment of this application, for the branch a, the following steps S1017 and S1018 may be further performed.

S1017 and S1018 are the same as steps S919 and S920 in the embodiment shown in FIG. 9A to FIG. 9C. For related descriptions, refer to the embodiment shown in FIG. 9A to FIG. 9C. Details are not described herein again.

Branch b:

S1019 is the same as step S921 in the embodiment shown in FIG. 9A to FIG. 9C. For related descriptions, refer to the embodiment shown in FIG. 9A to FIG. 9C. Details are not described herein again.

Further, after the terminal device is successfully registered, the PCF network element may further update the actual overall quantity of registered terminals of the target network slice to the UDR network element. Subsequently, when the terminal device deregisters from the target network slice or moves out of the first region, the PCF network element may further update the actual overall quantity of registered terminals of the target network slice to the UDR network element. This is not specifically limited in this embodiment of this application.

It should be noted that in this embodiment of this application, if a plurality of target network slices are determined in step S1005, or the terminal device does not send request NSSAI, but there are a plurality of subscribed default network slices (in this case, each default network slice may be used as a target network slice), each target network slice may be separately processed based on steps S1005 to S1019, and details are not described herein again.

Further, after the terminal device is successfully registered, the method for controlling use of a network slice that is provided in this embodiment of this application further includes a session establishment procedure shown in the following steps S1020 to S1028 or the following steps S1020 to S1029.

S1020 and S1021 are the same as steps S922 and S923 in the embodiment shown in FIG. 9A to FIG. 9C. For related descriptions, refer to the embodiment shown in FIG. 9A to FIG. 9C. Details are not described herein again.

When the service usage of the target network slice in the first region reaches or exceeds the first service limit, a branch 3 corresponding to the following step S1022 is performed. When the service usage of the target network slice in the first region does not exceed the first service limit, a branch 4 corresponding to the following step S1023 and subsequent steps is performed.

Branch 3:

S1022 is the same as step S924 in the embodiment shown in FIG. 9A to FIG. 9C. For related descriptions, refer to the embodiment shown in FIG. 9A to FIG. 9C. Details are not described herein again.

Branch 4:

S1023 to S1025 are the same as steps S925 to S927 in the embodiment shown in FIG. 9A to FIG. 9C. For related descriptions, refer to the embodiment shown in FIG. 9A to FIG. 9C.

Details are not described herein again.

S1026 is the same as step S931 in the embodiment shown in FIG. 9A to FIG. 9C. For related descriptions, refer to the embodiment shown in FIG. 9A to FIG. 9C. Details are not described herein again.

When the PCF network element determines in step S1025 that the overall service usage of the target network slice does not exceed the overall limit of the target network slice, the message d2 may carry a quota of a service usage in the first region and an indication that the terminal device is allowed to use the target network slice. Then, a branch ii corresponding to the following step S1029 may be performed. When the PCF network element determines in step S1025 that the overall service usage of the target network slice reaches or exceeds the overall limit of the target network slice, the message d2 may carry a quota (0) of a service usage in the first region or an indication that the overall service usage of the target network slice reaches or exceeds the overall limit of the target network slice. In addition, the message d2 may further carry the service QoS parameter of the terminal device. Then, the following step S1027 is performed.

S1027. The SMF network element determines whether the second condition in step S1003 is met.

When the SMF network element determines that the second condition in step S1003 is met, the branch ii corresponding to the following step S1029 is performed. When the SMF network element determines that the second condition in step S1003 is not met, a branch i corresponding to the following step S1028 is performed. For a demarcation point at which the PCF network element determines that the overall service usage of the target network slice is equal to (that is, "reaches" mentioned above) the overall limit of the target network slice, the branch ii corresponding to the following step S1029 may be performed, or step S1027 may be performed. This is not specifically limited in this embodiment of this application.

Branch i:

S1028 is the same as step S932 in the embodiment shown in FIG. 9A to FIG. 9C. For related descriptions, refer to the embodiment shown in FIG. 9A to FIG. 9C. Details are not described herein again.

Branch ii:

S1029 is the same as step S933 in the embodiment shown in FIG. 9A to FIG. 9C. For related descriptions, refer to the embodiment shown in FIG. 9A to FIG. 9C. Details are not described herein again.

In this embodiment of this application, after the terminal device successfully establishes the session, the PCF network element may further update the overall service usage of the target network slice in the session establishment process to the UDR network element. Subsequently, after the session is released, the PCF network element may further update the overall service usage of the target network slice in the session establishment process to the UDR network element. If the session does not use a user plane node in the region due to movement of the terminal device, the PCF network element may also update the overall service usage of the target network slice in the session establishment process to the UDR network element. This is not specifically limited in this embodiment of this application.

For a technical effect of the embodiment shown in FIG. 10A to FIG. 10C, refer to the embodiment shown in FIG. 8A to FIG. 8C. Details are not described herein again.

Actions of the PCF network element, the AMF-A network element, or the SMF network element in step S1001 to step S1028 or step S1029 may be performed by the processor 301 in the communications device 300 shown in FIG. 3 by invoking the application program code stored in the memory 303. This is not limited in the embodiments of this application.

Figure 11A:
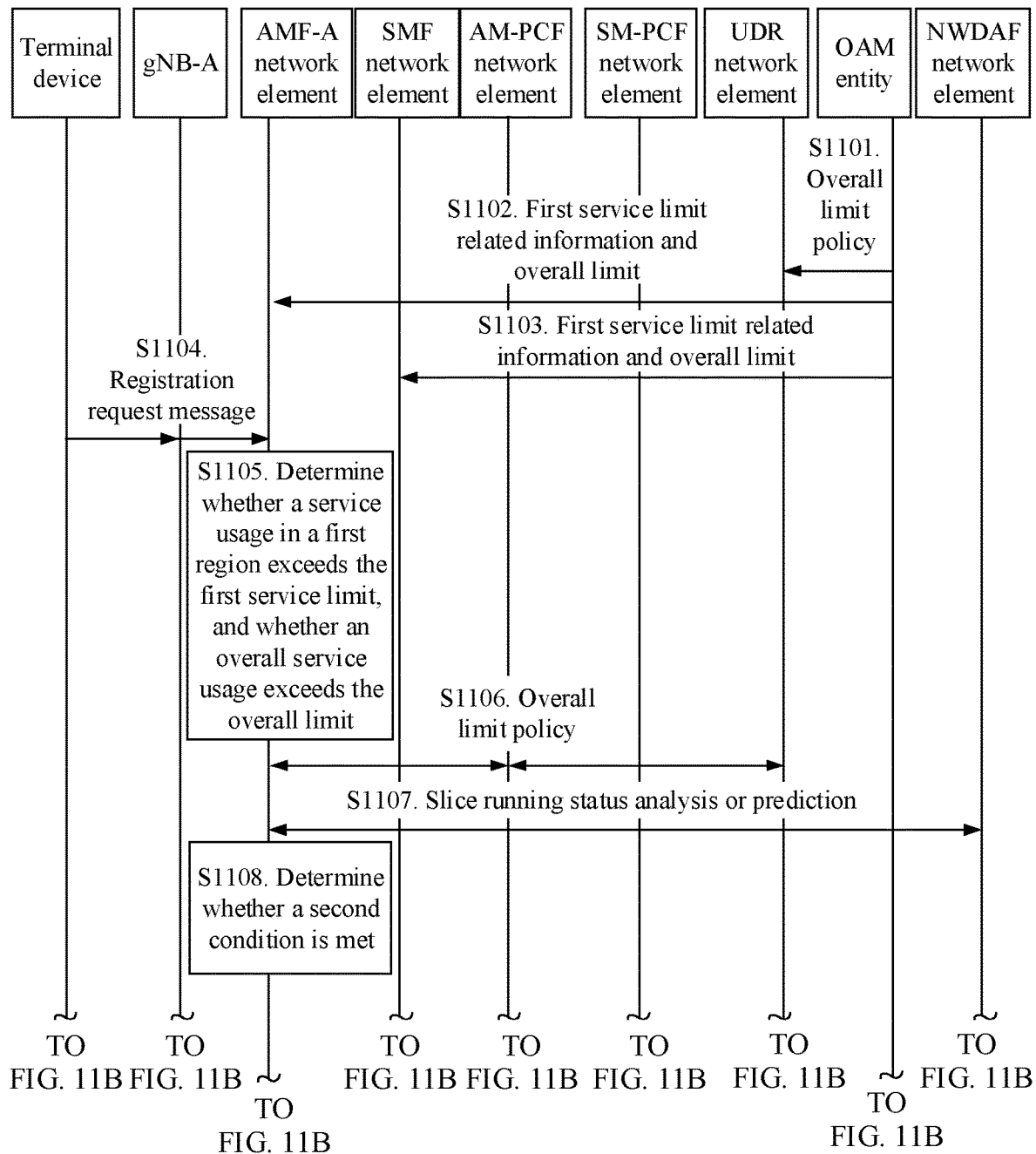
FIG. 11A and FIG. 11B are a schematic interaction flowchart 7 of a method for controlling use of a network slice according to an embodiment of this application.
Figure 11B:
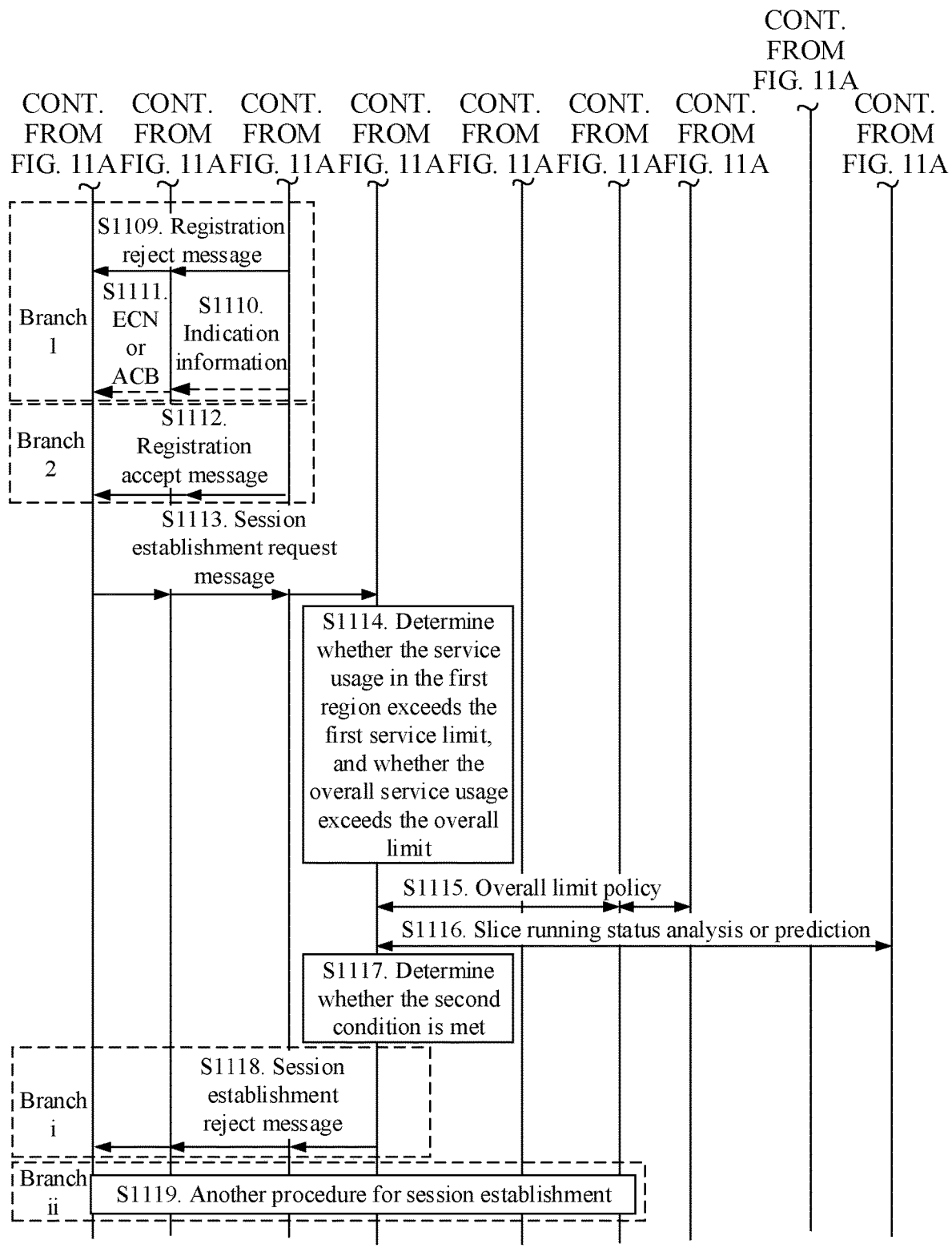

Optionally, for example, the first network element in the communications system shown in FIG. 1 is a mobility management network element or a session management network element, the communications system shown in FIG. 1 is applied to the 5G network architecture shown in FIG. 2, and the first region is the region A in FIG. 2. FIG. 11A and FIG. 11B show another method for controlling use of a network slice according to an embodiment of this application, including the following steps.

S1101. An OAM entity sends an overall restriction policy of a target network slice to a UDR network element. Correspondingly, the UDR network element receives the overall restriction policy of the target network slice from the OAM entity.

Optionally, in this embodiment of this application, the overall restriction policy of the target network slice may be, for example, when an overall service usage of the target network slice reaches or exceeds the overall limit, but a service usage of the target network slice in a region does not exceed a service limit in the region, if a second condition is met, allowing the terminal device to use the target network slice.

For example, the second condition herein may include: a running load of the target network slice in the first region at present or in the future is lower than a specified threshold; or an overall running load of the target network slice at present or in the future is lower than a specified threshold, or network performance of the target network slice in the first region at present or in the future is higher than a specified threshold.

S1102. The OAM entity sends, to an AMF network element in each region covered by the target network slice, service limit related information of the target network slice in each region and an overall limit of the target network slice. Correspondingly, the AMF network element in each region covered by the target network slice receives, from the OAM entity, the service limit related information of the target network slice in each region and the overall limit of the target network slice. FIG. 11A and FIG. 11B merely show an example for description, in which the OAM entity sends first service limit related information of the target network slice in a first region (that is, the region A) covered by the target network slice and the overall limit of the target network slice to an AMF-A network element in the first region. Correspondingly, the AMF-A network element receives, from the OAM entity, the first service limit related information of the target network slice in the first region and the overall limit of the target network slice.

For the service limit related information of the target network slice in each region and the overall limit of the target network slice in step S1102, refer to the service limit related information of the target network slice in each region and the overall limit of the target network slice that are required in a registration procedure of a terminal device in the embodiment shown in FIG. 5A and FIG. 5B. Details are not described herein again.

S1103. The OAM entity sends, to an SMF network element in each region covered by the target network slice, the service limit related information of the target network slice in each region and the overall limit of the target network slice. Correspondingly, the SMF network element in each region covered by the target network slice receives, from the OAM entity, the service limit related information of the target network slice in each region and the overall limit of the target network slice. FIG. 11A and FIG. 11B merely show an example for description, in which the OAM entity sends the first service limit related information of the target network slice in the first region (that is, the region A) covered by the target network slice and the overall limit of the target network slice to an SMF network element in the first region. Correspondingly, the SMF network element receives, from the OAM entity, the first service limit related information of the target network slice in the first region and the overall limit of the target network slice.

For the service limit related information of the target network slice in each region and the overall limit of the target network slice in step S1102, refer to the service limit related information of the target network slice in each region and the overall limit of the target network slice that are required in a session establishment procedure of the terminal device in the embodiment shown in FIG. 5A and FIG. 5B. Details are not described herein again.

It should be noted that, in this embodiment of this application, step S1101, step S1102, and step S1103 are not necessarily performed in a specific order. Any one of the steps may be performed first, and then the remaining two steps are separately performed. Alternatively, two of the steps are performed simultaneously, and then the remaining step is performed. Alternatively, one of the steps may be performed first, and then the remaining two steps are performed simultaneously. Alternatively, the three steps may be performed simultaneously. This is not specifically limited in this embodiment of this application.

S1104 is the same as step S1004 in the embodiment shown in FIG. 10A to FIG. 10C.

For related descriptions, refer to the embodiment shown in FIG. 10A to FIG. 10C. Details are not described herein again.

S1105. The AMF-A network element determines whether a service usage of the target network slice in the first region exceeds the first service limit, and the AMF-A network element determines whether an overall service usage of the target network slice exceeds the overall limit of the target network slice.

The service usage of the target network slice in the first region, the first service limit, the overall service usage of the target network slice, and the overall limit of the target network slice in step S1105 are all information required in the registration procedure of the terminal device. For related descriptions, refer to the embodiment shown in FIG. 4. Details are not described herein again.

When the AMF-A network element determines that the service usage of the target network slice in the first region reaches or exceeds the first service limit, a branch 1 corresponding to the following step S1109 is performed. When the AMF-A network element determines that the service usage of the target network slice in the first region does not exceed the first service limit, and the overall service usage of the target network slice does not exceed the overall limit of the target network slice, a branch 2 corresponding to the following step S1112 may be performed. When the AMF-A network element determines that the service usage of the target network slice in the first region does not exceed the first service limit, but the overall service usage of the target network slice reaches or exceeds the overall limit of the target network slice, steps S1106 to S1108 are performed.

S1106. The AMF-A network element obtains the overall limit policy of the target network slice from the UDR network element by using an access management (AM)-PCF network element.

It should be noted that in this embodiment of this application, the AM-PCF network element and the following session management (SM)-PCF network element may be considered as two independent network elements deployed after functions of the PCF network element shown in FIG. 2 are split. In other words, the PCF network element shown in FIG. 2 may be considered as a network element on which the AM-PCF network element and the SM-PCF network element in this embodiment of this application are integrated. The AM-PCF network element is mainly configured to manage access and mobility policies, and the SM-PCF network element is mainly configured to manage session policies. This is explained herein in a unified way, and not repeated below.

S1107. The AMF-A network element obtains a slice running status analysis or prediction from an NWDAF network element.

The slice running status analysis or prediction includes one or more of a running load of the target network slice in the first region, an overall running load of the target network slice, or network performance of the target network slice in the first region at present or in the future.

S1108. The AMF-A network element determines whether the second condition is met.

When the AMF-A network element determines that the second condition is met, the branch 2 corresponding to the following step S1112 is performed. When the AMF-A network element determines that the second condition is not met, the branch 1 corresponding to the following step S1109 is performed. For a demarcation point at which the AMF-A network element determines that the service usage of the target network slice in the first region is equal to (that is, "reaches" mentioned above) the first service limit, the branch 1 corresponding to the following step S1109 may be performed, or steps S1106 to S1108 may be performed. This is not specifically limited in this embodiment of this application. For a demarcation point at which the AMF-A network element determines that the service usage of the target network slice in the first region does not exceed the first service limit, but the overall service usage of the target network slice is equal to the overall limit of the target network slice, the branch 2 corresponding to the following step S1112 may be performed, or steps S1106 to S1108 may be performed. This is not specifically limited in this embodiment of this application.

Branch 1:

S1109 is the same as step S1016 in the embodiment shown in FIG. 10A to FIG. 10C.

For related descriptions, refer to the embodiment shown in FIG. 10A to FIG. 10C. Details are not described herein again.

Optionally, in this embodiment of this application, for the branch 1, the following steps S1110 and S1111 may be further performed.

S1110 and S1111 are the same as steps S1017 and S1018 in the embodiment shown in FIG. 10A to FIG. 10C. For related descriptions, refer to the embodiment shown in FIG. 10A to FIG. 10C. Details are not described herein again.

Branch 2:

S1112 is the same as step S1019 in the embodiment shown in FIG. 10A to FIG. 10C.

For related descriptions, refer to the embodiment shown in FIG. 10A to FIG. 10C. Details are not described herein again.

It should be noted that in this embodiment of this application, if a plurality of target network slices are determined in step S1105, or the terminal device does not send request NSSAI, but there are a plurality of subscribed default network slices (in this case, each default network slice may be used as a target network slice), each target network slice may be separately processed based on steps S1105 to S1112, and details are not described herein again.

Further, after the terminal device is successfully registered, the method for controlling use of a network slice that is provided in this embodiment of this application further includes a session establishment procedure shown in the following steps S1113 to S1118 or the following steps S1113 to S1119.

S1113 is the same as step S1020 in the embodiment shown in FIG. 10A to FIG. 10C.

For related descriptions, refer to the embodiment shown in FIG. 10A to FIG. 10C. Details are not described herein again.

S1114. The SMF network element determines whether the service usage of the target network slice in the first region exceeds the first service limit, and the SMF network element determines whether the overall service usage of the target network slice exceeds the overall limit of the target network slice.

The service usage of the target network slice in the first region, the first service limit, the overall service usage of the target network slice, and the overall limit of the target network slice in step S1114 are all information required in the session establishment procedure of the terminal device. For related descriptions, refer to the embodiment shown in FIG. 4. Details are not described herein again.

When the SMF network element determines that the service usage of the target network slice in the first region reaches or exceeds the first service limit, a branch i corresponding to the following step S1118 is performed. When the SMF network element determines that the service usage of the target network slice in the first region does not exceed the first service limit, and the overall service usage of the target network slice does not exceed the overall limit of the target network slice, a branch ii corresponding to the following step S1119 may be performed. When the SMF network element determines that the service usage of the target network slice in the first region does not exceed the first service limit, but the overall service usage of the target network slice reaches or exceeds the overall limit of the target network slice, steps S1115 to S1117 are performed.

S1115. The SMF network element obtains the overall limit policy of the target network slice from the UDR network element by using the SM-PCF network element.

S1116. The SMF network element obtains the slice running status analysis or prediction from the NWDAF network element.

The slice running status analysis or prediction includes one or more of the running load of the target network slice in the first region, the overall running load of the target network slice, or the network performance of the target network slice in the first region at present or in the future.

S1117. The SMF network element determines whether the second condition is met.

When the SMF network element determines that the second condition is met, the branch ii corresponding to the following step S1119 is performed. When the SMF network element determines that the second condition is not met, the branch i corresponding to the following step S1118 is performed. For a demarcation point at which the SMF network element determines that the service usage of the target network slice in the first region is equal to (that is, "reaches" mentioned above) the first service limit, the branch i corresponding to the following step S1118 may be performed, or steps S1115 to S1117 may be performed. This is not specifically limited in this embodiment of this application. For a demarcation point at which the SMF network element determines that the service usage of the target network slice in the first region does not exceed the first service limit, but the overall service usage of the target network slice is equal to the overall limit of the target network slice, the branch ii corresponding to the following step S1119 may be performed, or steps S1115 to S1117 may be performed. This is not specifically limited in this embodiment of this application.

Branch i:

S1118 is the same as step S1028 in the embodiment shown in FIG. 10A to FIG. 10C. For related descriptions, refer to the embodiment shown in FIG. 10A to FIG. 10C. Details are not described herein again.

Branch ii:

S1119 is the same as step S1029 in the embodiment shown in FIG. 10A to FIG. 10C. For related descriptions, refer to the embodiment shown in FIG. 10A to FIG. 10C. Details are not described herein again.

For a technical effect of the embodiment shown in FIG. 11A and FIG. 11B, refer to the embodiment shown in FIG. 8A to FIG. 8C. Details are not described herein again.

Actions of the AM-PCF network element, the SM-PCF network element, the AMF-A network element, or the SMF network element in step S1101 to step S1118 or step S1119 may be performed by the processor 301 in the communications device 300 shown in FIG. 3 by invoking the application program code stored in the memory 303. This is not limited in the embodiments of this application.

It should be noted that the registration procedure and the session establishment procedure in the embodiments shown in FIG. 5A and FIG. 5B to FIG. 11A and FIG. 11B may be decoupled from each other. In other words, the terminal device may perform registration by using the registration procedure in any one of the embodiments, and establish a session by using the session establishment procedure in any one of the embodiments. This is not specifically limited in the embodiments of this application.

It may be understood that, in the foregoing embodiments, methods and/or steps implemented by the first network element may alternatively be implemented by a component (for example, a chip or a circuit) that may be used for the first network element.

The foregoing mainly describes the solutions provided in the embodiments of this application from a perspective of interaction between network elements. Correspondingly, an embodiment of this application further provides a communications apparatus. The communications apparatus may be the first network element in the foregoing method embodiments, an apparatus including the first network element, or a component that can be used for the first network element. It may be understood that, to implement the foregoing functions, the communications apparatus includes corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 12:
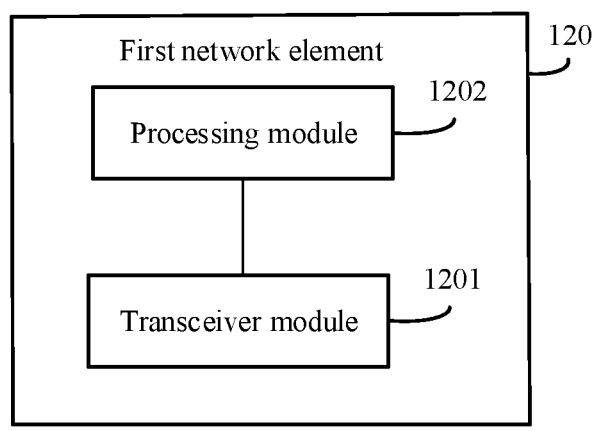
FIG. 12 is a schematic diagram of a structure of a first network element according to an embodiment of this application.

For example, the communications apparatus is the first network element in the foregoing method embodiment. FIG. 12 is a schematic diagram of a structure of a first network element 120. The first network element 120 includes a transceiver module 1201 and a processing module 1202. The transceiver module 1201 may also be referred to as a transceiver unit, and is configured to implement a transceiver function. For example, the transceiver module 1201 may be a transceiver circuit, a transceiver, or a communications interface.

The transceiver module 1201 is configured to receive a first message. The first message is used to request access of a terminal device to a target network slice, the target network slice covers a plurality of regions, the plurality of regions include a first region, and the first region is a region in which the terminal device is currently located. The processing module 1202 is configured to determine, based on a first condition, whether to allow the terminal device to access the target network slice. The first condition includes: whether a service usage of the target network slice in the first region exceeds a first service limit.

Optionally, the processing module 1202 is specifically configured to reject the first message when the service usage of the target network slice in the first region reaches or exceeds the first service limit.

Optionally, the first condition further includes: whether an overall service usage of the target network slice exceeds an overall limit.

Optionally, the processing module 1202 is specifically configured to reject the first message when the service usage of the target network slice in the first region does not exceed the first service limit, but the overall service usage of the target network slice reaches or exceeds the overall limit.

In a possible implementation, the transceiver module 1201 is further configured to receive a second message from a second network element. The second message carries first information, and the first information indicates that the overall service usage of the target network slice reaches or exceeds the overall limit.

Optionally, the first information is a quota of a service usage in the first region that is 0, or the first information is an indication that the overall service usage of the target network slice reaches or exceeds the overall limit of the target network slice.

In another possible implementation, the transceiver module 1201 is further configured to receive a third message from a third network element. The third message carries the overall service usage of the target network slice. The processing module 1202 is further configured to determine that the overall service usage of the target network slice reaches or exceeds the overall limit of the target network slice.

Optionally, the processing module 1202 is specifically configured to: when the overall service usage of the target network slice reaches or exceeds the overall limit, but the service usage of the target network slice in the first region does not exceed the first service limit, if a second condition is met, allow the terminal device to use the target network slice.

In a possible implementation, the first network element is a policy control network element, the first message is an associated registration management policy request or an associated slice management policy request, and the second condition includes: the overall limit is allowed to be exceeded in slice subscription information of the target network slice, or a charging mode of the target network slice is charging by session or by traffic, or a subscribed service type of the target network slice is a specific service type, or the terminal device requesting access is a high-value customer, or a slice running analysis result or prediction result of the target network slice is lower than a specific threshold, or a movement behavior analysis or prediction result of the terminal device requesting access indicates that a service load of the terminal device requesting access is lower than a specific threshold.

Optionally, in this implementation, the processing module 1202 is further configured to: when the first network element receives the associated slice management policy request from a slice selection function network element, determine that the service usage of the target network slice in the first region does not exceed the first service limit.

In another possible implementation, the first network element is a policy control network element, the first message is an associated session management policy request, and the second condition includes: the overall limit is allowed to be exceeded in slice subscription information of the target network slice, or a charging mode of the target network slice is charging by session or by traffic, or a subscribed service type of the target network slice is a specific service type, or the terminal device requesting access is a high-value customer, or an overall session quantity and a traffic bandwidth of the target network slice are lower than an overload risk threshold, or a subscribed QoS parameter of the terminal device indicates that a service of the terminal device is allowed to be preempted, or a slice running analysis or prediction result of the target network slice is lower than a specific threshold, or a movement or communication behavior analysis or prediction result of the terminal device requesting access indicates that a service load of the terminal device requesting access is lower than a specific threshold.

Optionally, in this implementation, the processing module 1202 is further configured to: when the first network element receives the associated session management policy request from a session management network element, determine that the service usage of the target network slice in the first region does not exceed the first service limit.

In still another possible implementation, the first network element is a mobility management network element, the first message is a registration request, and the second condition includes: when a slice selection function network element indicates that the overall service usage of the target network slice reaches or exceeds the overall limit, a session quantity quota indicated by the slice selection function network element exceeds a specified quantity.

Optionally, in this implementation, the processing module 1202 is further configured to: when the first network element receives, from the slice selection function network element, the session quantity quota and the indication that the overall service usage of the target network slice reaches or exceeds the overall limit of the target network slice, determine that the overall service usage of the target network slice reaches or exceeds the overall limit.

In still another possible implementation, the first network element is a session management network element, the first message is a session establishment request, and the second condition includes: when a policy control network element indicates that the overall service usage of the target network slice reaches or exceeds the overall limit, a service QoS parameter, indicated by the policy control network element, of the terminal device indicates that a session can be preempted.

Optionally, in this implementation, the processing module 1202 is further configured to: when the first network element receives, from the policy control network element, the service QoS parameter of the terminal device and the indication that the overall service usage of the target network slice reaches or exceeds the overall limit of the target network slice, determine that the overall service usage of the target network slice reaches or exceeds the overall limit.

In still another possible implementation, the first network element is a mobility management network element, and the first message is a registration request; or the first network element is a session management network element, and the first message is a session establishment request; and the second condition includes: a running load of the target network slice in the first region is less than a specified threshold; or an overall running load of the target network slice is lower than a specified threshold, or network performance of the target network slice in the first region is higher than a specified threshold.

All related content of the steps in the foregoing method embodiments may be cited in function descriptions of corresponding functional modules. Details are not described herein again.

In this embodiment, the first network element 120 is presented with the functional modules divided through integration. The "module" herein may be a specific ASIC, a circuit, a processor and a memory that execute one or more software or firmware programs, an integrated logic circuit, and/or another component that can provide the foregoing functions. In a simple embodiment, a person skilled in the art may conceive that the first network element 120 may be in a form of the communications device 300 shown in FIG. 3.

For example, the processor 301 in the communications device 300 shown in FIG. 3 may invoke the computer-executable instructions stored in the memory 303, to enable the communications device 300 to perform the network slice selection method in the foregoing method embodiment.

Specifically, functions/implementation processes of the transceiver module 1201 and the processing module 1202 in FIG. 12 may be implemented by the processor 301 in the communications device 300 shown in FIG. 3 by invoking the computer-executable instructions stored in the memory 303. Alternatively, a function/an implementation process of the processing module 1202 in FIG. 12 may be implemented by the processor 301 in the communications device 300 shown in FIG. 3 by invoking the computer-executable instructions stored in the memory 303, and a function/an implementation process of the transceiver module 1201 in FIG. 12 may be implemented through the communications interface 304 in the communications device 300 shown in FIG. 3.

Because the first network element 120 provided in this embodiment may perform the foregoing method for controlling use of a network slice, for technical effects that can be achieved by the first network element 120, refer to the foregoing method embodiment. Details are not described herein again.

It should be noted that one or more of the foregoing modules or units may be implemented by using software, hardware, or a combination thereof. When any one of the foregoing modules or units is implemented by using software, the software exists in a form of computer program instructions, and is stored in a memory. A processor may be configured to execute the program instructions to implement the foregoing method procedures. The processor may be built into a system-on-a-chip (SoC) or an ASIC, or may be an independent semiconductor chip. In addition to a core configured to execute software instructions to perform an operation or processing, the processor may further include a necessary hardware accelerator, such as a field programmable gate array (FPGA), a programmable logic device (PLD), or a logic circuit that implements a dedicated logic operation.

When the foregoing modules or units are implemented by using hardware, the hardware may be any one or any combination of a CPU, a microprocessor, a DSP chip, a MCU, an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedure.

Optionally, an embodiment of this application further provides a communications apparatus (for example, the communications apparatus may be a chip or a chip system). The communications apparatus includes a processor, configured to implement the method in any one of the foregoing method embodiments. In a possible design, the communications apparatus further includes a memory. The memory is configured to store necessary program instructions and data. The processor may invoke program code stored in the memory, to indicate the communications apparatus to perform the method in any one of the foregoing method embodiments. Certainly, the memory may not be located in the communications apparatus. When the communications apparatus is a chip system, the communications apparatus may include a chip, or may include a chip and another discrete component. This is not specifically limited in this embodiment of this application.

All or some of the foregoing embodiments may be implemented by software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedure or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example descriptions of this application defined by the appended claims, and is considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method for controlling use of a network slice, comprising:
    receiving, by a first network element, a first message, wherein the first message requests access of a terminal device to a target network slice, the target network slice covers a plurality of regions, the plurality of regions comprise a first region, and the first region is a region in which the terminal device is currently located; and
    determining, by the first network element based on a first condition, whether to allow the terminal device to access the target network slice, wherein the first condition includes whether a service usage of the target network slice in the first region exceeds a first service limit of the target network slice in the first region and whether an overall service usage of the target network slice exceeds an overall limit of the target network slice.

2. The method according to claim 1, wherein the determining, by the first network element based on the first condition, whether to allow the terminal device to access the target network slice comprises:
    rejecting, by the first network element, the first message when the service usage of the target network slice in the first region reaches or exceeds the first service limit.

3. The method according to claim 1, wherein the determining, by the first network element based on the first condition, whether to allow the terminal device to access the target network slice comprises:
    rejecting, by the first network element, the first message when the service usage of the target network slice in the first region does not exceed the first service limit, but the overall service usage of the target network slice reaches or exceeds the overall limit.

4. The method according to claim 3, further comprising:
    receiving, by the first network element, a second message from a second network element, wherein the second message carries first information, and the first information indicates that the overall service usage of the target network slice reaches or exceeds the overall limit.

5. The method according to claim 4, wherein the first information is a quota of a service usage in the first region that is 0, or the first information is an indication that the overall service usage of the target network slice reaches or exceeds the overall limit of the target network slice.

6. The method according to claim 3, further comprising:
    receiving, by the first network element, a third message from a third network element, wherein the third message carries the overall service usage of the target network slice; and
    determining, by the first network element, that the overall service usage of the target network slice reaches or exceeds the overall limit of the target network slice.

7. The method according to claim 1, wherein the determining, by the first network element based on the first condition, whether to allow the terminal device to access the target network slice comprises:
    when the overall service usage of the target network slice reaches or exceeds the overall limit, but the service usage of the target network slice in the first region does not exceed the first service limit, and when a second condition is met, allowing, by the first network element, the terminal device to use the target network slice.

8. The method according to claim 7, wherein the first network element is a mobility management network element, the first message is a registration request, and the second condition comprises:
    when a slice selection function network element indicates that the overall service usage of the target network slice reaches or exceeds the overall limit, a session quantity quota indicated by the slice selection function network element exceeds a specified quantity.

9. The method according to claim 8, further comprising:
    when the first network element receives, from the slice selection function network element, the session quantity quota and the indication that the overall service usage of the target network slice reaches or exceeds the overall limit of the target network slice, determining, by the first network element, that the overall service usage of the target network slice reaches or exceeds the overall limit.

10. The method according to claim 7, wherein the first network element is a session management network element, the first message is a session establishment request, and the second condition comprises:
when a policy control network element indicates that the overall service usage of the target network slice reaches or exceeds the overall limit, a service QoS parameter, indicated by the policy control network element, of the terminal device indicates that a session can be preempted.

11. The method according to claim 10, further comprising:
when the first network element receives, from the policy control network element, the service QOS parameter of the terminal device and the indication that the overall service usage of the target network slice reaches or exceeds the overall limit of the target network slice, determining, by the first network element, that the overall service usage of the target network slice reaches or exceeds the overall limit.

12. The method according to claim 7, wherein the first network element is a mobility management network element, and the first message is a registration request, or wherein the first network element is a session management network element, and the first message is a session establishment request, and
the second condition comprises:
a running load of the target network slice in the first region is less than a specified threshold; or
an overall running load of the target network slice is lower than a specified threshold, or network performance of the target network slice in the first region is higher than a specified threshold.

13. The method according to claim 1, wherein when the first message is the registration related message, the service usage of the target network slice in the first region comprises an actual quantity of registered terminals of the target network slice in the first region, and the first service limit comprises a maximum quantity of registered terminals allowed by the target network slice in the first region, or
when the first message is the session establishment related message, the service usage of the target network slice in the first region comprises an actual quantity of concurrent sessions of the target network slice in the first region, and the first service limit comprises a maximum quantity of concurrent sessions allowed by the target network slice in the first region, or
when the first message is the session establishment related message, the service usage of the target network slice in the first region comprises an actual traffic bandwidth of the target network slice in the first region, and the first service limit comprises a maximum traffic bandwidth allowed by the target network slice in the first region.

14. A first network element, comprising:
a transceiver; and
a processor coupled to the transceiver,
wherein the transceiver is configured to receive a first message, wherein the first message requests access of a terminal device to a target network slice, the target network slice covers a plurality of regions, the plurality of regions comprise a first region, and the first region is a region in which the terminal device is currently located, and
wherein the processor is configured to determine, based on a first condition, whether to allow the terminal device to access the target network slice, wherein the first condition includes whether a service usage of the target network slice in the first region exceeds a first service limit of the target network slice in the first region and whether an overall service usage of the target network slice exceeds an overall limit of the target network slice.

15. The first network element according to claim 14, wherein the processor is further configured to:
reject the first message when the service usage of the target network slice in the first region reaches or exceeds the first service limit.

16. The first network element according to claim 14, wherein the processor is further configured to:
reject the first message when the service usage of the target network slice in the first region does not exceed the first service limit, but the overall service usage of the target network slice reaches or exceeds the overall limit.

17. The first network element according to claim 14, wherein the processor is further configured to:
when the overall service usage of the target network slice reaches or exceeds the overall limit, but the service usage of the target network slice in the first region does not exceed the first service limit, if a second condition is met, allow the terminal device to use the target network slice.

18. The first network element according to claim 14, wherein when the first message is a registration related message, the service usage of the target network slice in the first region comprises an actual quantity of registered terminals of the target network slice in the first region, and the first service limit comprises a maximum quantity of registered terminals allowed by the target network slice in the first region, or
wherein when the first message is a session establishment related message, the service usage of the target network slice in the first region comprises an actual quantity of concurrent sessions of the target network slice in the first region, and the first service limit comprises a maximum quantity of concurrent sessions allowed by the target network slice in the first region, or
wherein when the first message is a session establishment related message, the service usage of the target network slice in the first region comprises an actual traffic bandwidth of the target network slice in the first region, and the first service limit comprises a maximum traffic bandwidth allowed by the target network slice in the first region.

* * * * *